United States Patent
Wu

(10) Patent No.: US 12,336,047 B2
(45) Date of Patent: Jun. 17, 2025

(54) DUAL ACTIVE PROTOCOL STACK OPERATION FOR HANDOVER AND PSCELL CHANGE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 435 days.

(21) Appl. No.: 17/799,187

(22) PCT Filed: Feb. 10, 2021

(86) PCT No.: PCT/US2021/017319
§ 371 (c)(1),
(2) Date: Aug. 11, 2022

(87) PCT Pub. No.: WO2021/163089
PCT Pub. Date: Aug. 19, 2021

(65) Prior Publication Data
US 2023/0095601 A1 Mar. 30, 2023

Related U.S. Application Data

(60) Provisional application No. 63/004,825, filed on Apr. 3, 2020, provisional application No. 62/976,346, filed on Feb. 13, 2020.

(51) Int. Cl.
*H04W 76/30* (2018.01)
*H04W 36/00* (2009.01)
*H04W 36/18* (2009.01)

(52) U.S. Cl.
CPC ....... *H04W 76/30* (2018.02); *H04W 36/0033* (2013.01); *H04W 36/185* (2023.05)

(58) Field of Classification Search
CPC ............. H04W 76/30; H04W 36/0033; H04W 36/185; H04W 76/34; H04W 36/34
See application file for complete search history.

(56) References Cited

U.S. PATENT DOCUMENTS

| | | |
|---|---|---|
| 2019/0069333 A1 | 2/2019 | Kim |
| 2019/0097690 A1 | 3/2019 | Kim et al. |
| 2019/0149997 A1 | 5/2019 | Liao et al. |
| 2019/0253945 A1 | 8/2019 | Paladugu et al. |
| 2019/0387444 A1 | 12/2019 | Byun et al. |

(Continued)

FOREIGN PATENT DOCUMENTS

WO WO-2019/131985 A1 7/2019

OTHER PUBLICATIONS

R2-1912821 3GPP email discussion summary (Year: 2019).*

(Continued)

*Primary Examiner* — Habte Mered
(74) *Attorney, Agent, or Firm* — MARSHALL, GERSTEIN & BORUN LLP

(57) ABSTRACT

A radio access network (RAN) for enabling execution of a dual active protocol stack (DAPS) procedure at a UE determines that the UE is to release at least one cell via which the UE communicates with the RAN, prior to executing the DAPS procedure (2402), causes the UE to release the at least one cell (2404), and transmits a command to the UE to execute the DAPS procedure (2406).

20 Claims, 35 Drawing Sheets

(56) References Cited

U.S. PATENT DOCUMENTS

| | | | |
|---|---|---|---|
| 2020/0022035 A1 | 1/2020 | Kadiri et al. | |
| 2020/0029389 A1* | 1/2020 | Yilmaz | H04W 8/08 |
| 2020/0037248 A1 | 1/2020 | Zhou et al. | |
| 2020/0314710 A1* | 10/2020 | Paladugu | H04W 36/00692 |
| 2020/0329405 A1 | 10/2020 | Awoniyi-Oteri et al. | |
| 2021/0014764 A1 | 1/2021 | Zhang et al. | |
| 2021/0168689 A1 | 6/2021 | Shimoda et al. | |

OTHER PUBLICATIONS

R2-1914516 3GPP Source Connection Handling during DAPS HO (Year: 2019).*
CATT, "Discussion E1 impact during DAPS Handover," 3GPP Draft (2019).
First Examination Report for India Application No. 2022470048768, dated Jan. 11, 2023.
First Examination Report for India Application No. 202247049484, dated Dec. 13, 2022.
Office Action for European Application No. 21753716.6, dated Aug. 1, 2024.
International Search Report and Written Opinion for Application No. PCT/US2021/017323, dated Apr. 28, 2021.
International Search Report and Written Opinion for Application No. PCT/US2021/017319, dated May 11, 2021.
Qualcomm Incorporated, "Source Connection Handling During DAPS HO," 3GPP Draft (2019).
Qualcomm Inc., Email Discussion report for [107#79] [LTE/feMOB] Capability Coordination for RUDI HO, 3GPP Draft (2019).
Qualcomm Incorporated et al., "UE Capability Coordination Signalling Aspects for DAPS Based Enhanced MBB HO," 3GPP Draft (2019).
Search Report for European Application No. 21753716.6, dated Jul. 4, 2022.
Huawei, "DAPS HO in Split gNB," 3GPP Draft (Nov. 8, 2019).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.0.0 (2019).
"5G; NR; Overall description; Stage-2 (3GPP TS 38.300 version 15.8.0 Release 15)," ETSI TS 138 300 V15.8.0 (2020).
"5G; NR; Packet Data Convergence Protocol (PDCP) specification (3GPP TS 38.323 version 15.5.0 Release 15)," ETSI TS 138 323 V15.5.0 (2019).
"5G; NR; Radio Resource Control (RRC); Protocol specification (3GPP TS 38.331 version 15.8.0 Release 15)," ETSI TS 138 331 V15.8.0 (2020).
"LTE; Evolved Universal Terrestrial Radio Access (E-UTRA); Packet Data Convergence Protocol (PDCP) specification (3GPP TS 36.323 version 15.5.0 Release 15)," ETSI TS 136 323 V15.5.0 (2020).
"LTE; Evolved Universal Terrestrial Radio Access (E-UTRA); Radio Resource Control (RRC); Protocol specification (3GPP TS 36.331 version 15.8.0 Release 15)," ETSI TS 136 331 V15.8.0 (2020).
"Universal Mobile Telecommunications System (UMTS); LTE; 5G; NR; Multi-connectivity; Overall description; Stage-2 (3GPP TS 37.340 version 15.7.0 Release 15)," ETSI TS 137 340 V15.7.0 (2019).
3GPP RAN2 email discussion [108#35][LTE Mob] Running RRC CR (Ericsson) (2020).
Qualcomm Incorporated, "LTE mobility enhancements for eMBB HO using dual active protocol stack," 3GPP TSG-RAN WG2 Meeting #105bis (2019).
R3-196132, R2-1914640, 3GPP RAN2 email discussion [108#34][NR Mob] Running RRC CR for CHO and DAPS (Intel) (2020).
Office Action for European Application No. 21709589.2, dated Mar. 25, 2025.

* cited by examiner

DUAL ACTIVE PROTOCOL STACK OPERATION FOR HANDOVER AND PSCELL CHANGE

CROSS-REFERENCE TO RELATED APPLICATIONS

This patent application is a national stage application, filed under 35 U.S.C. § 371, of International Application No. PCT/US21/17319, filed Feb. 10, 2021 and entitled "DUAL ACTIVE PROTOCOL STACK OPERATION FOR HANDOVER AND PSCELL CHANGE," which claims priority to and the benefit of U.S. Provisional Patent Application No. 62/976,346, filed on Feb. 13, 2020 and entitled "DUAL ACTIVE PROTOCOL STACK OPERATION FOR HANDOVER AND PSCELL CHANGE," and which also claims priority to and the benefit of U.S. Provisional Patent Application No. 63/004,825, filed on Apr. 3, 2020 and entitled "DUAL ACTIVE PROTOCOL STACK OPERATION FOR HANDOVER AND PSCELL CHANGE," the entire disclosures of which are hereby incorporated by reference herein in their entireties.

FIELD OF THE DISCLOSURE

This disclosure relates generally to wireless communications and, more particularly, to dual active protocol stack (DAPS) operations related to handover and primary secondary cell (PSCell) change procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected by a backhaul.

3GPP TS 36.300 v15.6.0 and 38.300 v15.6.0 describe legacy procedures for handover (or called reconfiguration with sync) scenarios. These procedures involve messaging (e.g., RRC signaling and preparation) among RAN nodes and the UE. UEs can perform handover procedures to switch from one cell to another, whether in single connectivity (SC) or DC operation. The UE may handover from a cell of a serving base station to a target cell of a target base station, or from a cell of a first distributed unit (DU) of a serving base station to a target cell of a second DU of the same base station, depending on the scenario.

3GPP TS 37.340 v15.7.0 describes legacy procedures for a UE to change PSCells in DC scenarios. These procedures involve messaging (e.g., RRC signaling and preparation) among RAN nodes and the UE. The UE may perform PSCell change from a PSCell of a serving SN to a target PSCell of a target SN, or from a PSCell of a source distributed unit (DU) of a base station to a PSCell of a target DU of the same base station, depending on the scenario.

More recently, 3GPP has been discussing dual active protocol stack (DAPS) handover and DAPS PSCell change procedures for achieving 0ms user data interruption during handover and PSCell change. Generally, the length of interruption experienced at the UE depends on a time difference between the time when a radio link connection at a source cell is released and the time when a radio link connection at a target cell is established. If the release time is no earlier than the established time, achieving 0ms user data interruption is possible. Using a DAPS, the UE can simultaneously communicate with the source cell while establishing a radio link connection at the target cell, and subsequently stop communicating with the source cell after establishing a radio link connection at the target cell, when performing DAPS handover and PSCell change.

In some cases, the RAN can provide a DAPS configuration (e.g., a DAPS handover configuration, a DAPS PSCell change configuration) to the UE for the UE to perform a DAPS handover or DAPS PSCell change, respectively. However, in some of these scenarios, the UE and/or RAN do not properly handle the DAPS configuration. For example, the UE may fail to perform DAPS handover or DAPS PSCell change upon receiving the DAPS configuration from a source RAN node, and as a consequence, the UE performs an RRC connection reestablishment procedure with the source RAN node to recover the reconfiguration failure, thereby causing data interruption. As another example, the source RAN node may be unaware that the UE is capable of DAPS handover or DAPS PSCell change, and as a consequence, fail to instruct the UE 102 to perform DAPS handover or DAPS PSCell change. Further, in some scenarios, after the RAN provides multiple DAPS configurations to the UE requiring the UE to utilize a maximum number of medium access control (MAC) entities, the UE may fail to handle any additional DAPS configurations.

SUMMARY

Generally speaking, a UE and one or more base stations operating in a RAN implement the techniques of this disclosure to prepare the UE to perform DAPS handover or DAPS PSCell change upon receiving a corresponding DAPS configuration (or an indication of the corresponding DAPS configuration). Using these techniques, for example, the RAN can configure a UE communicating with a base station via a plurality of cells to release some of the cells, so that radio frequency (RF) chain(s) or transceiver(s) of the UE that were previously operating when communicating with the released cells become available for use to perform DAPS handover or DAPS PSCell change. As another example, the RAN can configure a UE communicating in dual connectivity (DC) with a master node (MN) and a secondary node (SN) to release the SN, so that RF chain(s) or transceiver(s) of the UE that were previously operating when communicating with the released SN become available for use to perform DAPS handover or DAPS PSCell change.

Further, a UE and one or more base stations operating in a RAN implement the techniques of this disclosure to enable the UE to release one or more MAC entities after performing DAPS handover or DAPS PSCell change, so that the UE is capable of utilizing additional MAC entities without exceeding a maximum number of MAC entities to perform additional DAPS handover or DAPS PSCell procedures.

One example implementation of these techniques is a method, in a RAN, for enabling execution of a DAPS procedure at a UE. The method includes determining, by processing hardware, that the UE is to release at least one cell via which the UE communicates with the RAN, prior to executing the DAPS procedure. The method also includes causing, by the processing hardware, the UE to release the at least one cell. The method also includes transmitting, by the processing hardware, a command to the UE to execute the DAPS procedure.

Another example implementation of these techniques is a method, in a RAN, for configuring a DAPS procedure at a UE communicating with the RAN using a first uplink bandwidth part (BWP) and a first downlink BWP of a source cell. The method includes determining, by processing hardware, that the UE is to perform the DAPS procedure to disconnect from the source cell and connect to a target cell. The method also includes selecting, by the processing hardware, (i) a second uplink BWP that does not overlap with the first uplink BWP and (ii) a second downlink BWP that does not overlap with the first downlink BWP. The method also includes transmitting, by the processing hardware to the UE, an indication that the UE is to perform the DAPS procedure to communicate with the RAN via the second uplink BWP and the second downlink BWP of the target cell.

Another example implementation of these techniques is a method, in a UE, for executing of a DAPS procedure. The method includes receiving, by processing hardware and from a radio access network (RAN), an indication the UE is to release at least one cell via which the UE communicates with the RAN. The method also includes releasing, by the processing hardware, the at least one cell in accordance in response to the indication. The method also includes receiving, by the processing hardware and from the RAN, a command to execute the DAPS procedure. The method also includes executing the DAPS procedure subsequently to the releasing of the at least one cell.

Another example implementation of these techniques is a method, in a central unit (CU) of a distributed base station, for configuring a dual active protocol stack (DAPS) procedure at a UE communicating with the distributed base station via a source distributed unit (DU). The method includes determining, by the processing hardware and to the UE, that the UE is to perform the DAPS procedure to disconnect from the source DU and connect to a target DU. The method also includes transmitting, by the processing hardware and to the source DU, an indication that the source DU is to continue communicating with the UE during the DAPS procedure. The method also includes transmitting, in response to determining that the UE has begun communicating with the target DU, a release indication to the target DU, the release indication causing the target DU to release the DAPS procedure. The method also includes subsequently to transmitting the release indication, causing the source DU to release the UE context.

Another example implementation of these techniques is a method, in a UE, for managing connectivity. The method includes communicating with a radio access network (RAN) via a source cell, using a first medium access control (MAC) entity. The method also includes receiving, by processing hardware, an indication that the UE is to perform a dual active protocol stack (DAPS) procedure to connect to a target cell. The method also includes communicating with the target cell during the DAPS procedure using a second MAC entity. The method also includes releasing the first MAC entity in response to determining that the DAPS procedure has completed.

DETAILED DESCRIPTION OF THE DRAWINGS

Figure 1A:
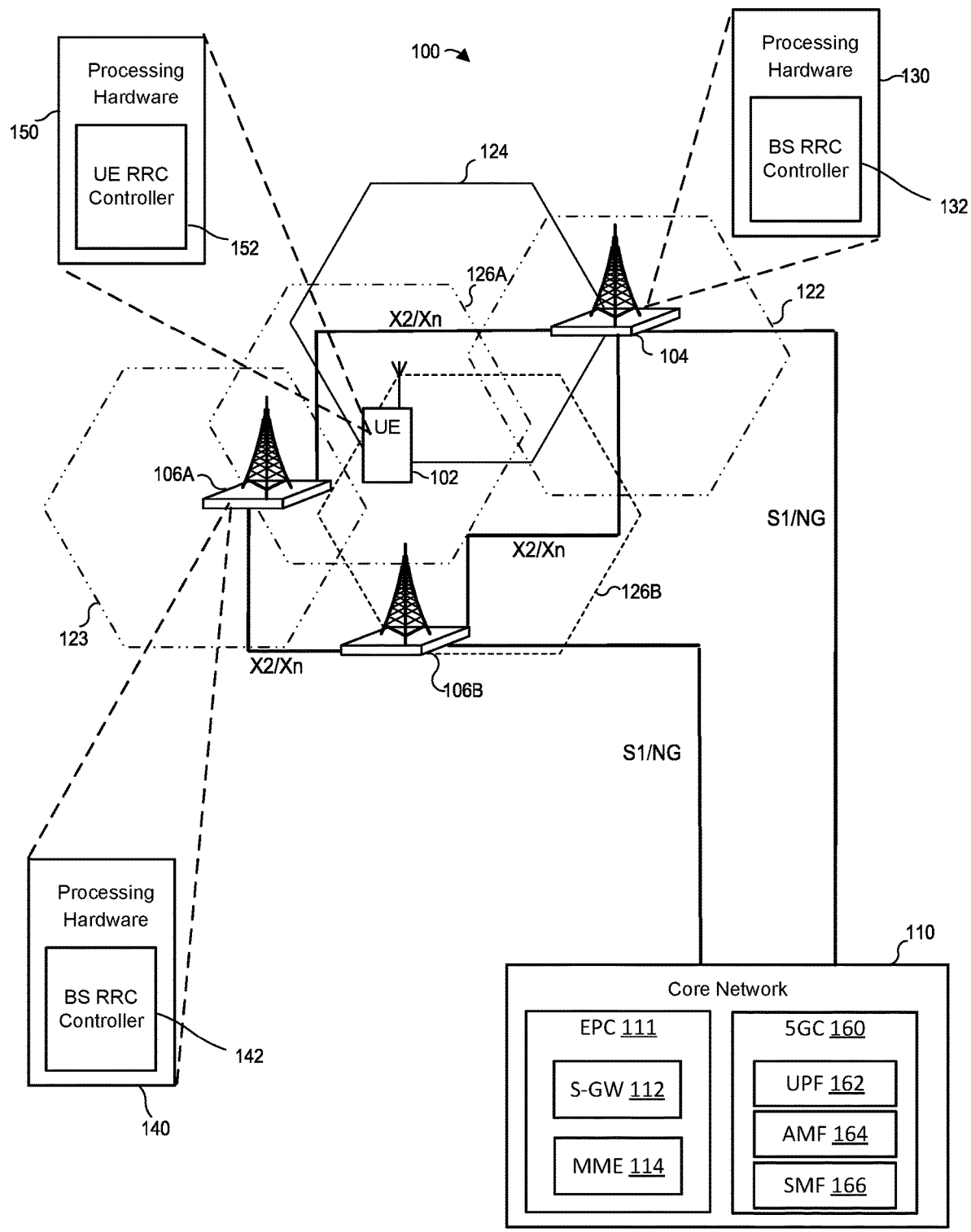
FIG. 1A is a block diagram of an example system in which a RAN and a UE can implement the techniques of this disclosure for managing DAPS procedures, including DAPS handover and DAPS PSCell change.

FIG. 1A depicts an example wireless communication system 100 that can implement DAPS operation techniques of this disclosure. The wireless communication system 100 includes a UE 102, as well as base stations 104, 106A, 106B that are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs.

The base station 104 supports a cell 124, the base station 106A supports a cell 126A, and the base station 106B supports a cell 126B. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A or 106B, etc.). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB or an MgNB, and the base station 106A operates as a candidate SgNB (C-SgNB) or a candidate Sng-eNB (C-Sng-eNB). Although various scenarios are described below in which the base station 104 operates as an MN and the base station 106A (or 106B) operates as an SN or T-SN, any of the base stations 104, 106A, 106B generally can operate as an MN, an SN or a T-SN in different scenarios. Thus, in some implementations, the base station 104, the base station 106A, and the base station 106B can implement similar sets of functions and each support MN, SN, and T-SN operations.

In operation, the UE 102 can use a radio bearer (e.g., a DRB or an SRB) that at different times terminates at an MN (e.g., the base station 104) or an SN (e.g., the base station 106A). For example, after handover to the base station 106B, the UE 102 can use a radio bearer (e.g., a DRB or an SRB) that at different times terminates at the base station 106B. The UE 102 can apply one or more security keys when communicating on the radio bearer, in the uplink (from the UE 102 to a base station) and/or downlink (from a base station to the UE 102) direction.

The base station 104 includes processing hardware 130, which can include one or more general-purpose processors (e.g., central processing units (CPUs) and a computer-readable memory storing machine-readable instructions executable on the one or more general-purpose processor(s), and/or special-purpose processing units. The processing hardware 130 in the example implementation of FIG. 1A includes a base station RRC controller 132 that is configured to manage or control RRC configurations and RRC procedures. For example, the base station RRC controller 132 can be configured to support RRC messaging associated with DAPS handover and DAPS PSCell change procedures, and/or to support the necessary operations when the base station 104 operates as an MN, as discussed below.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station RRC controller 142 that is configured to manage or control RRC configurations and RRC procedures. For example, the base station RRC controller 142 can be configured to support RRC messaging associated with DAPS handover and DAPS PSCell change procedures, and/or to support the necessary operations when the base station 106A operates as an SN or target SN (T-SN), as discussed below. While not shown in FIG. 1A, the base station 106B can include processing hardware similar to the processing hardware 140 of the base station 106A.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE RRC controller 152 that is configured to manage or control RRC configurations RRC procedures. For example, the UE RRC controller 152 can be configured to support RRC messaging associated with DAPS handover and DAPS PSCell change procedures in accordance with any of the implementations discussed below.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106A can be an EN-DC gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. For example, base station 104 and base station 106A can also support cells 122 and 123, respectively. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

As indicated above, the wireless communication system 100 can support various procedures (e.g., DAPS handover, DAPS PSCell change, etc.) and modes of operation (e.g., SC or DC). Example operation of various procedures that can be implemented in the wireless communication system 100 will now be described.

In some implementations, the wireless communication system 100 supports a legacy handover preparation procedure (i.e., a non-DAPS handover preparation procedure). In one scenario, for example, the base station 104 can perform a non-DAPS handover preparation procedure to configure the UE 102 to handover from a cell 124 of the base station 104 to a cell 126A of the base station 106A. In this scenario, the base station 104 and the base station 106A operate as a source base station (S-BS) or a source MN (S-MN), and a target base station (T-BS) or a target MN (T-MN), respectively. In the non-DAPS handover preparation procedure, the base station 104 sends a Handover Request message to the base station 106A. In response to the Handover Request message, the base station 106A includes configuration parameters configuring radio resources for the UE 102 in a handover command message, includes the handover command message in a Handover Request Acknowledge message, and sends the Handover Request Acknowledge message to the base station 104. In turn, the base station 104 transmits the handover command message to the UE 102 and subsequently discontinues (or stops) transmitting data to or receiving data from the UE 102.

Upon receiving the handover command message, the UE 102 hands over to the base station 106A via cell 126A and communicates with the base station 106A by using the configuration parameters in the handover command message. Particularly, in response to the handover command message, the UE 102 disconnects from the cell 124 (or the base station 104), performs a random access procedure with the base station 106A via the cell 126A, and transmits a handover complete message to the base station 106A via cell 126A.

In some implementations, the wireless communication system 100 supports a DAPS handover preparation procedure. In one scenario for example, the base station 104 can perform a DAPS handover preparation procedure to configure the UE 102 to hand over from a cell 124 of the base station 104 to a cell 126B of the base station 106B. In this scenario, the base station 104 and the base station 106B operate as an S-BS or an S-MN, and a T-BS or a T-MN, respectively. In the DAPS handover preparation procedure, the base station 104 sends a Handover Request message to the base station 106B. In some implementations, the base station 104 can explicitly request DAPS handover in the Handover Request message, e.g., by including a DAPS indicator in the Handover Request message. In response to the Handover Request message, and to accept the request for DAPS handover, the base station 106B includes configuration parameters configuring radio resources for the UE 102 in a handover command, includes the handover command message in a Handover Request Acknowledge message, and sends the Handover Request Acknowledge message to the base station 104. In some implementations, the base station 106B can indicate DAPS handover in the handover command message, e.g., by including a DAPS handover configuration or a DAPS handover indicator in the handover command message, or can include an indicator in the Handover Request Acknowledge message. In turn, the base station 104 transmits the handover command message to the UE 102.

Upon receiving the handover command message, the UE 102 hands over to the base station 106B via cell 126B and communicates with the base station 106B by using the configuration parameters in the handover command message. Particularly, in response to the handover command message, whereas in the non-DAPS handover preparation procedure the UE 102 disconnects from the cell 124 (or the base station 104), the UE 102 in the DAPS handover preparation procedure maintains the connection to the base station 104 via cell 124, performs a random access procedure with the base station 106B via cell 126B, and transmits a handover complete message to the base station 106B via cell 126B.

In maintaining the connection to the base station 104 via cell 124 in the DAPS handover preparation procedure, the UE 102 effectively has two links, i.e., a source MCG link with the base station 104 and a target MCG link with the base station 106B. The UE 102 can continue receiving data (i.e., downlink data) from the base station 104 until the UE 102 receives an indication from the base station 106B to release the source MCG link with the base station 104. The UE 102 can continue transmitting data (e.g., new uplink data transmission or retransmission of PDCP SDUs) to the base station 104 until the UE 102 either successfully completes the random access procedure with the base station 106B or receives the indication from the base station 106B to release the MCG link with the base station 104.

In some implementations, in the handover preparation procedure scenarios above, the wireless communication system 100 supports DC operation. In one scenario, for example, after the UE 102 connects to the base station 104, the base station 104 can perform an SN addition procedure to add the base station 106A as an SN, thereby configuring the UE 102 to operate in DC with the base stations 104 and 106A. At this point, the base stations 104 and 106A operate as an MN and an SN, respectively. Later on, the MN 104 can initiate the non-DAPS or DAPS handover preparation procedures to handover the UE 102 to the T-MN 106B.

In some implementations, the wireless communication system 100 supports a legacy PSCell change preparation procedure (i.e., a non-DAPS PSCell change preparation procedure). In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 stops communicating with the SN 106A via PSCell 123 and attempts to connect to the T-PSCell 126A after receiving the configuration for the T-PSCell 126A. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the non-DAPS PSCell change procedure. The UE 102 stops communicating with the S-SN 106A via PSCell 123 and attempts to connect to the T-SN 106B via T-PSCell 126B after receiving the configuration for the T-PSCell 126B.

In some implementations, the wireless communication system 100 supports DAPS PSCell change. In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 continues communicating with the SN 106A via PSCell 123 while attempting to connect to the T-PSCell 126A after receiving the configuration for the T-PSCell 126A. After the T-PSCell 126A begins to operate as the PSCell 126A for the UE 102, the UE 102 stops communicating with the SN 106A via PSCell 123. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the DAPS PSCell change procedure. The UE 102 continues communicating with the S-SN 106A via PSCell 123 while attempting to connect to the T-SN 106B via T-PSCell 126B after receiving the configuration for the T-PSCell 126B. After the T-PSCell 126B begins to operate as the PSCell 126B for the UE 102, the UE 102 stops communicating with the S-SN 106A via PSCell 123.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EUTRA-NR DC (EN-DC) with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is an Sng-eNB, the UE 102 can be in NR-EUTRA DC (NE-DC) with the MgNB 104 and the Sng-eNB 106A.

Figure 1B:
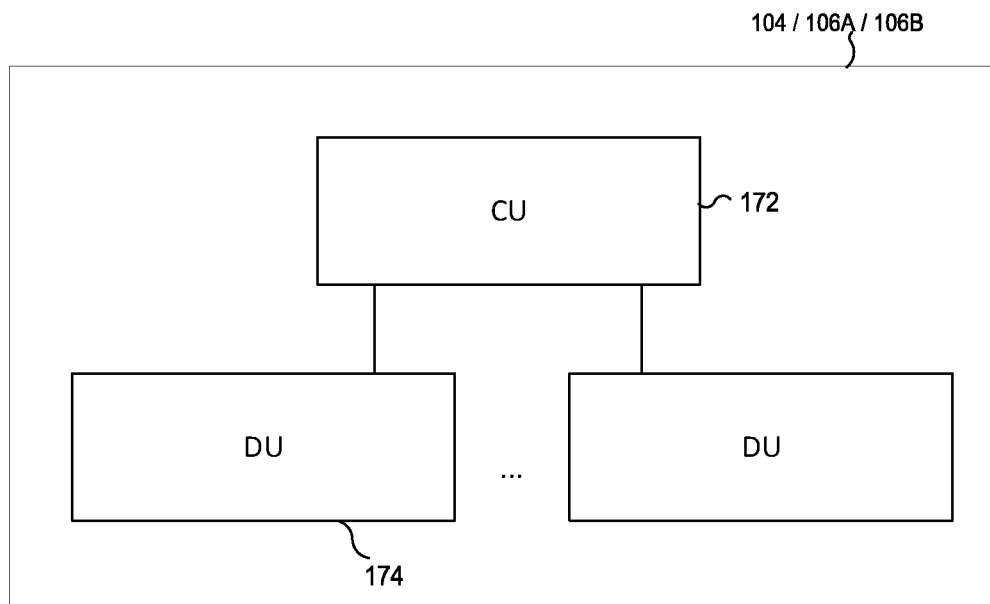
FIG. 1B is a block diagram of an example base station in which a centralized unit (CU) and a distributed unit (DU) can operate in the system of FIG. 1A.

FIG. 1B depicts an example, distributed implementation of any one or more of the base stations 104, 106A, 106B. In this implementation, the base station 104, 106A, or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A. The processing hardware can include a base station RRC controller (e.g., RRC controller 142) configured to manage or control one or more RRC configurations and/or RRC procedures when the base station (e.g., base station 106A) operates as an SN.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as a MN or an SN. The process hardware can also include a physical layer controller configured to manage or control one or more physical layer operations or procedures.

Figure 2:
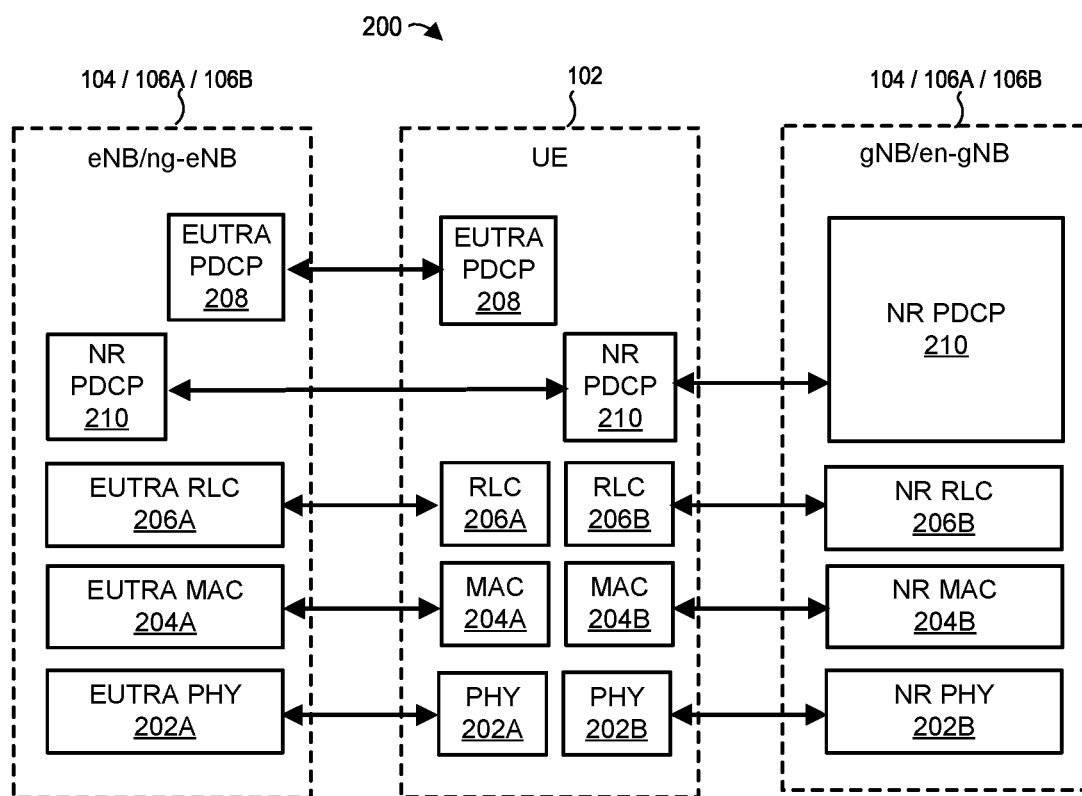
FIG. 2 is a block diagram of an example protocol stack, according to which the UE of FIG. 1A can communicate with base stations of FIG. 1A.

FIG. 2 illustrates, in a simplified manner, an example dual active protocol stack (DAPS) 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

FIGS. 3 through 15 illustrate message sequences between the UE 102 and various base stations of the RAN (including base stations 104, 106A and/or 106B), for a number of scenarios and implementations relating to DAPS handover and DAPS PSCell change procedures.

In particular, FIG. 3 (i.e., 3A through 3E) through FIG. 9 (i.e., 9A and 9B) correspond to DAPS handover scenarios in which a base station initiates a DAPS handover procedure for a UE. FIG. 10 (i.e., 10A and 10B) through FIG. 15 (i.e., 15A and 15B) correspond to DAPS PSCell change scenarios in which a base station initiates a DAPS PSCell change procedure for a UE.

Figure 3A:
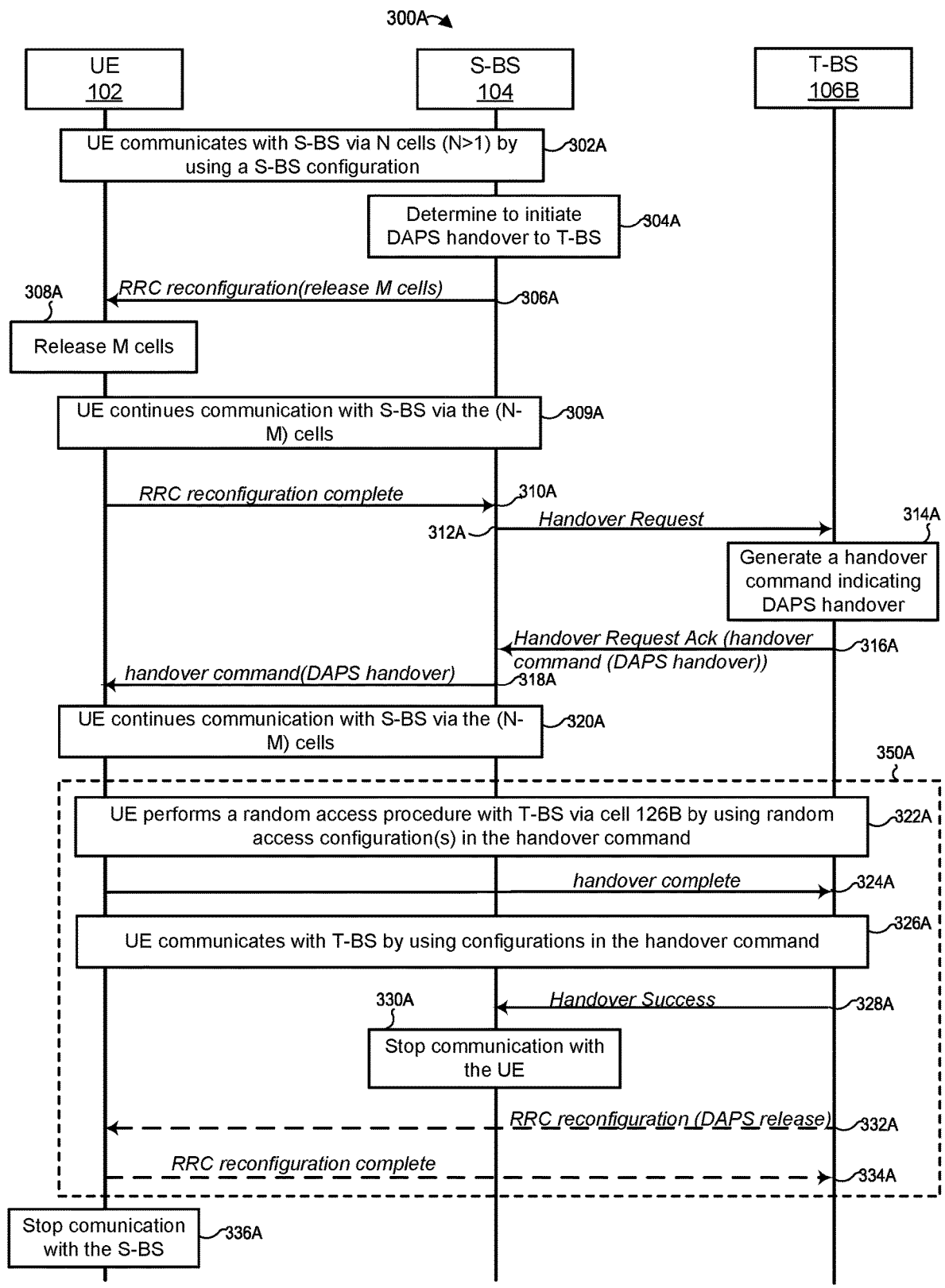
FIGS. 3A and 3B are messaging diagrams of example scenarios in which a RAN prepares a DAPS handover procedure for a UE by releasing M of N cells via which the UE communicates with a source base station of the RAN prior to the UE performing DAPS handover to a target base station of the RAN.

Referring first to FIG. 3A, according to a DAPS handover scenario 300A, the base station 104 operates as a source base station (S-BS) for the UE 102, and the base station 106B operates as a target base station (T-BS).

Initially, the UE 102 communicates 302A data (e.g., uplink (UL) data PDUs and/or downlink (DL) data PDUs) with the S-BS 104 via N cells using carrier aggregation (CA), where N is a whole number greater than one, by using an S-BS configuration. The N cells include PCell 124 and one or more secondary cells (SCells), such as cell 122. In some scenarios, the UE 102 communicates 302A data in SC with the S-BS 104, or communicates 302A data in DC with the S-BS 104 operating as an MN and an SN (e.g., the base station 106A) not shown in FIG. 3A.

Later in time, the S-BS 104 determines 304A to initiate DAPS handover for the T-BS 106B and the UE 102 to communicate, e.g., blindly or in response to detecting a suitable event. For example, the determination 304A can occur in response to the S-BS 104 receiving one or more measurement results from the UE 102 that are above (or below) one or more predetermined thresholds, or calculating a filtered result (from the measurement result(s)) that is above (or below) a predetermined threshold. In another example, the suitable event can be that the UE 102 is moving toward the T-BS 106B. In yet another example, the suitable event can be one or more measurement results, generated or obtained by the S-BS 104 based on measurements of signals received from the UE 102, being above (or below) one or more predetermined thresholds.

In response to the determination 304A, the S-BS 104 transmits 306A an RRC reconfiguration message to the UE 102 to configure the UE 102 to release M cells, where M is a whole number less than N (i.e., 0<M<N). The M cells can be one, some, or all of the SCells covered by the S-BS 104. In response to the RRC reconfiguration message, the UE 102 releases 308A the M cells (i.e., the UE 102 disconnects from the M cells). As a result, RF chain(s) or transceiver(s) of the UE 102 that were previously operating in communicating with the S-BS 104 via the M cells become available for use to communicate with the T-BS 106B during and after a successful DAPS handover, while those that are communicating with the S-BS 104 via the N-M cells are still in use. In releasing 308A the M cells, the UE 102 and the S-BS 104 update the S-BS configuration by excluding configurations relevant to the released M cells, and continue 309A communicating with each other (i.e., via N-M cells) by using the updated S-BS configuration. In some implementations, if the RRC reconfiguration message also includes an indication to update (e.g., adds, modifies or releases) configuration parameters not relevant to the M cells, the UE 102 and the S-BS 104 can update the S-BS configuration accordingly. The UE 102 then transmits 310A an RRC reconfiguration complete message to the S-BS 104.

In some implementations, if the UE 102 at event 302A communicates data with the S-BS 104 via P cells, where 0<P≤N−M, events 306A, 308A, 309A, and 310A may be omitted.

After determining 304A to initiate DAPS handover, the S-BS 104 also sends 312A a Handover Request message to the T-BS 106B. In response, the T-BS 106B generates 314A a handover command message that includes a DAPS handover configuration or an indication for the DAPS handover configuration in a field or an IE (e.g., a dapsConfig field, a dapsHO-Config field, a daps-HO field or a daps-HO-Config field), includes the handover command message in a Handover Request Acknowledge message, and sends 316A the Handover Request Acknowledge message to the S-BS 104.

In turn, the S-BS 104 transmits 318A the handover command message to the UE 102. The handover command message also includes one or more random access configurations needed by the UE 102 to handover to the T-BS 106B, and in some implementations, includes additional fields, such as a mobility field (e.g., mobilityControlInfo field or a reconfigurationWithSync field), which can include some or all of the random access configurations.

The DAPS handover configuration enables the UE 102 to use a DAPS (e.g., DAPS 200) to communicate with the S-BS 104 (using the updated S-BS configuration) and T-BS 106B (during and after a successful DAPS handover). As such, in response to receiving 318A the handover command message, the UE 102 and the S-BS 104 continue 320A communicating with each other using the updated S-BS configuration while the UE 102 attempts to handover to the T-BS 106B in accordance with the handover command message. In attempting to perform the DAPS handover, the UE 102 initiates 322A a random access procedure with the T-BS 106B via a target cell (e.g., PCell 126B) covered by the T-BS 106B, e.g., by using one or more random access configurations in the handover command message received 318A from the S-BS 104. After gaining access to a channel, the UE 102 transmits 324A a handover complete message to the T-BS 106B via the target cell during or after successfully completing the random access procedure. After the T-BS 106B identifies the UE 102 during the random access procedure, the UE 102 communicates 326A control signals and data (e.g., UL data PDUs or DL data PDUs) with the T-BS 106B via the target cell by using the DAPS handover configuration in or otherwise indicated in the handover command message. The DAPS handover configuration enables the UE 102 to continue communicating with the S-BS 104 while simultaneously communicating with the T-BS 106B.

In response to identifying the UE 102 during the random access procedure or receiving 324A the handover complete message, the T-BS 106B sends 328A a Handover Success message to the S-BS 104. After receiving the Handover Success message, the S-BS 104 stops 330A communicating with the UE 102. In some implementations, the S-BS 104 can transmit a sequence number (SN) Status Transfer message to the T-BS 106B in response to the Handover Success message. In some implementations, before or after transmitting the Handover Success message, the T-BS 106B can send an explicit stop indication message to the S-BS 104, which in turn can stop 330A communicating with the UE 102 in response to the explicit stop indication. In other implementations, the S-BS 104 stops 330A communicating with the UE 102 in response to generating the SN Status Transfer message. After receiving the SN Status Transfer message from the S-BS 104, the T-BS 106B can send a Context Release message to the S-BS 104 to release a UE Context of the UE 102.

As the UE 102 no longer needs to use the DAPS to continue communicating with the S-BS 104, the T-BS 106B can send 332A an RRC reconfiguration message that includes a DAPS release indicator to the UE 102, e.g., via the target cell, before transmitting 328A the Handover Success message, after transmitting 328A the Handover Success message, or simultaneously with the Handover Success message. In response to the RRC reconfiguration message, the UE 102 can transmit 334A an RRC reconfiguration complete message to the T-BS 106B and stop 336A communicating (i.e., UL and/or DL communication) with the S-BS 104. In some implementations, in response to the DAPS release indicator, a RF chip, receiver, or a transceiver of the UE 102 used to communicate with the S-BS 104 during the DAPS handover can enter into low power consumption mode, sleep mode, or be turned off entirely if the DAPS handover is an inter-frequency handover. The events 322A, 324A, 326A, 328A, 330A, 332A, 334A are collectively referred to in FIG. 3A as the DAPS handover and DAPS release procedure 350A.

In some implementations, the S-BS 104 determines to configure the UE 102 to release M cells according to a DAPS handover capability in a UE Capability information element (IE) of a message (e.g., in a UECapabilityInformation message) received from the UE 102, the CN 110 (e.g., via a S1 or NG interface message), or another base station (e.g., the base station 106A, the base station 106B, or other base station not shown in FIG. 1A) via an X2 or Xn interface. The S-BS 104 can include the UE Capability IE in the Handover Request message in event 312A so that the T-BS 106B is aware of the DAPS handover capability of the UE 102. The UE Capability IE can be a UE-NR-Capability IE as defined in 3GPP TS 38.331 or a UE-EUTRA-Capability IE as defined in 3GPP TS 36.331.

For example, if the DAPS handover capability indicates that the UE 102 is not capable of CA, the S-BS 104 can configure the UE 102 to release all SCells (i.e., N−1 SCells). In another example, if the DAPS handover capability indicates that the UE 102 is capable of communicating with the S-BS 104 using CA in N-P cells associated to one or more particular frequency bands during DAPS handover, where P is a whole number greater than or equal to 0 and less than or equal to M (i.e., $0 \leq P \leq M$), the S-BS 104 can configure the UE 102 to release M cells if N-M cells are associated to some or all of the one or more particular frequency bands. In yet another example, if the DAPS handover capability indicates that the UE 102 is not capable of DAPS handover, the S-BS 104 can perform a non-DAPS handover preparation procedure with the T-BS 106B. In such an example, instead of generating the handover command message that includes the DAPS handover configuration (or an indication for the DAPS handover configuration) at event 314A, the T-BS 106B generates a handover command message that excludes the DAPS handover configuration (or the indication for the DAPS handover configuration).

In other implementations, the S-BS 104 determines to configure the UE 102 to release N−1 cells if the S-BS 104 is unaware whether the UE 102 is capable of DAPS handover with CA. The S-BS 104 can ensure that the UE 102 can perform DAPS handover by releasing the N−1 cells.

Inter-Frequency DAPS Handover

In some implementations, the DAPS handover capability indicates that the UE 102 is capable of inter-frequency DAPS handover for one or more frequency bands. In one implementation, the DAPS handover capability can further specify that the UE 102 is capable of inter-frequency DAPS handover for frequency division duplex (FDD) and/or time division duplex (TDD) mode, using one or more indicators included in the DAPS handover capability. In another implementation, the UE Capability IE can specify that the UE 102 is capable of inter-frequency DAPS handover for FDD and/or TDD mode, using an inter-frequency handover capability field/IE included in the UE Capability IE. Therefore, the S-BS 104 or T-BS 106B can determine whether the UE 102 is capable of inter-frequency DAPS handover for one or more frequency bands, and if further specified, for FDD and/or TDD mode, according to the DAPS handover capability and/or the UE Capability IE. If the UE Capability IE does not include the DAPS handover capability, irrespective of including the inter-frequency handover capability field/IE, the S-BS 104 or T-BS 106B determines that the UE 102 is capable of the inter-frequency non-DAPS handover.

In some implementations, the UE Capability IE includes DC/CA band combination field(s)/IE(s) to indicate that the UE 102 is capable of performing CA on one or more bands (e.g., FDD band(s) only, TDD band(s) only, FDD band(s) and TDD band(s)). The CA band combination field(s)/IE(s) can designate respective CA band combination(s) (e.g., a first CA band combination and a second CA band combination), each CA band combination indicating the band(s). In one implementation, the DAPS handover capability can be included in the CA band combination field(s)/IE(s) to indicate that the UE 102 is capable of the inter-frequency DAPS handover associated to the CA band combination(s) indicated in the CA band combination field(s)/IE(s). Thus, support of the DAPS handover can be on a per CA band combination basis. For example, if the UE 102 supports DAPS handover associated to a first CA band combination but not a second CA band combination, the UE 102 includes the DAPS handover capability in a first CA band combination field/IE designating the first CA band combination, and excludes the DAPS handover capability in a second CA band combination field/IE designating the second CA band combination. Therefore, the S-BS 104 or T-BS 106B can determine whether the UE 102 is capable of inter-frequency DAPS handover according to the DAPS handover capability and the CA band combination field(s)/IE(s).

In an example scenario, cell 124 operates on a first DL carrier frequency and a first UL carrier frequency, and cell 126B operates on a second DL carrier frequency and a second UL carrier frequency. Cells 124 and 126B can be either FDD cells or TDD cells. As examples, if the first DL carrier frequency and the first UL carrier frequency belong to a TDD band (i.e., the cell 124 is a TDD cell), the first DL carrier frequency and the first UL carrier frequency are the same or overlapped carrier frequencies. If the first DL carrier frequency and the first UL carrier frequency belong to an FDD band (i.e., the cell 124 is an FDD cell), the DL carrier frequency and the UL carrier frequency are different carrier frequencies. If the second DL carrier frequency and the second UL carrier frequency belong to a TDD band (i.e., the cell 126B is a TDD cell), the second DL carrier frequency and the second UL carrier frequency are the same carrier frequency. If the second DL carrier frequency and the second UL carrier frequency belong to an FDD band (i.e., the cell 126B is an FDD cell), the second DL carrier frequency and the second UL carrier frequency are different carrier frequencies. If the UE 102 is capable of the inter-frequency DAPS handover, the S-BS 104 requests the T-BS 106B to configure cell 126B in the Handover Request message for the inter-frequency DAPS handover, and the T-BS 106B configures the cell 126B in the handover command message. Similarly, if the UE 102 is capable of the inter-frequency non-DAPS handover, the S-BS 104 requests the T-BS 106B to configure cell 126B in the Handover Request message for the inter-frequency non-DAPS handover, and the T-BS 106B configures the cell 126B in the handover command message.

FDD-TDD DAPS Handover

In some implementations, the DAPS handover capability indicates that the UE 102 is capable of FDD-TDD DAPS handover (i.e., DAPS handover from an FDD cell to a TDD cell and/or vice versa). In one implementation, the DAPS handover capability can further specify that the UE 102 is capable of FDD-TDD DAPS handover using one or more indicators included in the DAPS handover capability. For example, the DAPS handover capability can include a single indicator indicating that the UE 102 is capable of FDD-TDD DAPS handover from an FDD cell (in a specific or any FDD band supported by the UE 102) to a TDD cell (in a specific or any TDD band supported by the UE 102), and/or vice versa. In other implementations, an FDD-TDD handover capability field/IE included in the UE Capability IE can indicate that the UE 102 is capable of the FDD-TDD DAPS handover. The S-BS 104 or T-BS 106 can determine whether the UE 102 is capable of FDD-TDD DAPS handover according to the DAPS handover capability and/or the FDD-TDD handover capability field/IE. If the UE Capability IE does not include the DAPS handover capability, irrespective of including the FDD-TDD handover capability field/IE, the S-BS 104 or T-BS 106 determines that the UE 102 is capable of the FDD-TDD non-DAPS handover.

In an example scenario, one of the cells 124 and 126B is a TDD cell, and the other is an FDD cell. If the UE 102 is capable of the FDD-TDD DAPS handover, the S-BS 104 requests the T-BS 106B to configure cell 126B in the Handover Request message for the FDD-TDD DAPS handover, and the T-BS 106B configures the cell 126B in the handover command message. Similarly, if the UE 102 is capable of the FDD-TDD non-DAPS handover, the S-BS 104 requests the T-BS 106B to configure cell 126B in the Handover Request message for the FDD-TDD non-DAPS handover, and the T-BS 106B configures the cell 126B in the handover command message.

Intra-Frequency DAPS Handover

In some implementations, the DAPS handover capability indicates that the UE 102 is capable of intra-frequency DAPS handover for one or more frequency bands. In another implementation, the UE Capability IE can specify that the UE 102 is capable of intra-frequency DAPS handover, using an indication included in the UE Capability IE. Therefore, the S-BS 104 or T-BS 106B can determine whether the UE 102 is capable of intra-frequency DAPS handover according to the DAPS handover capability and/or the UE Capability IE. For example, if the UE Capability IE includes an indication that the UE 102 does not support the intra-frequency DAPS handover, or if the UE Capability IE does not include the DAPS handover capability, the S-BS 104 or T-BS 106 determines that the UE 102 is capable of intra-frequency non-DAPS handover. As another example, if the UE Capability IE includes the DAPS handover capability and an indication that the UE 102 supports intra-frequency DAPS handover, the S-BS 104 or T-BS 106B determines that the UE 102 is capable of the intra-frequency DAPS handover.

In an example scenario, cells 124 and 126B are either TDD cells or FDD cells and operate on the same or overlapped carrier frequencies. If the UE 102 is capable of the intra-frequency DAPS handover, the S-BS 104 can request the T-BS 106B to configure the cell 126B in the Handover Request message for the intra-frequency DAPS handover, and the T-BS 106B configures the cell 126B in the handover command message. Similarly, if the UE 102 is capable of the intra-frequency non-DAPS handover, the S-BS 104 requests the T-BS 106B to configure cell 126B in the Handover Request message for the intra-frequency non-DAPS handover, and the T-BS 106B configures the cell 126B in the handover command message.

Inter-RAT DAPS Handover

In some implementations, the DAPS handover capability indicates that the UE 102 is capable of inter-RAT DAPS handover using one or more indicators. For example, the DAPS handover capability can include a single indicator indicating that the UE 102 is capable of inter-RAT DAPS handover from a cell of a first RAT (or a cell in a specific band in the first RAT) to a cell of a second RAT (or a cell in a specific band in the second RAT). In other implementations, the UE Capability IE can specify that the UE 102 is capable of inter-RAT DAPS handover, using an inter-RAT handover capability field/IE included in the UE Capability IE that indicates that the UE 102 is capable of inter-RAT DAPS handover from a first RAT to a second RAT. Therefore, the S-BS 104 or T-BS 106 can determine whether the UE 102 is capable of inter-RAT DAPS handover according to the DAPS handover capability and/or the UE Capability IE. If the UE Capability IE does not include the DAPS handover capability, irrespective of including the inter-RAT handover capability field/IE, the S-BS 104 or T-BS 106 determines that the UE 102 is capable of the inter-RAT non-DAPS handover.

In an example scenario, cell 124 operates in the first RAT (e.g., EUTRA) and cell 126B operates in the second RAT (e.g., NR). If the UE 102 is capable of the inter-RAT DAPS handover, the S-BS 104 can request the T-BS 106B to configure the cell 126B in the Handover Request message for the inter-RAT DAPS handover, and the T-BS 106B configures the cell 126B in the handover command message. Similarly, if the UE 102 is capable of the inter-RAT non-DAPS handover, the S-BS 104 requests the T-BS 106B to configure cell 126B in the Handover Request message for the inter-RAT non-DAPS handover, and the T-BS 106B configures the cell 126B in the handover command message.

Synchronous or Asynchronous DAPS Handover

In some implementations, the DAPS handover capability indicates that the UE 102 is capable of synchronous DAPS handover, asynchronous DAPS handover, or both, using one or more indicators. For example, the DAPS handover capability can include a "synchronous" indicator or an "asynchronous" indicator indicating that the UE 102 is capable of synchronous or asynchronous DAPS handover, respectively. In another example, the DAPS handover capability can include the "synchronous" indicator indicating that the UE 102 is only capable of synchronous DAPS handover, or include the "asynchronous" indicator indicating that the UE 102 is capable of both synchronous DAPS handover and asynchronous DAPS handover.

The "synchronous" and/or "asynchronous" indicators can be generic for or associated to all types of DAPS handover discussed above (e.g., intra-frequency DAPS handover, inter-frequency DAPS handover, FDD-TDD DAPS handover, and/or inter-RAT DAPS handover) that the UE 102 supports. If the UE 102 only supports synchronous DAPS handover for all of the DAPS handover types that the UE supports (i.e., the UE 102 does not support asynchronous DAPS handover), and the S-BS 104 and T-BS 106B are asynchronous base stations, the S-BS 104 can send a Handover Request message to the T-BS 106B to request the T-BS 106B to prepare non-DAPS handover for the UE 102, and the T-BS 106B can configure the non-DAPS handover in the handover command message, in one implementation. In another implementation, the S-BS 104 can send a Handover Request message to the T-BS 106B to request the T-BS 106B to prepare DAPS handover for the UE 102, but the T-BS 106B can still configure the non-DAPS handover in the handover command message, and optionally notify the S-BS 104 of the non-DAPS handover for the UE 102. Otherwise, if the UE 102 supports asynchronous DAPS handover, the S-BS 104 can send a Handover Request message to the T-BS 106B to request the T-BS 106B to prepare DAPS handover for the UE 102.

In one scenario, the S-BS 104 determines that the T-BS 106B is an asynchronous base station and subsequently requests the T-BS 106B to prepare non-DAPS handover for a particular UE (e.g., UE 102) that only supports synchronous DAPS handover, and DAPS handover for a particular UE that only supports asynchronous DAPS handover. In another scenario, the T-BS 106B determines that the S-BS 104 is an asynchronous base station and subsequently prepares non-DAPS handover for a particular UE that only supports synchronous DAPS handover, and DAPS handover for a particular UE that only supports asynchronous DAPS handover. In either scenario, the T-BS 106B can determine whether the UE supports synchronous DAPS handover and/or asynchronous DAPS handover based on a DAPS capability in a UE Capability IE of the particular UE received from the S-BS 104.

Alternatively, the "synchronous" and/or "asynchronous" indicators can be specific for or associated to a particular type of DAPS handover discussed above that the UE 102 supports. For example, if the UE 102 supports inter-frequency DAPS handover and FDD-TDD DAPS handover, the UE 102 indicates first "synchronous" and/or "asynchronous" indicators for the inter-frequency DAPS handover and second "synchronous" and/or "asynchronous" indicators for the FDD-TDD DAPS handover. If the UE 102 only supports synchronous DAPS handover for a specific DAPS handover type, and the S-BS 104 and the T-BS 106B are asynchronous base stations that support the specific DAPS handover type, the S-BS 104 can send a Handover Request message to the T-BS 106B to request the T-BS 106B to prepare non-DAPS handover for the UE 102, in one implementation. In another implementation, the S-BS 104 can send a Handover Request message to the T-BS 106B to request the T-BS 106B to prepare DAPS handover for the UE 102, but the T-BS 106B can still configure the non-DAPS handover in the handover command message, and optionally notify the S-BS 104 of the non-DAPS handover for the UE 102.

In some implementations, the RRC reconfiguration procedure (i.e., events 306A, 308A, 309A, 310A) and the DAPS handover preparation procedure (e.g., events 312A, 314A, 316A) can be performed in parallel, or in sequence. For example, the S-BS 104 sends 312A the Handover Request message before or after transmitting 306A the RRC reconfiguration message or receiving 310A the RRC reconfiguration complete message, in one implementation. In another implementation, the S-BS 104 sends 312A the Handover Request message and sends 306A the RRC reconfiguration message at the same time.

In one implementation, the UE 102 stops transmitting and retransmitting UL data PDUs and/or control signals on PUCCH(s) to the S-BS 104 after successfully completing 322A the random access procedure. In another implementation, the UE 102 stops transmitting new UL data PDUs to the S-BS 104 but continues to retransmit UL data PDU(s) to the S-BS 104 if requested by the S-BS 104 after successfully completing 322A the random access procedure, until event 336A occurs. In such implementations, the UE 102 can continue DL communication (i.e., receiving control signals, reference signals, DL PDUs, etc.) with the S-BS 104 and/or transmit control signals (e.g., HARQ acknowledgement, HARQ negative acknowledgement and/or channel state information) on PUCCH(s) to the S-BS 104 until event 332A occurs or a DAPS release timer at the UE 102 expires. In one implementation, the T-BS 106B configures a time value for the DAPS release timer in the handover command message or the RRC reconfiguration message in event 332A. Upon receiving 318A the handover command message or receiving 332A the RRC reconfiguration message, the UE 102 starts the DAPS release timer. If the DAPS release timer expires, the UE 102 stops 336A communicating with the S-BS 104. Alternatively, the UE 102 uses a predetermined timer value if the T-BS 106B does not include the timer value in the handover command message or the RRC reconfiguration message. The T-BS 106B can include a timer value in the Handover Success message, which can be the same timer value in the RRC reconfiguration message in event 332A or larger than the timer value in the handover command message in event 318A.

In some implementations and scenarios, the UE 102 exchanges RRC message with the S-BS 104 via SRB(s) (e.g., SRB1, SRB2 and/or SRB4) using the updated S-BS configuration before receiving the handover command message. The S-BS 104 can also include a DRB configuration in the updated S-BS configuration. The T-BS 106B includes multiple configuration parameters in the handover command message to configure radio resources for the UE 102 to communicate with the T-BS 106B via target PCell 126B. The multiple configuration parameters can configure zero, one, or more radio bearers, including SRB(s) (e.g., SRB1, SRB2 and/or SRB4) and/or DRB(s). The UE 102 can exchange RRC messages with the T-BS 106B via the SRB(s) (i.e., SRB(s) for the target). The T-BS 106B can associate or otherwise specify the DAPS handover configuration to a radio bearer (e.g., DRB), such as by including the DAPS handover configuration in a DRB configuration (e.g., DRB-ToAddMod IE) in the handover command message. After the UE 102 receives the handover command message and while the UE 102 is performing the DAPS procedure, the UE 102 suspends the SRB(s) with the S-BS 104 (i.e., SRB(s) for the source). If the UE 102 fails the random access procedure at event 322A, the UE 102 can perform a RRC connection reestablishment procedure with the S-BS 104 or the T-BS 106B. The UE 102 resumes one or all of the SRB(s) associated with the S-BS 104 in response to the RRC connection reestablishment procedure. The SRB(s) associated with the S-BS 104 and the SRB(s) associated with the T-BS 106B can be the same or different instances. If the SRBs are different instances, the UE 102 releases the SRB(s) associated with the T-BS 106B in response to the RRC connection reestablishment procedure. If the SRBs are different instances, the UE 102 releases the SRB(s) associated with the S-BS 104 after or in response to the success completion of the random access procedure or the DAPS release at event 332A.

In some implementations, the T-BS 106B can configure SCell(s) of the T-BS 106B in the multiple configuration parameters in the handover command message to configure radio resources for the UE 102 to communicate with the T-BS 106B via the SCell(s). In one such implementation, the T-BS 106B can include one or more SCell configurations configuring the SCell(s) and their states in the handover command message, and the UE 102 can determine the states of the SCell(s) according to the one or more SCell configurations. Particularly, the T-BS 106B can configure the SCell(s) to first be in deactivated state(s) while the UE 102 performs the DAPS procedure, and then transition to activated state(s) after releasing the DAPS at event 332A. The T-BS 106B can transmit RRC message(s), MAC control element(s), or downlink control information (DCI) command(s) to the UE 102 to configure the SCell(s) to be in activated state(s).

In some implementations, while performing the DAPS procedure, the UE 102 keeps an SCell of the S-BS 104 in activated state if the SCell is among the N-M cells, e.g., not released at event 306A. The UE 102 can release the SCell of the S-BS 104 in response to the DAPS release at event 332A.

In other implementations, the T-BS 106B can include a release indication of the SCell of the S-BS 104 in the handover command message that is transmitted to the UE 102, and the UE 102 does not release the SCell in response to the handover command message, and instead releases the SCell in response to the DAPS release at event 332A. In yet other implementations, the T-BS 106B can include a release indication of the SCell of the S-BS 104 in the RRC reconfiguration message at event 332A, and the UE 102 does not release the SCell of the S-BS 104 in response to the handover command message, and instead releases the SCell in response to the release indication.

In some implementations, the T-BS 106B may not configure an SCell to the UE 102 in the handover command message. The T-BS 106B can later transmit RRC reconfiguration message(s) to the UE 102 to configure SCell(s) of the T-BS 106B. In response, the UE 102 can transmit an RRC reconfiguration complete message to the T-BS 106B via the target PCell 126B or a configured SCell for each of the RRC reconfiguration message(s).

In some implementations, the S-BS 104 transmits the updated S-BS configuration in a Handover Request message to the T-BS 106B, so that the T-BS 106B is aware of any pre-existing configurations known by the UE 102 to determine additional configuration(s) the UE 102 may still need to handover from the S-BS 104 to the T-BS 106B and communicate with the T-BS 106B after the handover. In one implementation, the S-BS 104 includes the updated S-BS configuration in a HandoverPreparationInformation IE (or RRC inter-node message), and includes the HandoverPreparationInformation IE in the Handover Request message. In another implementation, the S-BS 104 includes the updated S-BS configuration in an RRC message (e.g., RRC reconfiguration message), includes the RRC message in a HandoverPreparationInformation IE, and then includes the HandoverPreparationInformation IE in the Handover Request message. If the T-BS 106B determines that configuration(s) in addition to the updated S-BS configuration are needed by the UE 102, the T-BS 106B can include the additional configuration(s) in the handover command message.

In some implementations, the updated S-BS configuration can include a CellGroupConfig IE that configures the PCell 124 and can configure zero, one, or more SCells of the S-BS 104. The updated S-BS configuration can be an RRCReconfiguration message, RRCReconfiguration-IEs, or the CellGroupConfig IE conforming to 3GPP TS 38.331, or an RRCConnectionReconfiguration message or RRCConnectionReconfiguration-IEs conforming to 3GPP TS 36.331. In some implementations, the updated S-BS configuration can include configurations in the CellGroupConfig IE, RRCReconfiguration-IEs or RRCConnectionReconfiguration-IEs.

In some implementations, the S-BS 104 consists of CU 172 and one or more DUs 174 as shown in FIG. 1B. The DU(s) 174 can generate the S-BS configuration or at least a portion of the S-BS configuration, and send the S-BS configuration (or portion) to the CU 172. The CU 172 can generate the remainder of the S-BS configuration if the DU 174 only generated a portion of the S-BS configuration. The DU(s) 174 can communicate with the UE 102 via the portion of the S-BS configuration, and the CU 172 can communicate with the UE 102 via the remainder of the S-BS configuration, in one implementation. For example, the S-BS configuration (or portion) generated by the DU 174 can include the one or more random access configurations, a physical downlink control channel (PDCCH) configuration, physical uplink control channel (PUCCH) configuration, etc. The remainder of the S-BS configuration generated by the CU 172 can include an SRB configuration, a DRB configuration, a security configuration, and/or a measurement configuration. In other implementations, the DU 174 can include a cell group configuration (e.g., CellGroupConfig IE) in the S-BS configuration, and the CU 172 can include a radio bearer configuration (RadioBearerConfig IE) in the S-BS configuration. The DU(s) 174 can include one or more configuration parameters to update the S-BS configuration in the RRC reconfiguration message, so that the DU(s) 174 and the UE 102 can continue communicating with each other by using the updated S-BS configuration (e.g., at event 309A). The DU(s) 174 can send the one or more configuration parameters to the CU 172.

In some implementations, the T-BS 106 consists of CU 172 and one or more DUs 174 as shown in FIG. 1B. The UE 102 can perform 322A the random access procedure with at least one of the DU(s) 174. The DU 174 can include some configurations (e.g., one or more random access configurations, a physical downlink control channel (PDCCH) configuration, physical uplink control channel (PUCCH) configuration) in the handover command message and send the configurations to the CU 172. The CU 172 can include other configurations (e.g., an SRB configuration, a DRB configuration, a security configuration and/or a measurement configuration) in the handover command message. In other implementations, the DU 174 can include a cell group configuration (e.g., CellGroupConfig IE) in the handover command message, and the CU 172 can include a radio bearer configuration (e.g., RadioBearerConfig IE) in the handover command message.

In some implementations, if the S-BS 104 is a gNB, the handover command message can be an RRCReconfiguration message, the S-BS configuration can be an RRCReconfiguration-IEs as defined in 3GPP TS 38.331, the handover complete message can be an RRCReconfigurationComplete message, and the RRC reconfiguration message and the RRC reconfiguration complete message can be an RRCReconfiguration message and an RRCReconfigurationComplete message, respectively.

In some implementations, if the S-BS 104 is an eNB or an ng-eNB, the handover command message can be an RRCConnectionReconfiguration message, the S-BS configuration can be an RRCConnectionReconfiguration-r8-IEs as defined in 3GPP TS 36.331, the handover complete message can be an RRCConnectionReconfigurationComplete message, and the RRC reconfiguration message and the RRC reconfiguration complete message can be an RRCConnectionReconfiguration message and an RRCConnectionReconfigurationComplete message, respectively.

In some implementations, the S-BS 104 can combine the RRC reconfiguration message (at event 306A) and the handover command message (at event 318A) into an RRC message. For example, the S-BS 104 can generate an RRC message (e.g., an RRC reconfiguration message) for releasing the M cells that includes the handover command message, and transmit the RRC message to the UE 102 at event 318A. The S-BS 104 can include the handover command message in a DAPS handover related field/IE. The handover command message may or may not include a DAPS handover related field/IE to indicate the DAPS handover. If the RRC message is an RRC reconfiguration message, the UE 102 need not transmit an RRC reconfiguration complete message to the S-BS 104 in response to the RRC reconfiguration message. If the RRC message and the handover command message are RRC reconfiguration messages, the UE 102 can include a transaction identifier in the handover complete message (i.e., a RRC reconfiguration complete message) and set the transaction identifier to a value identical to the value of a transaction identifier in the handover command message rather than to a value of a transaction identifier in the RRC message. Accordingly, the RRC message and the handover command message may have different transaction identifier values, and therefore the T-BS 106B can determine that the handover complete message is associated to the handover command message based on the identical transaction identifiers.

Figure 3B:
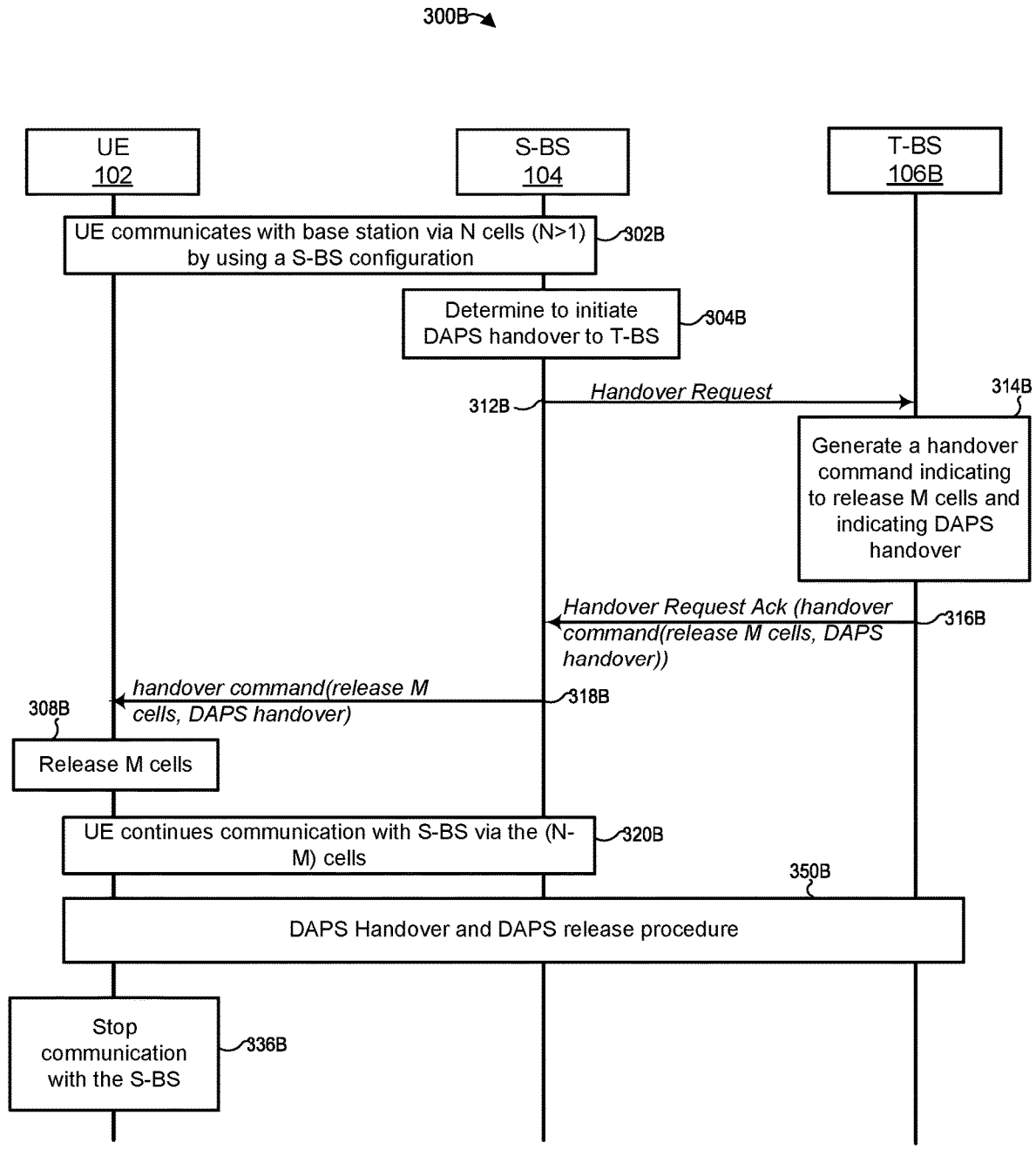

In FIG. 3B, in a DAPS handover scenario 300B, the base station 104 operates as an S-BS for the UE 102, and the base station 106B operates as a T-BS for the UE 102.

Initially, the UE 102 communicates 302B data with the S-BS 104 using an S-BS configuration, similar to event 302A. Later in time, the S-BS 104 determines 304B to initiate DAPS handover for the T-BS 106B and the UE 102 to communicate, similar to event 304A.

Whereas in FIG. 3A the S-BS 104 determines that the UE 102 release 308A M cells by transmitting 306A an RRC reconfiguration message to the UE 102 in response to the determination 304A, in FIG. 3B the T-BS 106B determines that the UE 102 release 308B M cells. Particularly, the S-BS 104 sends 312B a Handover Request message to the T-BS 106B in response to the determination 304B. In response to the Handover Request message, the T-BS 106B generates 314B a handover command message, similar to event 314A, with an additional indication to release M cells. In some implementations, in response to receiving the Handover Request message, the T-BS 106B determines that the UE 102 release M cells, either as a default, or in view of an S-BS configuration received from the S-BS 104 in the Handover Request message.

The T-BS 106B then sends 316B the handover command message in a Handover Request Acknowledge message to the S-BS 104, similar to event 316A. In turn, the S-BS 104 transmits 318B the handover command message to the UE 102, similar to event 318A. In response to the handover command message, the UE 102 releases 308B the M cells, similar to event 308A. In releasing 308B the M cells, the UE 102 and the S-BS 104 update the S-BS configuration by excluding configurations relevant to the released M cells.

In response to receiving 318B the handover command message, the UE 102 and the S-BS 104 continue 320B communicating with each other using the updated S-BS configuration while the UE 102 attempts to handover to the T-BS 106B in accordance with the handover command message, similar to event 320A. Subsequently, the UE 102, S-BS 104, and T-BS 106B collectively perform a DAPS handover and DAPS release procedure 350B, similar to procedure 350A. As a result, the UE 102 stops 336B communicating with the S-BS 104, similar to event 336A.

In some implementations, the S-BS 104 can include a configuration for releasing the M cells in the Handover Request message, and the T-BS 106B can include the configuration in the handover command message. In other implementations, the T-BS 106 can generate a configuration for releasing the M cells, and include the configuration in the handover command message.

Figure 3C:
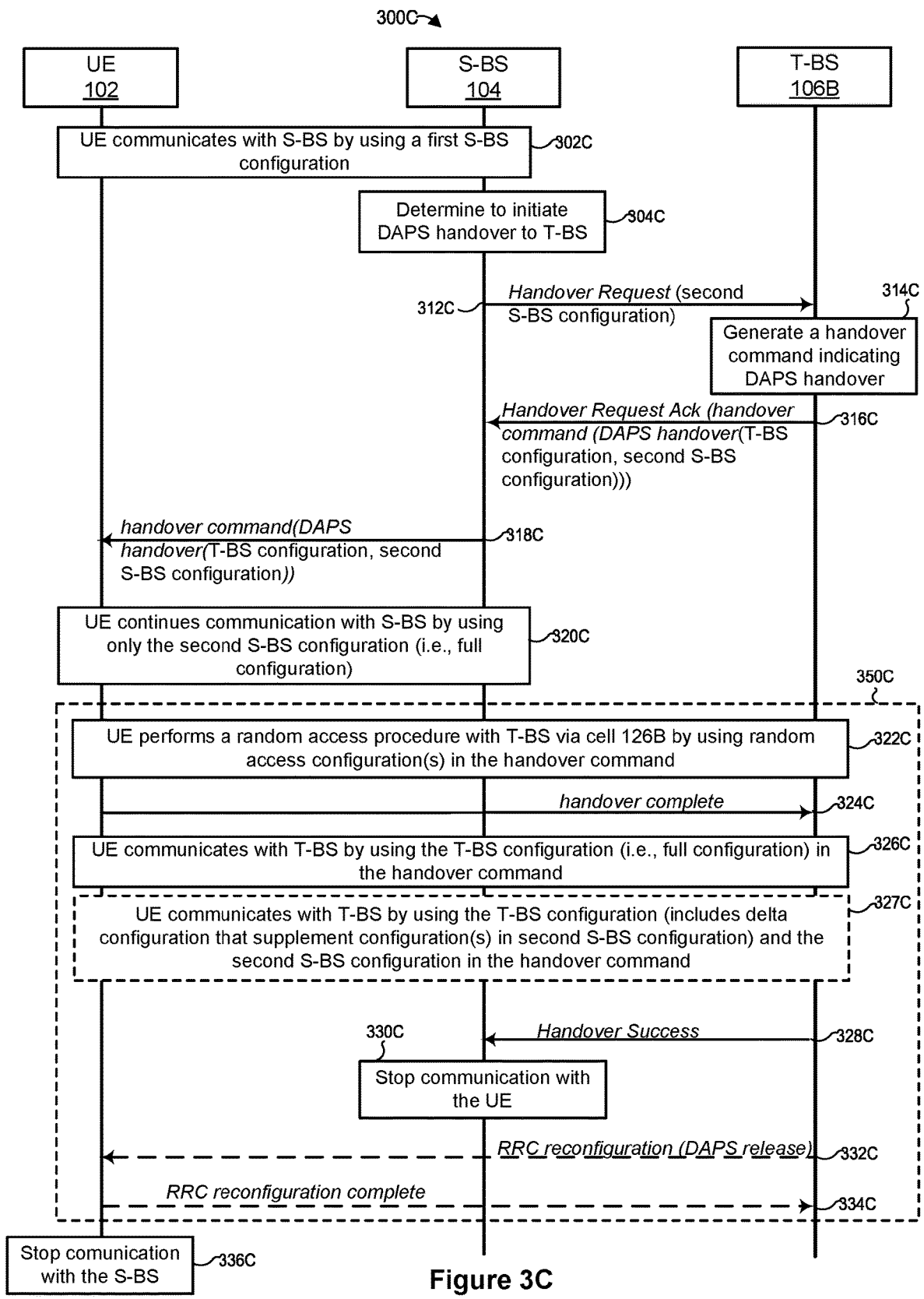
FIGS. 3C through 3E are messaging diagrams of example scenarios in which a RAN prepares a DAPS handover procedure for a UE by providing full or delta configurations to the UE prior to the UE performing DAPS handover to a target base station of the RAN.

In FIG. 3C, in a DAPS handover scenario 300C, the base station 104 operates as an S-BS for the UE 102, and the base station 106B operates as a T-BS for the UE 102.

Initially, the UE 102 communicates 302C data with the S-BS 104 using a first S-BS configuration, similar to event 302A. Later in time, the S-BS 104 determines 304C to initiate DAPS handover for the T-BS 106B and the UE 102 to communicate, similar to event 304A.

In response to the determination 304C, the S-BS 104 sends 312C a Handover Request message, including a second S-BS configuration, to the T-BS 106B. The second S-BS configuration is a complete and self-contained configuration (i.e. a full configuration). In response to the Handover Request message, the T-BS 106B generates 314C a handover command message, including the second S-BS configuration and a T-BS configuration. In some implementations, the S-BS 104 can include the second S-BS configuration in a HandoverPreparationInformation IE in the Handover Request message. In other implementations, the S-BS 104 can include the second S-BS configuration in a container field/IE in the Handover Request message. In some implementations, the second S-BS configuration can be formatted to be a RRCReconfiguration message or the S-BS 104 generates a RRCReconfiguration message including the second S-BS configuration and includes the RRCReconfiguration message in the Handover Request message. In other implementations, the second S-BS configuration can be formatted to be a field/IE (e.g., a dapsConfig field, a dapsHO-Config field, a daps-HO field or a daps-HO-Config field). In yet other implementations, the T-BS 106B includes the second S-BS configuration in a field/IE (e.g., a dapsConfig field, a dapsHO-Config field, a daps-HO field or a daps-HO-Config field) in the handover command message.

The T-BS 106B then sends 316C the handover command message in a Handover Request Acknowledge message to the S-BS 104. In turn, the S-BS 104 transmits 318C the handover command message to the UE 102. In some implementations, the S-BS 104 can generate an RRC reconfiguration message including the handover command message, and transmit the RRC reconfiguration message to the UE 102.

In alternative implementations for event 312C, the S-BS 104 does not include the second S-BS configuration in the Handover Request message. Thus, the T-BS 106B does not include the second S-BS configuration in the handover command message. The S-BS 104 generates an RRC message (e.g., an RRC reconfiguration message) including the second S-BS configuration and the handover command message and transmit the RRC message to the UE 102 at event 318C.

In response to receiving 318C the handover command message, the UE 102 and the S-BS 104 continue 320C communicating with each other using only the second S-BS configuration, while the UE 102 attempts to handover to the T-BS 106B in accordance with the handover command message. In attempting to perform the DAPS handover, the UE 102 initiates 322C a random access procedure with the T-BS 106B via a target cell (e.g., PCell 126B) covered by the T-BS 106B, e.g., by using one or more random access configurations in the handover command message received 318C from the S-BS 104. After gaining access to a channel, the UE 102 transmits 324C a handover complete message to the T-BS 106B via the target cell during or after successfully completing the random access procedure. After the T-BS 106B identifies the UE 102 during the random access procedure, the UE 102 communicates 326C control signals and data (e.g., UL data PDUs or DL data PDUs) with the T-BS 106B via the target cell by using only the T-BS configuration if the T-BS configuration is a full configuration. Alternatively, if the T-BS configuration includes a delta configuration (i.e., one or more configurations that supplement configuration(s) included in the second S-BS configuration), the UE 102 communicates 327C control signals and data with the T-BS 106B via the target cell by using both the T-BS configuration together with the second S-BS configuration.

In response to identifying the UE 102 during the random access procedure or receiving 324C the handover complete message, the T-BS 106B sends 328C a Handover Success message to the S-BS 104, similar to event 328A. After receiving the Handover Success message, the S-BS 104 stops 330C communicating with the UE 102, similar to event 330A.

As the UE 102 no longer needs to use the DAPS to continue communicating with the S-BS 104, the T-BS 106B can send 332C an RRC reconfiguration message, similar to event 332A. In response to the RRC reconfiguration message, the UE 102 can transmit 334C an RRC reconfiguration complete message to the T-BS 106B and stop 336C communicating with the S-BS 104, similar to events 334A and 336A, respectively. The events 322C, 324C, 326C, 327C, 328C, 330C, 332C, 334C are collectively referred to in FIG. 3C as the DAPS handover and DAPS release procedure 350C.

Figure 3D:
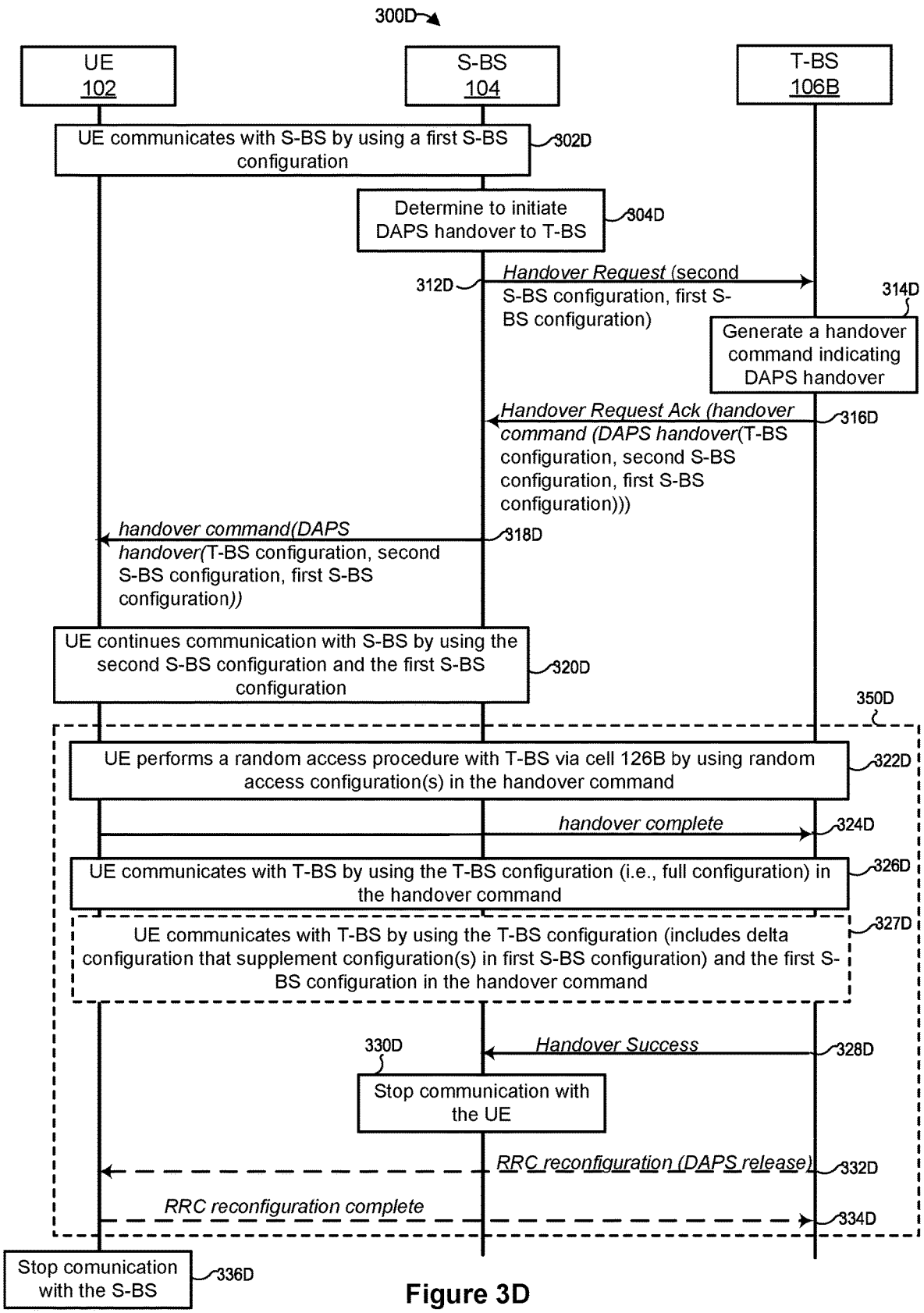

In FIG. 3D, in a DAPS handover scenario 300D, the base station 104 operates as an S-BS for the UE 102, and the base station 106B operates as a T-BS for the UE 102.

Initially, the UE 102 communicates 302D data with the S-BS 104 using a first S-BS configuration, similar to event 302A. Later in time, the S-BS 104 determines 304D to initiate DAPS handover for the T-BS 106B and the UE 102 to communicate, similar to event 304A.

In response to the determination 304D, the S-BS 104 sends 312D a Handover Request message, including a second S-BS configuration, to the T-BS 106B. Whereas the second S-BS configuration is a full configuration in FIG. 3C, in FIG. 3D the second S-BS configuration is a delta configuration (i.e., one or more configurations that supplement configuration(s) included in the first S-BS configuration). Accordingly, the S-BS 104 includes the first S-BS configuration in the Handover Request message. In response to the Handover Request message, the T-BS 106B generates 314D a handover command message, including the second S-BS configuration and a T-BS configuration.

In some implementations, the S-BS 104 can include the first S-BS configuration in a HandoverPreparationInformation IE in the Handover Request message. In some implementations, the S-BS 104 can include the second S-BS configuration in a HandoverPreparationInformation IE in the Handover Request message. In other implementations, the S-BS 104 can include the second S-BS configuration in a container field/IE in the Handover Request message. In some implementations, the second S-BS configuration can be formatted to be a RRCReconfiguration message or the S-BS 104 generates a RRCReconfiguration message including the second S-BS configuration and includes the RRCReconfiguration message in the Handover Request message. In other implementations, the second S-BS configuration can be formatted to be a field/IE (e.g., a dapsConfig field, a dapsHO-Config field, a daps-HO field or a daps-HO-Config field). In yet other implementations, the T-BS 106B includes the second S-BS configuration in a field/IE (e.g., a dapsConfig field, a dapsHO-Config field, a daps-HO field or a daps-HO-Config field) in the handover command message.

The T-BS 106B then sends 316D the handover command message in a Handover Request Acknowledge message to the S-BS 104. In turn, the S-BS 104 transmits 318D the handover command message to the UE 102. In some implementations, the S-BS 104 can generate an RRC reconfiguration message including the handover command message, and transmit the RRC reconfiguration message to the UE 102.

In alternative implementations for event 312D, the S-BS 104 does not include the second S-BS configuration in the Handover Request message. Thus, the T-BS 106B does not include the second S-BS configuration in the handover command message. The S-BS 104 generates an RRC message (e.g., an RRC reconfiguration message) including the second S-BS configuration and the handover command message and transmit the RRC message to the UE 102 at event 318D.

In response to receiving 318D the handover command message, the UE 102 and the S-BS 104 continue 320D communicating with each other using both the first S-BS configuration and the second S-BS configuration, while the UE 102 attempts to handover to the T-BS 106B in accordance with the handover command message. In attempting to perform the DAPS handover, the UE 102 initiates 322D a random access procedure with the T-BS 106B via a target cell (e.g., PCell 126B) covered by the T-BS 106B, e.g., by using one or more random access configurations in the handover command message received 318D from the S-BS 104. After gaining access to a channel, the UE 102 transmits 324D a handover complete message to the T-BS 106B via the target cell during or after successfully completing the random access procedure. After the T-BS 106B identifies the UE 102 during the random access procedure, the UE 102 communicates 326D control signals and data (e.g., UL data PDUs or DL data PDUs) with the T-BS 106B via the target cell by using only the T-BS configuration if the T-BS configuration is a full configuration. Alternatively, if the T-BS configuration includes a delta configuration (i.e., one or more configurations that supplement configuration(s) included in the first S-BS configuration), the UE 102 communicates 327D control signals and data with the T-BS 106B via the target cell by using both the T-BS configuration together with the first S-BS configuration.

In one implementation, the T-BS 106B may generate the T-BS configuration on top of the first S-BS configuration. That is, the target configuration includes a "delta" configuration, or one or more configurations that supplement configuration(s) included in the first S-BS configuration. The UE 102 in this case uses the T-BS configuration together with some or all configurations in the first S-BS configuration to communicate with the T-BS 106B during and/or after the DAPS handover. The T-BS 106B in this case uses the T-BS configuration together with the first S-BS configuration to communicate with UE 102 and/or after the DAPS handover. In another implementation, the T-BS 106 obtains a combined S-BS configuration by updating the first S-BS configuration with the second S-BS configuration if the base station 104 includes the second S-BS configuration in the Handover Request message. Alternatively, the T-BS 106B obtains the combined S-BS configuration from the S-BS 104 if the S-BS 104 includes the combined S-BS configuration in the Handover Request message. In this alternative, the S-BS 104 may not include the first S-BS configuration in the Handover Request message. Then the T-BS 106B can generate the T-BS configuration on top of the combined S-BS configuration. That is, the T-BS configuration includes a "delta" configuration, or one or more configurations that supplement configuration(s) in the combined S-BS configuration. The UE 102 in this case also obtains a combined S-BS configuration by updating the first S-BS configuration with the second S-BS configuration and generates the T-BS configuration on top of the combined S-BS configuration.

The UE 102 uses the T-BS configuration together with some or all configurations in the combined S-BS configuration to communicate with the T-BS 106B during and/or after the DAPS handover. The T-BS 106 in this case uses the target configuration together with the combined S-BS configuration to communicate with UE 102 and/or after the DAPS handover.

In response to identifying the UE 102 during the random access procedure or receiving 324D the handover complete message, the T-BS 106B sends 328D a Handover Success message to the S-BS 104, similar to event 328A. After receiving the Handover Success message, the S-BS 104 stops 330D communicating with the UE 102, similar to event 330A.

As the UE 102 no longer needs to use the DAPS to continue communicating with the S-BS 104, the T-BS 106B can send 332D an RRC reconfiguration message, similar to event 332A. In response to the RRC reconfiguration message, the UE 102 can transmit 334D an RRC reconfiguration complete message to the T-BS 106B and stop 336D communicating with the S-BS 104, similar to events 334A and 336A, respectively. The events 322D, 324D, 326D, 327D, 328D, 330D, 332D, 334D are collectively referred to in FIG. 3D as the DAPS handover and DAPS release procedure 350D.

In some implementations of scenarios 300C or 300D, the S-BS 104 does not transmit the second S-BS configuration to the UE 102. In such implementations, the S-BS 104 generates an RRC reconfiguration message including the handover command message excluding the second S-BS configuration and transmits the RRC reconfiguration message to the UE 102. During DAPS handover, the UE 102 uses the first S-BS configuration to communicate with the S-BS 104 while communicating with the T-BS 106B by using the T-BS configuration. After the DAS handover, the UE 102 communicates with the T-BS 106B by using the T-BS configuration. The T-BS configuration can be a complete and self-contained configuration or include a "delta" configuration, or one or more configurations that supplement configuration(s) included in the first S-BS configuration, as similarly described above. In these implementations, the T-BS 106B may indicate the DAPS handover to the UE 102 by including a DAPS handover related field or information element (IE) in the handover command message or in the RRC reconfiguration message.

Figure 3E:
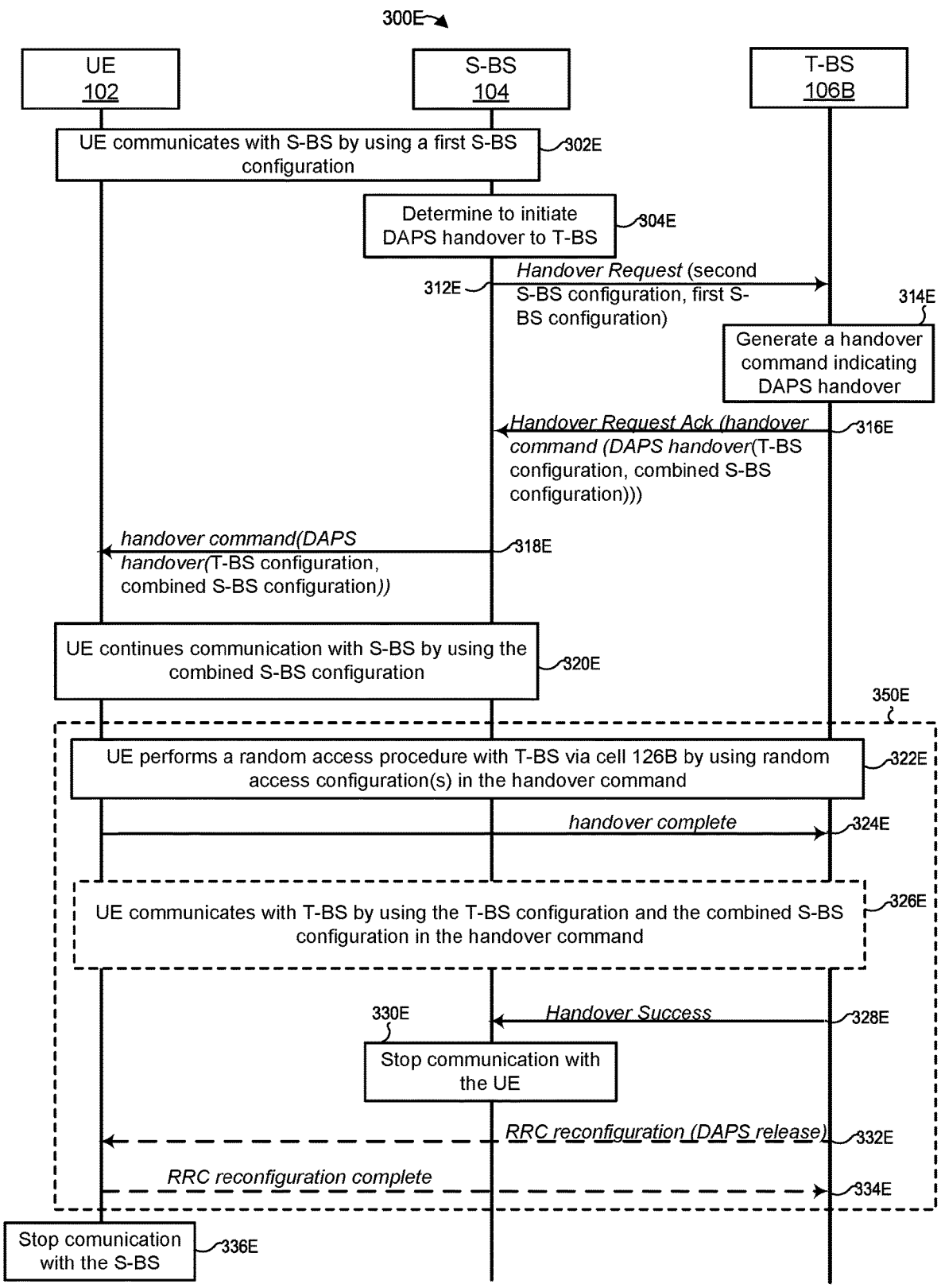

In FIG. 3E, in a DAPS handover scenario 300E, the base station 104 operates as an S-BS for the UE 102, and the base station 106B operates as a T-BS for the UE 102.

Initially, the UE 102 communicates 302E data with the S-BS 104 using a first S-BS configuration, similar to event 302A. Later in time, the S-BS 104 determines 304E to initiate DAPS handover for the T-BS 106B and the UE 102 to communicate, similar to event 304A.

In response to the determination 304E, the S-BS 104 sends 312E a Handover Request message, including the first S-BS configuration and a second S-BS configuration, to the T-BS 106B, similar to event 312D. In response to the Handover Request message, the T-BS 106B generates 314E a combined S-BS configuration by updating the first S-BS configuration with the second S-BS configuration, and includes the combined S-BS configuration, along with a T-BS configuration, in a handover command message. The T-BS configuration includes a "delta" configuration (i.e., one or more configurations that supplement configuration(s) included in the combined S-BS configuration). Alternatively, the S-BS 104 generates the combined S-BS configuration and includes the combined S-BS configuration in the Handover Request message.

The T-BS 106B then sends 316E the handover command message in a Handover Request Acknowledge message to the S-BS 104. In turn, the S-BS 104 transmits 318E the handover command message to the UE 102. In some implementations, the S-BS 104 can generate an RRC reconfiguration message including the handover command message, and transmit the RRC reconfiguration message to the UE 102.

In response to receiving 318E the handover command message, the UE 102 and the S-BS 104 continue 320E communicating with each other using the combined S-BS configuration, while the UE 102 attempts to handover to the T-BS 106B in accordance with the handover command message. In attempting to perform the DAPS handover, the UE 102 initiates 322E a random access procedure with the T-BS 106B via a target cell (e.g., PCell 126B) covered by the T-BS 106B, e.g., by using one or more random access configurations in the handover command message received 318E from the S-BS 104. After gaining access to a channel, the UE 102 transmits 324E a handover complete message to the T-BS 106B via the target cell during or after successfully completing the random access procedure. After the T-BS 106B identifies the UE 102 during the random access procedure, the UE 102 communicates 326E control signals and data (e.g., UL data PDUs or DL data PDUs) with the T-BS 106B via the target cell by using both the T-BS configuration and the combined S-BS configuration.

In response to identifying the UE 102 during the random access procedure or receiving 324E the handover complete message, the T-BS 106B sends 328E a Handover Success message to the S-BS 104, similar to event 328A. After receiving the Handover Success message, the S-BS 104 stops 330E communicating with the UE 102, similar to event 330A.

As the UE 102 no longer needs to use the DAPS to continue communicating with the S-BS 104, the T-BS 106B can send 332E an RRC reconfiguration message, similar to event 332A. In response to the RRC reconfiguration message, the UE 102 can transmit 334E an RRC reconfiguration complete message to the T-BS 106B and stop 336E communicating with the S-BS 104, similar to events 334A and 336A, respectively. The events 322E, 324E, 326E, 328E, 330E, 332E, 334E are collectively referred to in FIG. 3E as the DAPS handover and DAPS release procedure 350E.

In some implementations of scenarios 300C, 300D, or 300E, the T-BS 106B can indicate the DAPS handover to the UE 102 by including a DAPS handover related field or information element (IE) in the handover command message. For example, the T-BS 106B can include the second S-BS configuration in a DAPS related field or IE in the handover command message. In other implementations, the S-BS 104 can indicate the DAPS handover to the UE 102 by including DAPS handover related field or information element (IE) in the RRC reconfiguration message including the handover command message. For example, the S-BS 104 can include the handover command message in a DAPS handover related field or IE in the RRC reconfiguration message. In these implementations, the UE 102 need not transmit an RRC reconfiguration complete message to the S-BS 104 in response to the RRC reconfiguration message. The handover command message can be an RRC reconfiguration message and the UE 102 can transmit an RRC reconfiguration complete message to the T-BS 106B in response to the handover command message. The UE 102 can include a transaction identifier in the RRC reconfiguration complete message and set the transaction identifier to a value of a transaction identifier in the handover command message instead of to a value of a transaction identifier in the RRC reconfiguration message generated by the S-BS 104, so that the T-BS 106B can determine that the RRC reconfiguration complete message is associated with the handover command message. The RRC reconfiguration message generated by the S-BS 104 and the RRC reconfiguration complete message generated by the T-BS 106B can have transaction identifiers with different values.

Figure 4A:
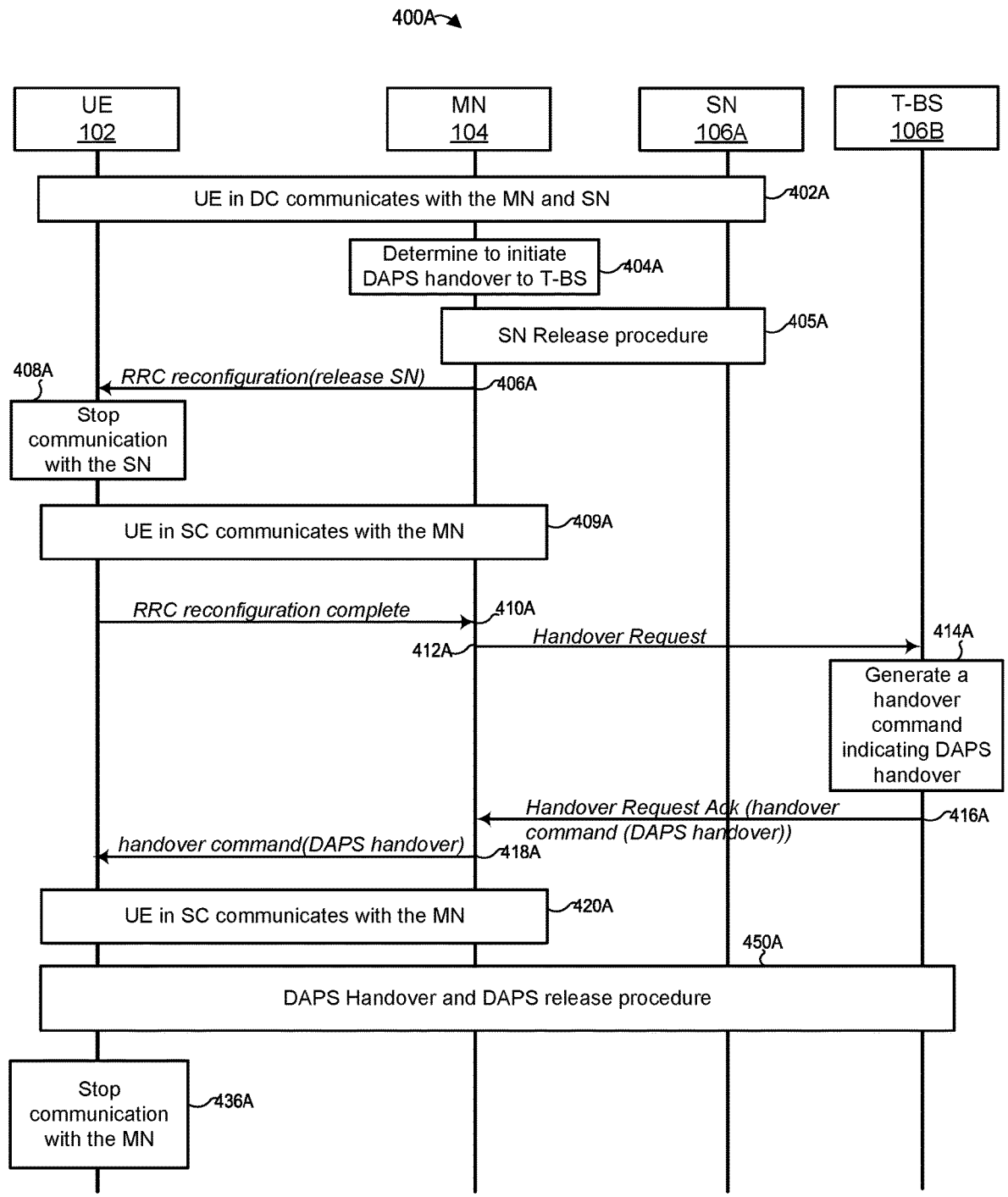
FIGS. 4A and 4B are messaging diagrams of example scenarios in which a RAN prepares a DAPS handover procedure for a UE by releasing a source SN of the RAN prior to the UE performing DAPS handover to a target SN of the RAN.

In FIG. 4A, in a DAPS handover scenario 400A, the base station 104 operates as an MN for the UE 102, the base station 106A operates as an SN for the UE 102, and the base station 106B operates as a T-BS for the UE 102.

Initially, the UE 102 in DC communicates 402A data (e.g., UL data PDUs and/or DL data PDUs) with the MN 104 and SN 106A, e.g., by using an MN configuration (similar to the S-BS configuration in event 302A) and an SN configuration, respectively.

Later in time, the MN 104 determines 404A to initiate DAPS handover for the T-BS 106B and the UE 102 to communicate, e.g., blindly or in response to detecting a suitable event, similar to those described with respect to FIG. 3A.

In response to the determination 404A, the MN 104 performs 405A an SN Release procedure with the SN 106A (e.g., the MN 104 sends an SN Release Request message to the SN 106A, which in turn sends an SN Release Request Acknowledge message to the MN 104), and transmits 406A an RRC reconfiguration message to the UE 102 to configure the UE 102 to release the SN 106A. The MN 104 can transmit the RRC reconfiguration message before or after transmitting the SN Release Request message or receiving the SN Release Request Acknowledge message.

In response to receiving the RRC reconfiguration message, the UE 102 stops 408A communicating with the SN 106A. As a result, RF chain(s) or transceiver(s) of the UE 102 that were previously operating in communicating with the SN 106A become available for use to communicate with the T-BS 106B during and after a successful DAPS handover, while those that are communicating with the MN 104 are still in use. The UE 102 and the MN 104 continue 409A communicating with each other (i.e., in SC), similar to event 309A.

The UE 102 then transmits 410A an RRC reconfiguration complete message to the MN 104, and releases the SN configuration, in some implementations.

After determining 404A to initiate DAPS handover, the MN 104 also sends 412A a Handover Request message to the T-BS 106B, similar to event 312A. In response, the T-BS 106B generates 414A a handover command message, similar to event 314A, and sends 416A the Handover Request Acknowledge message to the MN 104, similar to event 316A. In turn, the MN 104 transmits 418A the handover command message to the UE 102, similar to event 318A.

In response to receiving 418A the handover command message, the UE 102 and the MN 104 continue 420A communicating with each other while the UE 102 attempts to handover to the T-BS 106B in accordance with the handover command message, similar to event 320A. Subsequently, the UE 102, MN 104, and T-BS 106B collectively perform a DAPS handover and DAPS release procedure 450A, similar to procedure 350A. As a result, the UE 102 stops 436A communicating with the MN 104, similar to event 336A.

In some implementations, if the DAPS handover capability of the UE 102 indicates that the UE 102 is not capable of communicating in DC but capable of CA, the MN 104 can configure the UE 102 to communicate in SC with the MN 104 via N cells. Therefore, the MN 104 can effectively serve as the S-BS 104 as described above with respect to FIG. 3A or 3B.

In other implementations, the S-BS 104 determines to configure the UE 102 to release the SN if the S-BS 104 is unaware whether the UE 102 is capable of DAPS handover with DC. The S-BS 104 can ensure that the UE 102 can perform DAPS handover by releasing the SN for the UE 102 at event 406A.

In some implementations, the S-BS 104 may combine the RRC reconfiguration message (at event 406A) and the handover command message (at event 410A) into an RRC message. For example, the S-BS 104 can generate an RRC message (e.g., an RRC reconfiguration message) for releasing the SN that includes the handover command message, and transmit the RRC message to the UE 102 at event 418A. The S-BS 104 can include the handover command message in a DAPS handover related field/IE. The handover command message may or may not include a DAPS handover related field/IE to indicate the DAPS handover. If the RRC message is an RRC reconfiguration message, the UE 102 need not transmit an RRC reconfiguration complete message to the S-BS 104 in response to the RRC reconfiguration message. If the RRC message and the handover command message are RRC reconfiguration messages, the UE 102 can include a transaction identifier in the handover complete message and set the transaction identifier to a value identical to the value of a transaction identifier in the handover command message rather than to a value of a transaction identifier in the RRC message. Accordingly, the RRC message and the handover command message may have different transaction identifier values, and therefore the T-BS 106B can determine that the handover complete message is associated to the handover command message based on the identical transaction identifiers.

Figure 4B:
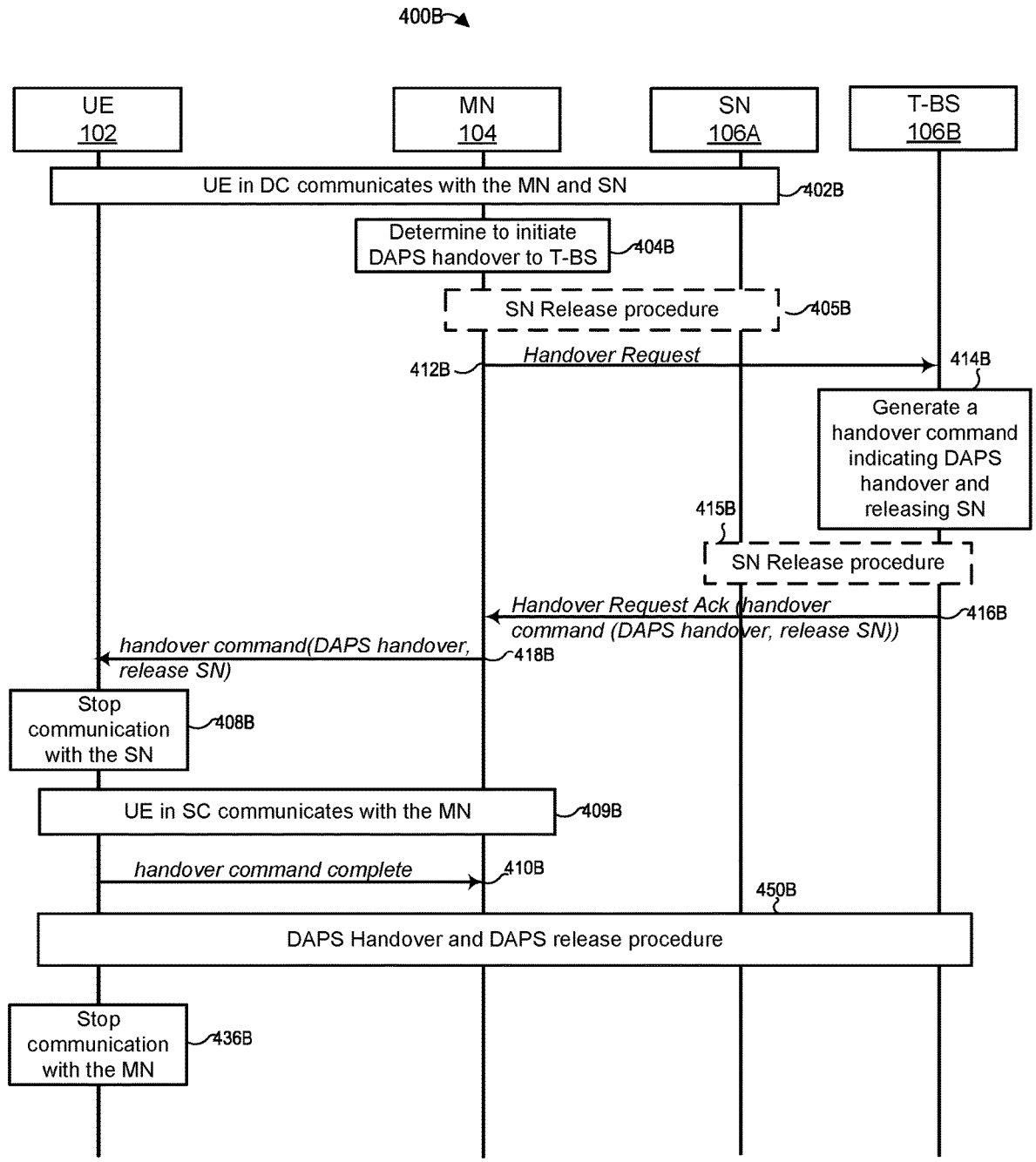

In FIG. 4B, in a DAPS handover scenario 400B, the base station 104 operates as an MN for the UE 102, the base station 106A operates as an SN for the UE 102, and the base station 106B operates as a T-BS for the UE 102.

Initially, the UE 102 in DC communicates 402B data with the MN 104 and SN 106A, similar to event 402A. Later in time, the MN 104 determines 404B to initiate DAPS handover for the T-BS 106B and the UE 102 to communicate, similar to event 404A.

Whereas in FIG. 4A the MN 104 determines that the UE 102 release the SN 106A by transmitting 406A an RRC reconfiguration message to the UE 102 in response to the determination 404A, in FIG. 4B the T-BS 106B determines that the UE 102 release the SN 106A. Particularly, the MN 104 sends 412B a Handover Request message to the T-BS 106B in response to the determination 404B. In response to the Handover Request message, the T-BS 106B generates 414B a handover command message, similar to event 414A, with an additional indication to release the SN 106A. The T-BS 106B then sends 416B the handover command message in a Handover Request Acknowledge message to the MN 104, similar to event 416A. In turn, the MN 104 transmits 418B the handover command message to the UE 102, similar to event 418A. In response to the handover command message, the UE 102 stops 408B communicating with the SN 106A, similar to event 408A. The UE 102 and the MN 104 continue 409B communicating with each other while the UE 102 attempts to handover to the T-BS 106B in accordance with the handover command message, similar to events 409A or 420A.

The UE 102 then transmits 410B a handover command complete message to the MN 104, and releases the SN configuration, in some implementations Subsequently, the UE 102, MN 104, and T-BS 106B collectively perform a DAPS handover and DAPS release procedure 450B, similar to procedure 450A. As a result, the UE 102 stops 436B communicating with the MN 104, similar to event 436A.

In some implementations, in response to the determination 404B, the MN 104 performs 405B an SN Release procedure with the SN 106A, similar to event 405A. In some implementations, the MN 104 sends 412B the Handover Request message to the T-BS 106B if the MN 104 performs 405B the SN Release procedure. The MN 104 can include the SN configuration of the SN 106A in the Handover Request message or in a CG-ConfigInfo IE in the Handover Request message.

In some implementations, instead of the MN 104 performing 405B the SN Release procedure in response to the determination 404B, the T-BS 106B performs 415B the SN Release procedure in response to receiving 412B the Handover Request message if the MN 104 indicates to the T-BS 106B that SN 106A is configured to the UE 102. For example, the MN 104 can include an indication (e.g., sourceSCG-ConfiguredNR field or sourceSCG-Configured field) indicating that SN 106A is configured to the UE 102 in an AS-Config IE in a HandoverPreparationInformation IE (or RRC inter-node message) in the Handover Request message.

In some implementations, the S-BS 104 can include a configuration for releasing the SN in the Handover Request message, and the T-BS 106B can include the configuration in the handover command message. In other implementations, the T-BS 106 can generate a configuration for releasing the SN, and include the configuration in the handover command message.

In some implementations, the MN 104 can effectively serve as the S-BS 104 as described above with respect to FIG. 3A or 3B, as described above with respect to FIG. 4A.

In some implementations, the Handover Request message includes the MN configuration, so that the T-BS 106B is aware of any pre-existing configurations (e.g., MN configuration) known by the UE 102 to determine additional configuration(s) the UE 102 may still need when performing a handover procedure to switch from the MN 104 to the T-BS 106B. In one implementation, the MN 104 can include the MN configuration (similar to the S-BS configuration described above) in a HandoverPreparationInformation IE (or RRC inter-node message) and include the HandoverPreparationInformation IE in the Handover Request message. In another implementation, the MN 104 can include the MN configuration in an RRC message (e.g., RRC reconfiguration message), include the RRC message in a HandoverPreparationInformation IE, and then include the HandoverPreparationInformation IE in the Handover Request message. The T-BS 106B can determine that the MN 104 configures the N cells to the UE 102 from the MN configuration. In response to the determination, the T-BS 106B determines to configure the UE 102 to release M cells in the handover command message. Alternatively, the T-BS 106B is preconfigured to release the M cells by default.

Figure 5:
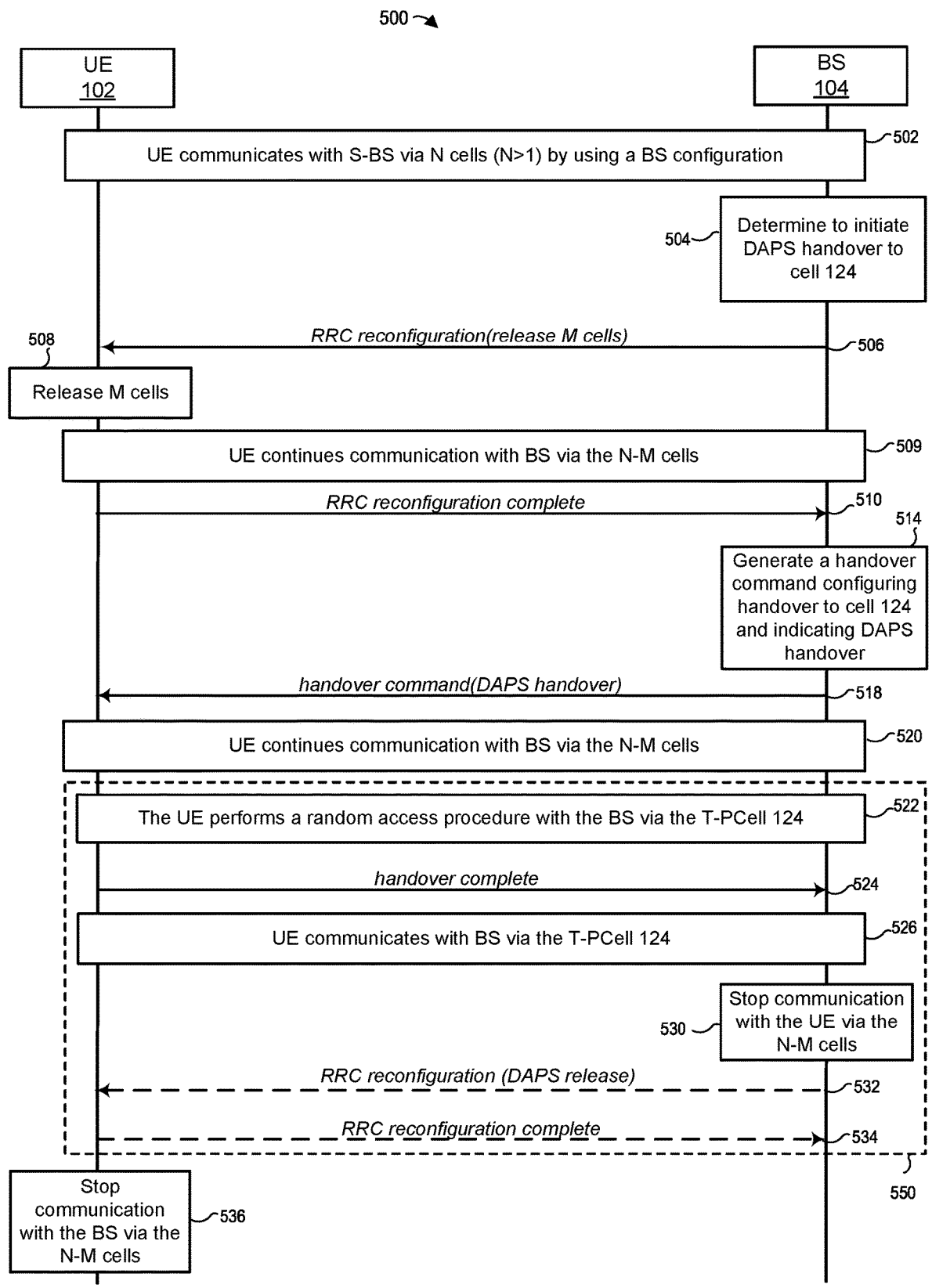
FIG. 5 is a messaging diagram of an example scenario in which a RAN prepares a DAPS handover procedure for a UE by releasing M of N cells via which the UE communicates with a base station of the RAN prior to the UE performing DAPS handover to a target cell of the base station.

In FIG. 5, whereas in FIG. 3A the DAPS handover scenario 300A occurs between two base stations (e.g., the base stations 104, 106B) with respect to the UE 102, in FIG. 5 the DAPS handover scenario 500 occurs within a single base station (e.g., the base station 104) with respect to the UE 102.

Initially, the UE 102 communicates 502 data with the base station 104 via N cells by using a BS configuration, similar to event 302A, where the N cells exclude PCell 124. For example, the N cells can include cell 122 and other cell(s) not illustrated in FIG. 1A.

Later in time, the base station 104 determines 504 to initiate DAPS handover for the target PCell (T-PCell) 124 and the UE 102 to communicate, e.g., blindly or in response to detecting a suitable event, similar to those described with respect to FIG. 3A.

In response to the determination 504, the base station 104 transmits 506 an RRC reconfiguration message to the UE 102 to configure the UE 102 to release M cells, similar to event 306A.

In response to the RRC reconfiguration message, the UE 102 releases 508 the M cells, similar to event 308A. As a result, RF chain(s) or transceiver(s) of the UE 102 that were previously operating in communicating with the base station 104 via the M cells become available for use to communicate with the base station 104 via T-PCell 124 during and after a successful DAPS handover, while those that are communicating with the base station 104 via the N-M cells are still in use. In releasing 508 the M cells, the UE 102 and the base station 104 update the BS configuration by excluding configurations relevant to the released M cells, and continue 509 communicating with each other (i.e., via N-M cells) by using the updated BS configuration, similar to event 309A. The UE 102 then transmits 510 an RRC reconfiguration complete message to the base station 104, similar to event 310A.

After determining 504 to initiate DAPS handover, whereas in FIG. 3A the S-BS 104 sends 312A a Handover Request message to the T-BS 106B for the T-BS 106B to generate 314A a handover command message that includes a DAPS handover configuration or an indication for the DAPS handover configuration, in FIG. 5 the base station 104 simply generates 514 the handover command message, and transmits 518 the handover command message to the UE 102, similar to event 318A. The handover command message also includes one or more random access configurations needed by the UE 102 to handover to the T-PCell 124, and in some implementations, includes additional fields, as discussed above with respect to FIG. 3A.

The DAPS handover configuration enables the UE 102 to use a DAPS to communicate with the base station 104 via N-M cells (using the updated BS configuration) and via T-PCell 124 (during and after a successful DAPS handover). As such, in response to receiving 518 the handover command message, the UE 102 and the base station 104 continue 520 communicating with each other via the N-M cells by using the updated BS configuration while the UE 102 attempts to handover to the T-PCell 124 in accordance with the handover command message. In attempting to perform the DAPS handover, the UE 102 initiates 522 a random access procedure on the T-PCell 124 with the base station 104, e.g., by using one or more random access configurations in the handover command message. After gaining access to a channel, the UE 102 transmits 524 a handover complete message to the base station 104 via T-PCell 124 during or after successfully completing the random access procedure. After the base station 104 identifies the UE 102 during the random access procedure, the UE 102 communicates 526 control signals and data with the base station 104 via the T-PCell 124 by using the DAPS handover configuration in or otherwise indicated in the handover command message. The DAPS handover configuration enables the UE 102 to continue communicating with the base station 104 via N-M cells while simultaneously communicating via T-PCell 124.

Later in time, e.g., after identifying the UE 102, the base station 104 stops 530 communicating with the UE 102 via the N-M cells. As the UE 102 no longer needs to use the DAPS to continue communicating with the base station 104 via the N-M cells, the base station 104 can send 532 an RRC reconfiguration message that includes a DAPS release indicator to the UE 102, e.g., via the T-PCell 124, either after identifying the UE 102 or after transmitting the RRC reconfiguration message.

In response to the RRC reconfiguration message, the UE 102 can transmit 534 an RRC reconfiguration complete message to the base station 104 and subsequently stop 536 communicating with the base station 104. The events 522, 524, 526, 530, 532, 534 are collectively referred to in FIG. 5 as the DAPS handover and DAPS release procedure 550.

In some implementations, the base station 104 transmits the handover command message after transmitting the RRC reconfiguration message or after receiving the RRC reconfiguration complete message. In some implementations, the base station 104 can transmit the RRC reconfiguration message and the handover command message in the same MAC PDU, in the same physical downlink shared channel (PDSCH), in different MAC PDUs, or in the different PDSCHs. In some implementations, instead of transmitting the RRC reconfiguration message to the UE 102 to cause the UE 102 to release M cells, the base station 104 can send the handover command message to cause the UE 102 to releases the M cells. The base station 104 can include a configuration for releasing the M cells in the handover command message.

In some implementations, after successfully completing the random access procedure, the UE 102 can stop transmitting and retransmitting UL data PDUs to the base station 104, stop transmitting control signals on PUCCH(s), stop transmitting new UL data PDUs to the base station 104 while continuing to retransmit UL data PDU(s) to the base station 104, continue DL communication with the base station 104, and/or keep transmitting control signals to the base station 104 until event 532 occurs or the DAPS release timer at the UE 102 expires, as discussed above with respect to FIG. 3A.

In some implementations, the base station 104 performs actions similar to those of the T-BS 106B as discussed above with respect to FIG. 3A, such as configuring a time value for the DAPS release timer, and/or including multiple configuration parameters in the handover command message to configure radio resources for the UE 102 to communicate with the base station 104. In some implementations, the base station 104 consists of CU 172 and one or more DUs 174, as discussed above with respect to FIG. 3A. In some implementations, the cell 124 and the N cells can be operated by different DUs 174 connecting to the CU 172.

Similar to the UE 102 described above in FIG. 4A or 4B, if the UE 102 is communicating in DC with the base station 104 (i.e., MN 104) and an SN 106A, the MN 104 can send an RRC reconfiguration message for releasing the SN 106A to the UE 102 to perform DAPS handover. Alternatively, the MN 104 can send a handover command message for releasing the SN 106A to the UE 102 to perform DAPS handover.

The base station 104 may perform similarly to the T-BS 106B described above in FIG. 3C, 3D, or 3E (e.g., in any one of events 304C, 314C, 318C, 350C, 304D, 314D, 318D, 350D, 304E, 314E, 318E, 350E).

Figure 6:
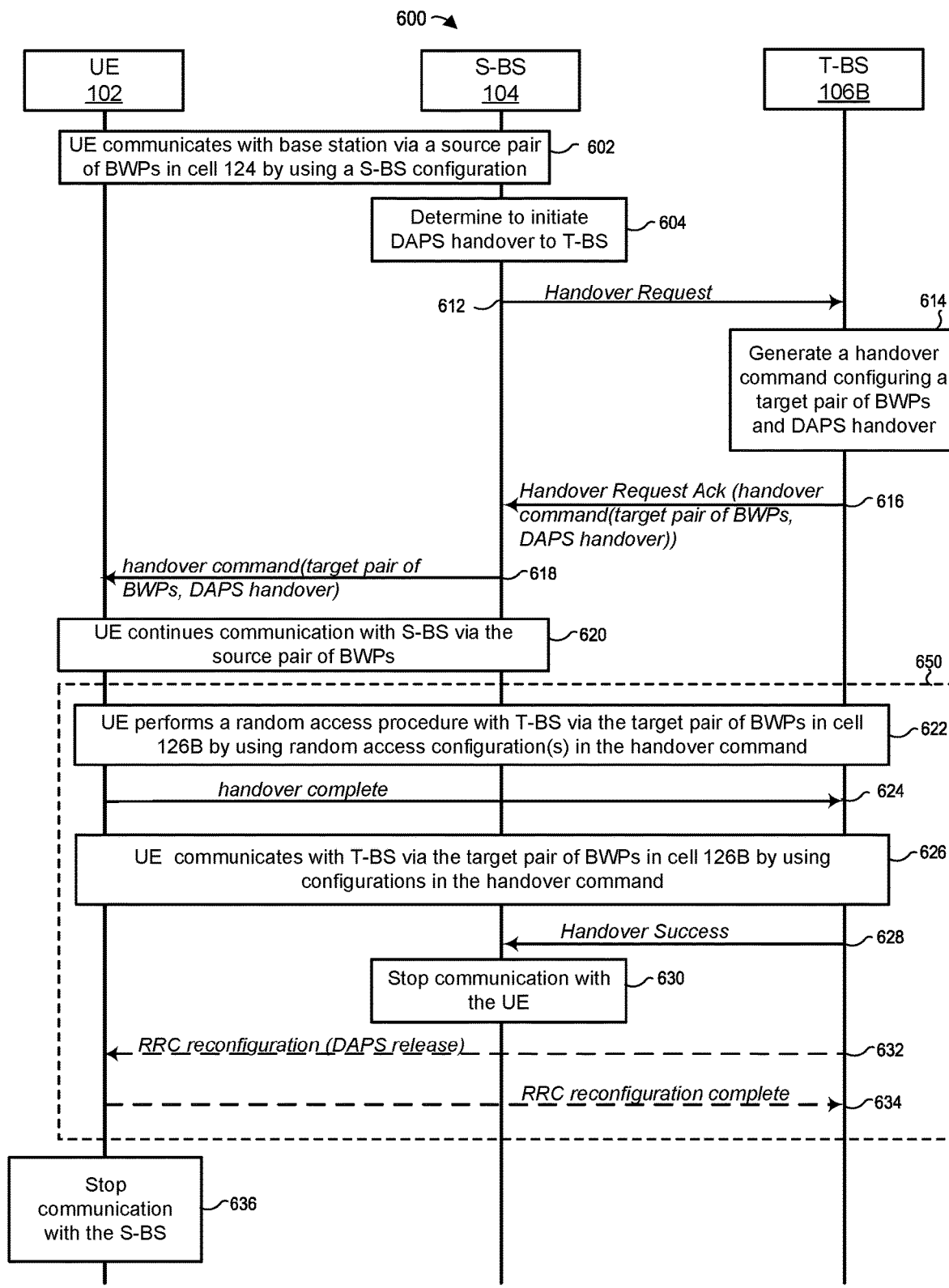
FIG. 6 is a messaging diagram of an example scenario in which a RAN prepares a DAPS handover procedure for a UE by configuring a target pair of bandwidth parts of a target cell that does not overlap with a source pair of bandwidth parts of a source cell via which the UE communicates with a source base station of the RAN prior to the UE performing DAPS handover to the target cell of a target base station.

In FIG. 6, in an intra-frequency DAPS handover scenario 600, the base station 104 covering cell 124 operates as an S-BS for the UE 102, and the base station 106B covering cell 126B operates as a T-BS for the UE 102. Cells 124 and 126B operate on the same or overlapped carrier frequencies.

Initially, the UE 102 communicates 602 data (e.g., UL data PDUs and/or DL data PDUs) with the S-BS 104 via a source pair of bandwidth parts (BWPs) in cell 124 by using an S-BS configuration. The source pair of BWPs includes a source UL BWP and a source DL BWP. In some scenarios, the UE 102 communicates 602 data in SC with the S-BS 104, or communicates 602 data in DC with the S-BS 104 operating as an MN and an SN (e.g., the base station 106A) not shown in FIG. 6.

Later in time, the S-BS 104 determines 604 to initiate DAPS handover for the T-BS 106B and the UE 102 to communicate, e.g., blindly or in response to detecting a suitable event, similar to those described with respect to FIG. 3A.

In response to the determination 604, the S-BS 104 sends 612 a Handover Request message to the T-BS 106B, similar to event 312B. In response to the Handover Request message, the T-BS 106B generates 614 a handover command message to configure a target pair of BWPs in the cell 126B, and includes a DAPS handover configuration or an indication for the DAPS handover configuration in a field or an IE (e.g., a dapsConfig field, a dapsHO-Config field, a daps-HO field or a daps-HO-Config field). The target pair of BWPs includes a target UL BWP and a target DL BWP, and does not overlap with the source pair of BWPs. The T-BS 106B then sends 616 the handover command message in a Handover Request Acknowledge message to the S-BS 104, similar to event 316B. In turn, the S-BS 104 transmits 618 the handover command message to the UE 102, similar to event 318B. As a result, the target pair of BWPs in cell 126B becomes available for the UE 102 when communicating with the T-BS 106B during and after a successful DAPS handover, while the source pair of BWPs in cell 124 still remains available for the UE 102 when communicating with the S-BS 104. In this way, the RAN (e.g., S-BS 104, T-BS 106B) ensures that intra-frequency DAPS handover proceeds across non-overlapping BWPs, if the UE 102 is not capable of DAPS handover on overlapping BWPs in a source cell and a target cell or if the RAN is not capable of DAPS handover on one of the target pair of BWPs overlapped with one of the source pair of BWPs.

In response to the handover command message, the UE 102 and the S-BS 104 continue 620 communicating with each other via the source pair of BWPs using the S-BS configuration, while the UE 102 attempts to handover to the T-BS 106B via the target pair of BWPs in accordance with the handover command message. In attempting to perform the DAPS handover, the UE 102 initiates 622 a random access procedure with the T-BS 106B via the target pair of BWPs in a cell 126B, e.g., by using one or more random access configurations in the handover command message. After gaining access to a channel, the UE 102 transmits 624 a handover complete message to the T-BS 106B via the target pair of BWPs during or after successfully completing the random access procedure. After the T-BS 106B identifies the UE 102 during the random access procedure, the UE 102 communicates 626 control signals and data (e.g., UL data PDUs) with the T-BS 106B via the target pair of BWPs (e.g., the target UL BWP) in the cell 126B by using the DAPS handover configuration in or otherwise indicated in the handover command message. The DAPS handover configuration enables the UE 102 to continue communicating with the S-BS 104 while simultaneously communicating with the T-BS 106B.

In response to identifying the UE 102 during the random access procedure or receiving 624 the handover complete message, the T-BS 106B sends 628 a Handover Success message to the S-BS 104. After receiving the Handover Success message, the S-BS 104 stops 630 communicating with the UE 102.

As the UE 102 no longer needs to use the DAPS to continue communicating with the S-BS 104, the T-BS 106B can send 632 an RRC reconfiguration message that includes a DAPS release indicator to the UE 102, e.g., via the target DL BWP in the cell 126B, before transmitting the Handover Success message, after transmitting the Handover Success message, or simultaneously with the Handover Success message. In response to the RRC reconfiguration message, the UE 102 can transmit 634 an RRC reconfiguration complete message to the T-BS 106B and stop 636 communicating (i.e., UL and/or DL communication) with the S-BS 104. The events 622, 624, 626, 628, 630, 632, 634 are collectively referred to in FIG. 6 as the DAPS handover and DAPS release procedure 650.

In some implementations, if the T-BS 106B does not configure the UE 102 to use another target pair of BWPs, e.g., in a downlink control information (DCI) command on a physical downlink control channel (PDCCH), in the RRC reconfiguration message at event 632, or in another RRC reconfiguration message before the RRC reconfiguration message at event 632, the UE 102 transmits 634 the RRC reconfiguration complete message via the target pair (e.g., the target UL BWP).

In some implementations, the T-BS 106B determines that the target pair of BWPs do not overlap with the source pair of BWPs according to a DAPS handover capability of the UE 102 and/or the source pair of BWPs configured by the S-BS configuration. The S-BS 104 can include the S-BS configuration and the DAPS handover capability of the UE 102 in the Handover Request message.

In some implementations, the S-BS 104 receives a DAPS handover capability in a UE Capability IE (e.g., a UE-NR-Capability IE as defined in 3GPP TS 38.331 or a UE-EUTRA-Capability IE as defined in 3GPP TS 36.331) and includes the UE Capability IE in the Handover Request message so that the T-BS 106B is aware of the DAPS handover capability of the UE 102, as described above with respect to FIG. 3A.

In some implementations, the DAPS handover capability indicates that the UE 102 is capable of intra-frequency DAPS handover. In one implementation, the DAPS handover capability indicates that the UE 102 supports intra-frequency DAPS handover with a pair of target BWPs (i.e., a target DL BWP and a target UL BWP) in a target cell that does not overlap with a pair of source BWPs (i.e., a source DL BWP and a source UL BWP) in a source cell. That is, the UE 102 can only perform the intra-frequency DAPS handover from the source cell to the target cell if the target DL BWP and the source DL BWP do not overlap, and the target UL BWP and the source UL BWP do not overlap.

In some implementations, the S-BS 104 can generate an RRC message (e.g., an RRC reconfiguration message) including the handover command message, and transmit the RRC message to the UE 102. The S-BS 104 can include the handover command message in a DAPS handover related field/IE. The handover command message may or may not include a DAPS handover related field/IE to indicate the DAPS handover.

Figure 7:
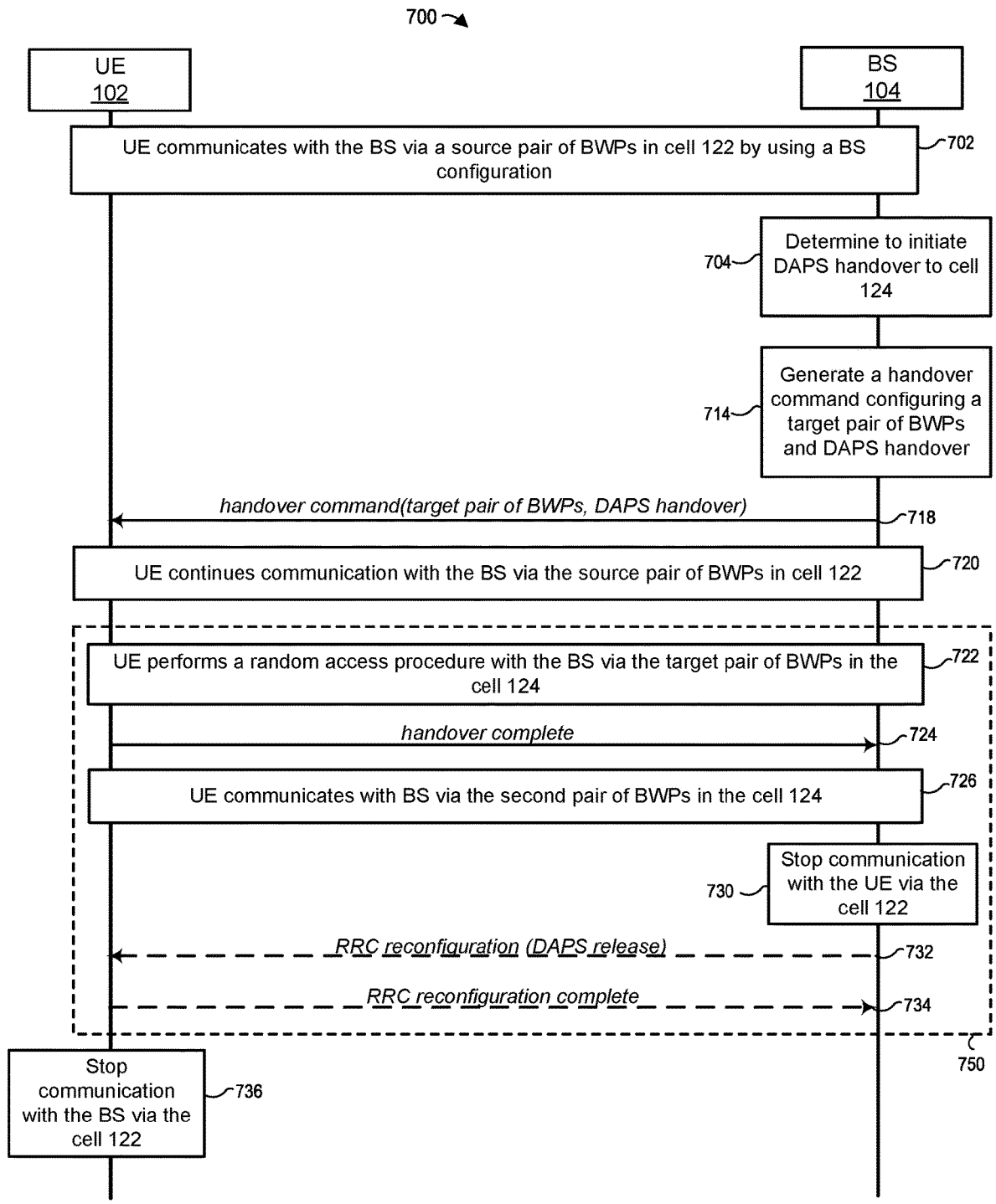
FIG. 7 is a messaging diagram of an example scenario in which a RAN prepares a DAPS handover procedure for a UE by configuring a target pair of bandwidth parts of a target cell that does not overlap with a source pair of bandwidth parts of a source cell via which the UE communicates with base station of the RAN prior to the UE performing DAPS handover to the target cell of the base station.

In FIG. 7, whereas in FIG. 6 the intra-frequency DAPS handover scenario 600 occurs between two base stations (e.g., the base stations 104, 106B) with respect to the UE 102, in FIG. 7 the intra-frequency DAPS handover scenario 700 occurs within a single base station (e.g., the base station 104 covering cells 122 and 124 that operate on the same or overlapped carrier frequencies) with respect to the UE 102.

Initially, the UE 102 communicates 702 data with the base station 104 via a source pair BWPs in cell 122 by using a BS configuration, similar to event 602.

Later in time, the base station 104 determines 704 to initiate DAPS handover for the T-PCell 124 and the UE 102 to communicate, e.g., blindly or in response to detecting a suitable event, similar to those described with respect to FIG. 3A.

In response to the determination 704, whereas in FIG. 6 the S-BS 104 sends a 612 a Handover Request message to the T-BS 106B for the T-BS 106B to generate 614 a handover command message to configure a target pair of BWPs in the cell 126B, and a DAPS handover configuration or an indication for the DAPS handover configuration in a field or an IE, in FIG. 7 the base station 104 simply generates 714 the handover command message configuring a target pair of BWPs in T-PCell 124, and includes a DAPS handover configuration or an indication for the DAPS handover configuration in a field or an IE (e.g., a dapsConfig field, a dapsHO-Config field, a daps-HO field or a daps-HO-Config field). The base station 104 then transmits 718 the handover command message to the UE 102, similar to event 618. In this way, the base station 104 ensures that intra-frequency DAPS handover proceeds across non-overlapping BWPs, if the UE 102 is not capable of DAPS handover on overlapping BWPs in a source cell and a target cell, or if the RAN is not capable of DAPS handover on one of the target pair of BWPs overlapped with one of the source pair of BWPs.

The DAPS handover configuration enables the UE 102 to use a DAPS to communicate with the base station 104 via cell 122 (using the source pair of BWPs) and via T-PCell 124 (using the target pair of BWPs) during and after a successful DAPS handover. As such, in response to the handover command message, the UE 102 and the base station 104 continue 720 communicating with each other via the source pair of BWPs in the cell 122 using the BS configuration, while the UE 102 attempts to handover to the T-PCell 124 via the target pair of BWPs in accordance with the handover command message. In attempting to perform the DAPS handover, the UE 102 initiates 722 a random access procedure with the base station 104 via the target pair of BWPs in T-PCell 124, e.g., by using one or more random access configurations in the handover command message. After gaining access to a channel, the UE 102 transmits 724 a handover complete message to the base station 104 via the target pair of BWPs in T-PCell 124 during or after successfully completing the random access procedure. After the base station 104 identifies the UE 102 during the random access procedure, the UE 102 communicates 726 control signals and data with the base station 104 via the T-PCell 124 by using configurations indicated in the handover command message. The DAPS handover configuration enables the UE 102 to continue communicating with cell 122 while simultaneously communicating with T-PCell 124.

In response to identifying the UE 102 during the random access procedure or receiving 724 the handover complete message, the base station 104 stops 730 communicating with the UE 102 via cell 122. As the UE 102 no longer needs to use the DAPS to continue communicating with cell 122, the base station 104 can send 732 an RRC reconfiguration message that includes a DAPS release indicator to the UE 102, e.g., via the T-PCell 124, either after identifying the UE 102 or after transmitting the RRC reconfiguration message.

In response to the RRC reconfiguration message, the UE 102 can transmit 734 an RRC reconfiguration complete message to the base station 104 and subsequently stop 736 communicating with the base station 104. The events 722, 724, 726, 730, 732, 734 are collectively referred to in FIG. 7 as the DAPS handover and DAPS release procedure 750.

In some implementations, if the base station 104 does not configure the UE 102 to use another target pair of BWPs, the UE 102 transmits the RRC reconfiguration complete message 736 via the target pair (e.g., the target UL BWP), as discussed above with respect to FIG. 6.

Similar to the base station 104 discussed above in FIG. 3A or 3B, if the UE 102 is in CA with N cells, the base station 104 can send an RRC reconfiguration message for releasing M cells to the UE 102 to perform the DAPS handover. Alternatively, the MN 104 can send a handover command message for releasing the M cells.

Similar to the UE 102 discussed above in FIG. 4A or 4B, if the UE 102 is communicating in DC with the base station 104 (i.e., MN 104) and a SN 106A, the MN 104 can send an RRC reconfiguration message for releasing the SN 106A to the UE 102 to perform the DAPS handover. Alternatively, the MN 104 can send a handover command message for releasing the SN 106A to the UE 102 to perform the DAPS handover.

In some implementations, the base station 104 determines that the target pair of BWPs do not overlap with the source pair of BWPs according to a DAPS handover capability of the UE 102 and/or the source pair of BWPs configured by the BS configuration, as described above with respect to FIG. 6.

Figure 8:
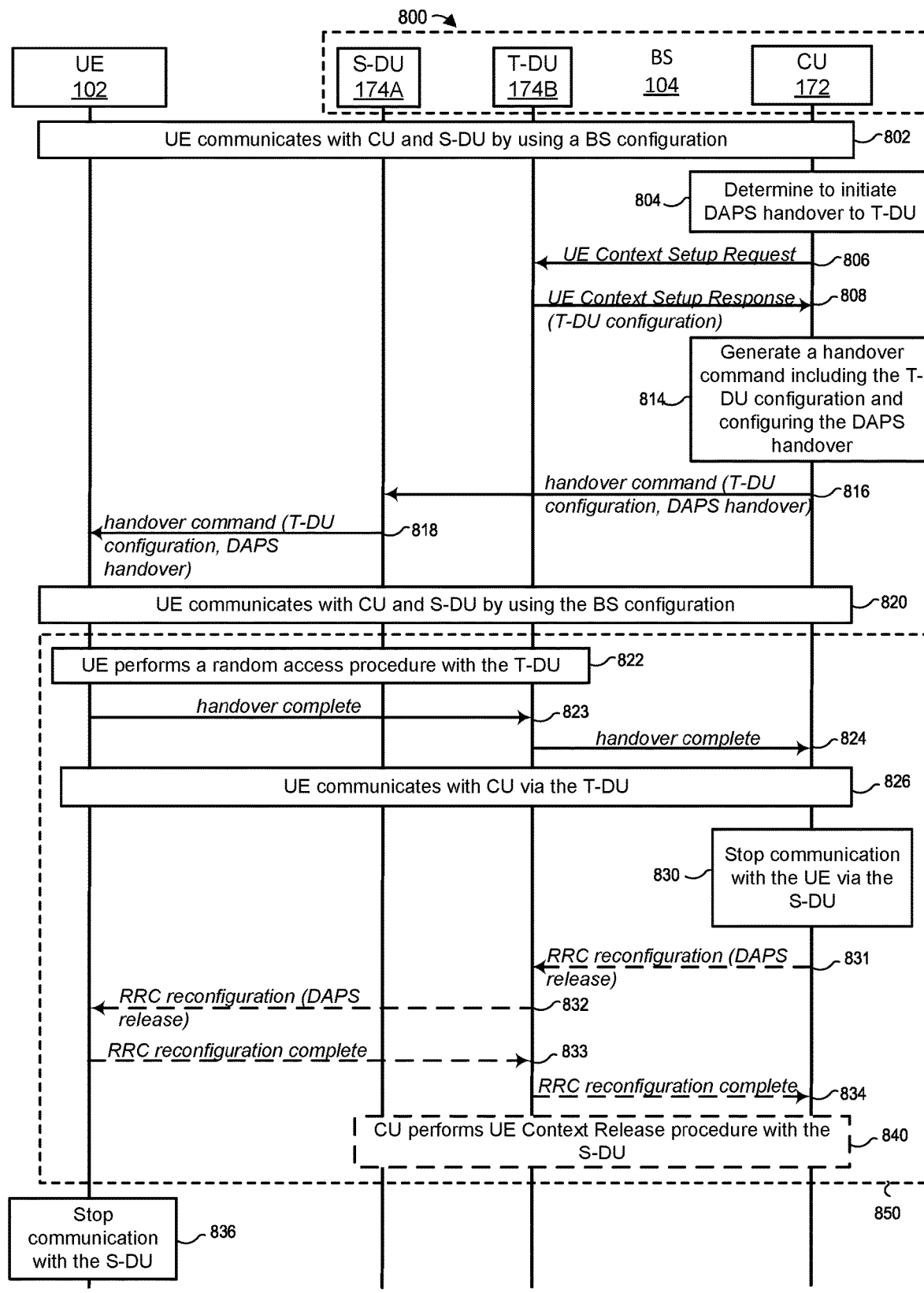
FIG. 8 is a messaging diagram of an example scenario in which a RAN prepares a UE to perform DAPS handover, from a source DU of a base station of the RAN to a target DU of a base station.

In FIG. 8, in a DAPS handover scenario 800, the base station 104 includes a CU 172 for the UE 102, and three DUs 174 that operate as a source DU (S-DU) for the UE 102, a target DU (T-DU) for the UE 102, and a candidate DU (C-DU) for the UE 102, respectively.

Initially, the UE 102 communicates 802 data with CU 172 and S-DU 174A via cell 122 by using a BS configuration.

Later in time, the CU 172 determines 804 to initiate DAPS handover for the T-DU 174B and the UE 102 to communicate via cell 124, e.g., blindly or in response to detecting a suitable event, similar to those described with respect to FIG. 3A. For example, the CU 172 initiates DAPS handover in response to measurement result(s) obtained by the CU 172 from measurements on signals received from the UE 102 via S-DU 174A.

In response to the determination 804, the CU 172 sends 806 a UE Context Setup Request message to the T-DU 174B. In response, the T-DU 174B sends 808 a UE Context Setup Response message including a T-DU configuration to the CU 172. In turn, the CU 172 generates 814 a handover command message which includes the T-DU configuration and a DAPS handover configuration or an indication for the DAPS handover configuration in a field or an IE (e.g., a dapsConfig field, a dapsHO-Config field, a daps-HO field or a daps-HO-Config field). Then the CU 172 sends 816 the handover command message to the S-DU 174A, which in turn transmits 818 the handover command message to the UE 102.

The DAPS handover configuration enables the UE 102 to use a DAPS to communicate with the S-DU 174A using the BS configuration as well as T-DU 174B using the T-DU configuration during and after a successful DAPS handover. As such, in response to the handover command message, the UE 102 and the base station 104 continue 820 communicating with each other via cell 122 using the S-DU 174A (by using the BS configuration), while the UE 102 attempts to handover to cell 124 using the T-DU 174B in accordance with the handover command message. In attempting to perform the DAPS handover, the UE 102 initiates 822 a random access procedure with the T-DU 174B, e.g., by using one or more random access configurations in the T-DU configuration. After gaining access to a channel, the UE 102 transmits 823 a handover complete message to the T-DU 174B during or after successfully completing the random access procedure, which in turn sends 824 the handover complete message to the CU 172. After the T-DU 174B identifies the UE 102 during the random access configuration, the UE 102 communicates 826 control signals and data with the CU 172 via the T-DU 174B by using the T-DU configuration included in the handover command message. If the handover command message includes configurations (e.g., DAPS handover configuration) generated by the CU 172, the UE 102 communicates 826 with the CU 172 via the T-DU 174B by using the configurations generated by the CU 172.

After receiving 824 the handover complete message, the CU 172 stops 830 communicating with the UE 102 via the S-DU 174A. The CU 172 can then send 831 an RRC reconfiguration message that includes a DAPS release indicator to the T-DU 174B, which in turn can send 832 the RRC reconfiguration message to the UE 102. In some implementations, the CU 172 stops 830 communicating with the UE 102 after transmitting the RRC reconfiguration message to the T-DU 174B. In response to the RRC reconfiguration message, the UE 102 can transmit 833 an RRC reconfiguration complete message to the T-DU and stop 836 communicating with the S-DU 174A. In turn, the T-DU 174B can send 834 the RRC reconfiguration complete message to the CU 172.

As the UE 102 no longer needs to use the DAPS to continue communicating with the S-DU 174A, the CU 172 can perform 840 a UE Context Release procedure with the S-DU 174A in response to the RRC reconfiguration complete message. Particularly, the CU 172 sends a UE Context Release Command message to the S-DU 174A, which in turn sends a UE Context Release Complete message to the CU 172 and stops communicating with the UE 102. By performing the UE Context Release procedure in response to the RRC reconfiguration complete message, the CU 172 maintains the UE context longer relative to a non-DAPS handover procedure when performing a DAPS handover procedure. The events 822, 823, 824, 826, 830, 831, 832, 833, 834, 840 are collectively referred to in FIG. 8 as the DAPS handover and DAPS release procedure 850.

In some implementations, after successfully completing the random access procedure, the UE 102 can start transmitting UL data PDUs to the CU 172 via the T-DU 174B, stop transmitting and retransmitting UL data PDUs to the S-DU 174A, stop transmitting control signals on PUCCH(s) to the S-DU 174A, stop transmitting new UL data PDUs to the S-DU 174A while continuing to retransmit UL data PDU(s) to the S-DU 174A, continue DL communication with the S-BS 104, and/or keep transmitting control signals to the S-DU 174A until event 832 occurs or the DAPS release timer at the UE 102 expires, as described above with respect to FIG. 3A.

In some implementations, the CU 172 performs actions similar to those of the T-BS 106B as discussed above with respect to FIG. 3A, such as configuring a time value for the DAPS release timer.

In some implementations, the T-DU configuration can be a CellGroupConfig IE. In other implementations, the T-DU configuration can include multiple configurations such as physical layer configurations, a MAC configuration, an RLC configuration, and/or the one or more random access configurations.

In some implementations, the T-DU 174B identifies the UE 102 if the T-DU 174B receives a UE identifier (e.g., a cell radio network temporary identifier (C-RNTI)) or a random access preamble from the UE 102 during the random access procedure. The UE identifier or random access preamble can be assigned by the T-DU 174B, in some implementations.

In some implementations, the CU 172 in event 816 can send a UE Context Modification Request message including the handover command message to the S-DU 174A. The S-DU 174A in turn can send a UE Context Modification Response message to the CU 172. In some implementations, the CU 172 can indicate not to stop data transmission to the UE 102 in the Context Modification Request message in response to the determination 804, so that the S-DU 174A continues communicating with the UE 102. For example, the CU 172 may not include a "Transmission Action Indicator" IE in the Context Modification Request message, or include a "Transmission Action Indicator" IE set to "restart" in the Context Modification Request message to indicate not to stop data transmission to the UE 102. In other implementations, the CU 172 can include an IE indicating DAPS handover in the Context Modification Request message so that the S-DU 174A continues communicating with the UE 102. In yet other implementations, the CU 172 in event 816 can send a DL RRC Message Transfer message (instead of the UE Context Modification Request message) including the handover command message to the S-DU 174A.

Figure 9A:
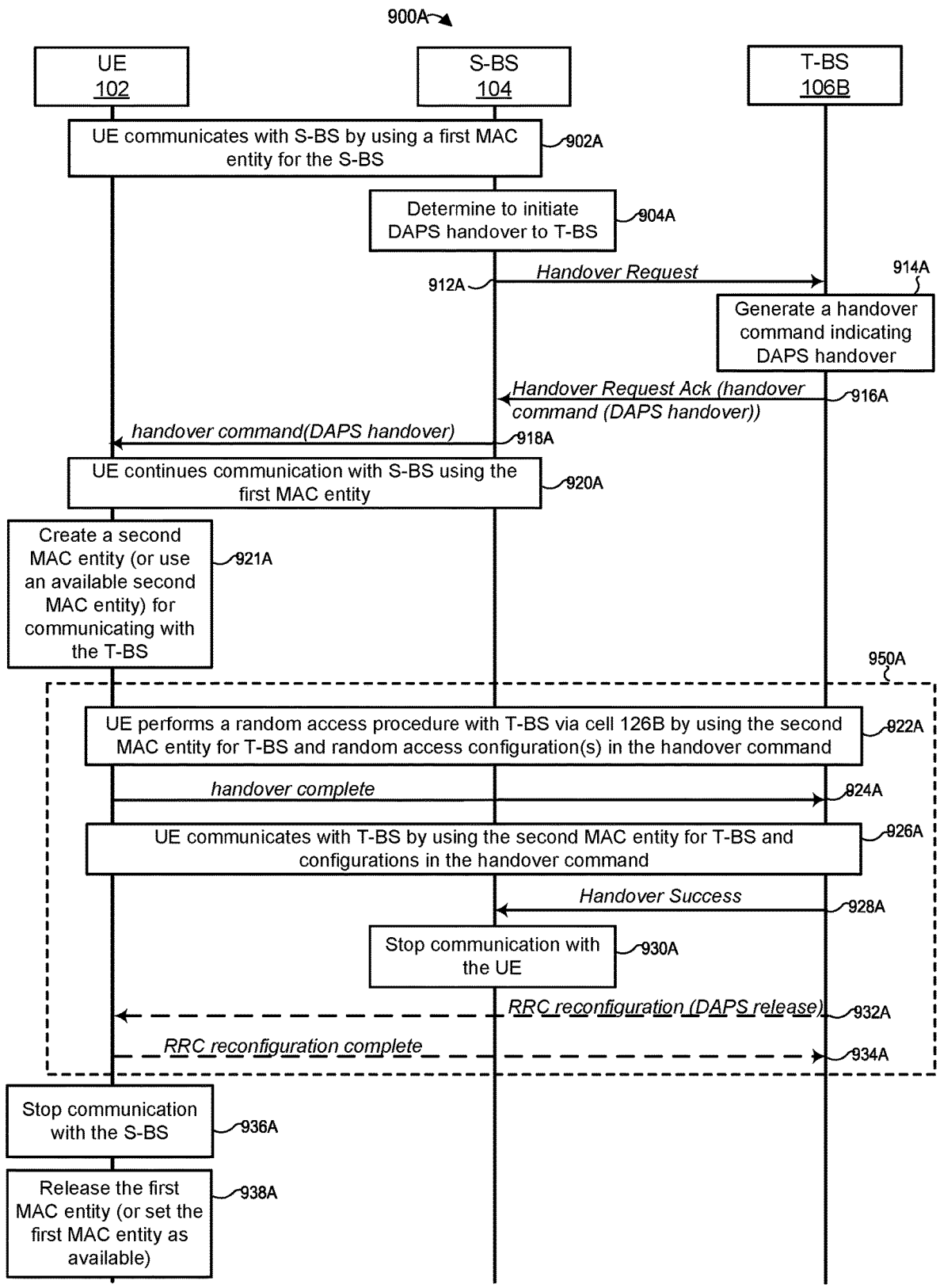
FIGS. 9A and 9B are messaging diagrams of example scenarios in which a RAN configures a UE to release (or otherwise set as available) a MAC entity after performing DAPS handover.

In FIG. 9A, in a DAPS handover scenario 900A, the base station 104 operates as an S-BS for the UE 102, and the base station 106B covering cell 126B operates as a T-BS for the UE 102.

Initially, the UE 102 communicates 902A data (e.g., UL data PDUs and/or DL data PDUs) with the S-BS 104 by using a first MAC entity for the S-BS 104, e.g., via one or more cells. In some scenarios, the UE 102 communicates 902A data in SC with the S-BS 104. If the UE 102 communicates 902A data with the S-BS 104 via N cells, the S-BS 104 can transmit an RRC reconfiguration message to the UE 102 for the UE 102 to release M cells, similar to event 306A. In other scenarios, the UE 102 communicates 902A data in DC with the S-BS 104 operating as an MN and an SN (e.g., the base station 106A) not shown in FIG. 9A. The MN 104 can transmit an RRC reconfiguration message to the UE 102 for the UE 102 to release the SN, similar to event 406A.

Later in time, the S-BS 104 determines 904A to initiate DAPS handover for the T-BS 106B and the UE 102 to communicate, e.g., blindly or in response to detecting a suitable event, similar to those described with respect to FIG. 3A.

In response to the determination 904A, the S-BS 104 sends 912A a Handover Request message to the T-BS 106B, similar to event 312B. In response to the Handover Request message, the T-BS 106B generates 914A a handover command message that includes a DAPS handover configuration or an indication for the DAPS handover configuration in a field or an IE (e.g., a dapsConfig field, a dapsHO-Config field, a daps-HO field or a daps-HO-Config field), and sends 916A the handover command message in a Handover Request Acknowledge message to the S-BS 104, similar to event 316B. In turn, the S-BS 104 transmits 918A the handover command message to the UE 102, similar to event 318B.

In response to the handover command message, the UE 102 and the S-BS 104 continue 920A communicating with each other using the first MAC entity. The UE 102 also creates 921A a second MAC entity to use when communicating with the T-BS 106B. Alternatively, the UE 102 uses 921A an available second MAC entity to communicate with the T-BS 106B.

The DAPS handover configuration enables the UE 102 to use a DAPS to communicate with the S-BS 104 using the first MAC entity and with the T-BS 106B using the second MAC entity during and after a successful DAPS handover. In response to the handover command message, the UE 102 attempts to handover to the T-BS 106B using the second MAC entity in accordance with the handover command message. In attempting to perform the DAPS handover, the UE 102 initiates 922A a random access procedure with the T-BS 106B using the second MAC entity, e.g., by using one or more random access configurations in the handover command message. After gaining access to a channel, the UE 102 transmits 924A a handover complete message to the T-BS 106B using the second MAC entity during or after successfully completing the random access procedure. After the T-BS 106B identifies the UE 102 during the random access procedure, the UE 102 communicates 926A control signals and data (e.g., UL data PDUs) with the T-BS 106B using the second MAC entity and configurations indicated in the handover command message. The DAPS handover configuration enables the UE 102 to continue communicating with the S-BS 104 while simultaneously communicating with the T-BS 106B.

In response to identifying the UE 102 during the random access procedure or receiving 924A the handover complete message, the T-BS 106B sends 928A a Handover Success message to the S-BS 104. After receiving the Handover Success message, the S-BS 104 stops 930A communicating with the UE 102.

As the UE 102 no longer needs to use the DAPS to continue communicating with the S-BS 104, the T-BS 106B can send 932A an RRC reconfiguration message that includes a DAPS release indicator to the UE 102, before transmitting the Handover Success message, after transmitting the Handover Success message, or simultaneously with the Handover Success message. In response to the RRC reconfiguration message, the UE 102 can transmit 934A an RRC reconfiguration complete message to the T-BS 106B and stop 936A communicating (i.e., UL and/or DL communication) with the S-BS 104. The events 922A, 924A, 926A, 928A, 930A, 932A, 934A are collectively referred to in FIG. 9A as the DAPS handover and DAPS release procedure 950A.

In response to the RRC reconfiguration message or expiration of a DAPS release timer at the UE 102, the UE 102 also releases 938A the first MAC entity (or resources of the first MAC entity), which can be software, firmware and/or hardware. Alternatively, the UE 102 sets 938A the first MAC entity as available (e.g., for use at another time). Later, if the UE 102 receives, from the T-BS 106B, another handover command message (i.e., a second handover command message) configuring the UE 102 to perform DAPS handover to the S-BS 104 (or another base station not shown in FIG. 9A), the UE 102 can use the released resources to create a MAC entity for communicating with the S-BS 104 (or the other base station).

In some implementations, if the UE 102 communicates 902A data with the S-BS 104 via N cells, the T-BS 106B transmits 916A the handover command message to the UE 102 for the UE 102 to release M cells. In other implementations, if the UE 102 communicates in DC with the S-BS 104 operating as an MN and an SN (e.g., the base station 106A) not shown in FIG. 9A, the T-BS 106 can send 918A the handover command message including an indication for the UE 102 to release the SN.

Figure 9B:
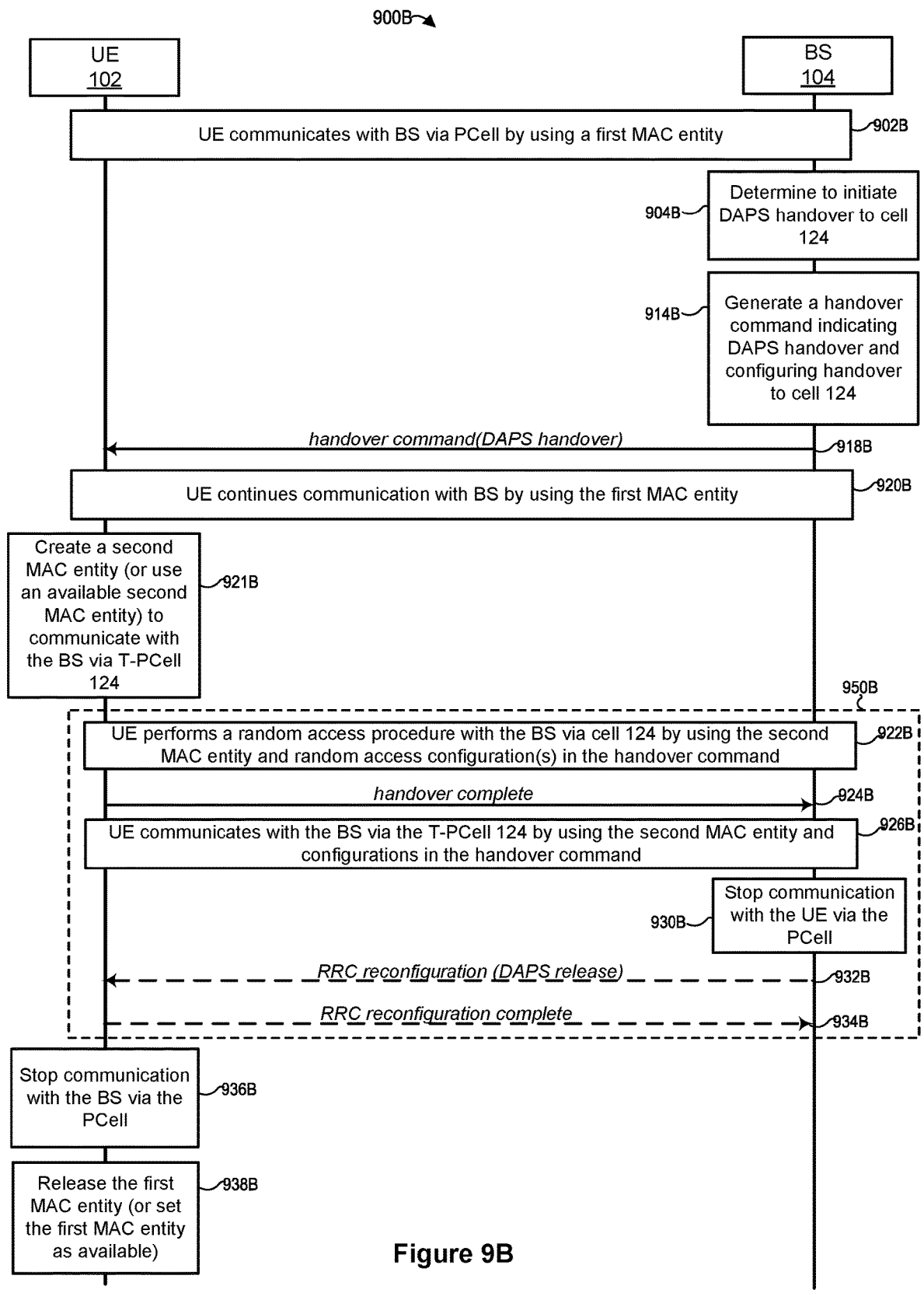

In FIG. 9B, whereas in FIG. 9A the DAPS handover scenario 900A occurs between two base stations (e.g., the base stations 104, 106B) with respect to the UE 102, in FIG. 9B the DAPS handover scenario 900B occurs within a single base station (e.g., the base station 104 covering cells 122 and 124 that operate on the same or overlapped carrier frequencies) with respect to the UE 102.

Initially, the UE 102 communicates 902B data with the base station 104 via cell 122 by using a first MAC entity for the base station 104, similar to event 902A.

Later in time, the base station 104 determines 904B to initiate DAPS handover for the T-PCell 124 and the UE 102 to communicate, e.g., blindly or in response to detecting a suitable event, similar to those described with respect to FIG. 3A.

In response to the determination 904B, whereas in FIG. 9A the S-BS 104 sends 912A a Handover Request message to the T-BS 106B, which in turn generates 914A and sends 916A a handover command message to the S-BS 104, which in turn transmits 918A the handover command message to the UE 102, in FIG. 9B the base station 104 simply generates 914B the handover command message to configure a second MAC entity, and includes DAPS handover configuration or an indication for the DAPS handover configuration in a field or an IE. The base station 104 then transmits 918B the handover command message to the UE 102.

The DAPS handover configuration enables the UE 102 to use a DAPS to communicate with the base station 104 via cell 122 (using the first MAC entity) and via T-PCell 124 (using the second MAC entity) during and after a successful DAPS handover. As such, in response to the handover command message, the UE 102 and the base station 104 continue 920B communicating with each other using the first MAC entity via cell 122, and the UE 102 also creates 921B the second MAC entity to use when communicating with the base station 104 via the T-PCell 124. Alternatively, the UE 102 uses 921B an available second MAC entity to communicate with the base station 104 via T-PCell 124.

In response to the handover command message, the UE 102 attempts to handover to the base station 104 via T-PCell 124 using the second MAC entity in accordance with the handover command message. In attempting to perform the DAPS handover, the UE 102 initiates 922B a random access procedure with the base station 104 via T-PCell 124 using the second MAC entity, e.g., by using one or more random access configurations in the handover command message. After gaining access to a control channel, the UE 102 transmits 924B a handover complete message to the base station 104 via T-PCell 124 using the second MAC entity during or after successfully completing the random access procedure. After the base station 104 via T-PCell 124 identifies the UE 102 during the random access procedure, the UE 102 communicates 926B control signals and data (e.g., UL data PDUs) with the base station 104 via T-PCell 124 using the second MAC entity and the DAPS handover configuration in or otherwise indicated in the handover command message. The DAPS handover configuration enables the UE 102 to continue communicating with the base station 104 via cell 122 while simultaneously communicating with the base station 104 via T-PCell 124.

In response to identifying the UE 102 during the random access procedure or receiving 924B the handover complete message, the base station 104 stops 930B communicating with the UE 102 via cell 122. As the UE 102 no longer needs to use the DAPS to continue communicating with cell 122, the base station 104 can send 932B an RRC reconfiguration message that includes a DAPS release indicator to the UE 102, e.g., via the T-PCell 124, either after identifying the UE 102 or after transmitting the RRC reconfiguration message.

In response to the RRC reconfiguration message, the UE 102 can transmit 934B an RRC reconfiguration complete message to the base station 104 via T-PCell 124 and stop 936B communicating (i.e., UL and/or DL communication) with the base station 104 via cell 122. The events 922B, 924B, 926B, 930B, 932B, 934B are collectively referred to in FIG. 9B as the DAPS handover and DAPS release procedure 950B.

In response to the RRC reconfiguration message or expiration of a DAPS release timer at the UE 102, the UE 102 also releases 938B the first MAC entity (or resources of the first MAC entity). Alternatively, the UE 102 sets 938B the first MAC entity as available (e.g., for use at another time). Later, if the UE 102 receives, from the base station 104, another handover command message (i.e., a second handover command message) configuring the UE 102 to perform DAPS handover to the base station 104 via cell 122 (or another base station not shown in FIG. 9B), the UE 102 can use the released resources to create a MAC entity for communicating with the base station via cell 122 (or the other base station).

FIGS. 10 (i.e., 10A and 10B) through FIGS. 15 (i.e., 15A and 15B) correspond to DAPS PSCell change scenarios in which a base station initiates a DAPS PSCell change procedure for a UE in SC or in DC. Particularly, FIGS. 10, 11 (i.e., 11A and 11B), 13A, and 15A correspond to DAPS PSCell change scenarios involving an SN change, and FIG. 12 (i.e., 12A and 12B), 13B, FIG. 14 (i.e., 14A and 14B), and 15B correspond to DAPS PSCell change scenarios maintaining the same SN.

Figure 10A:
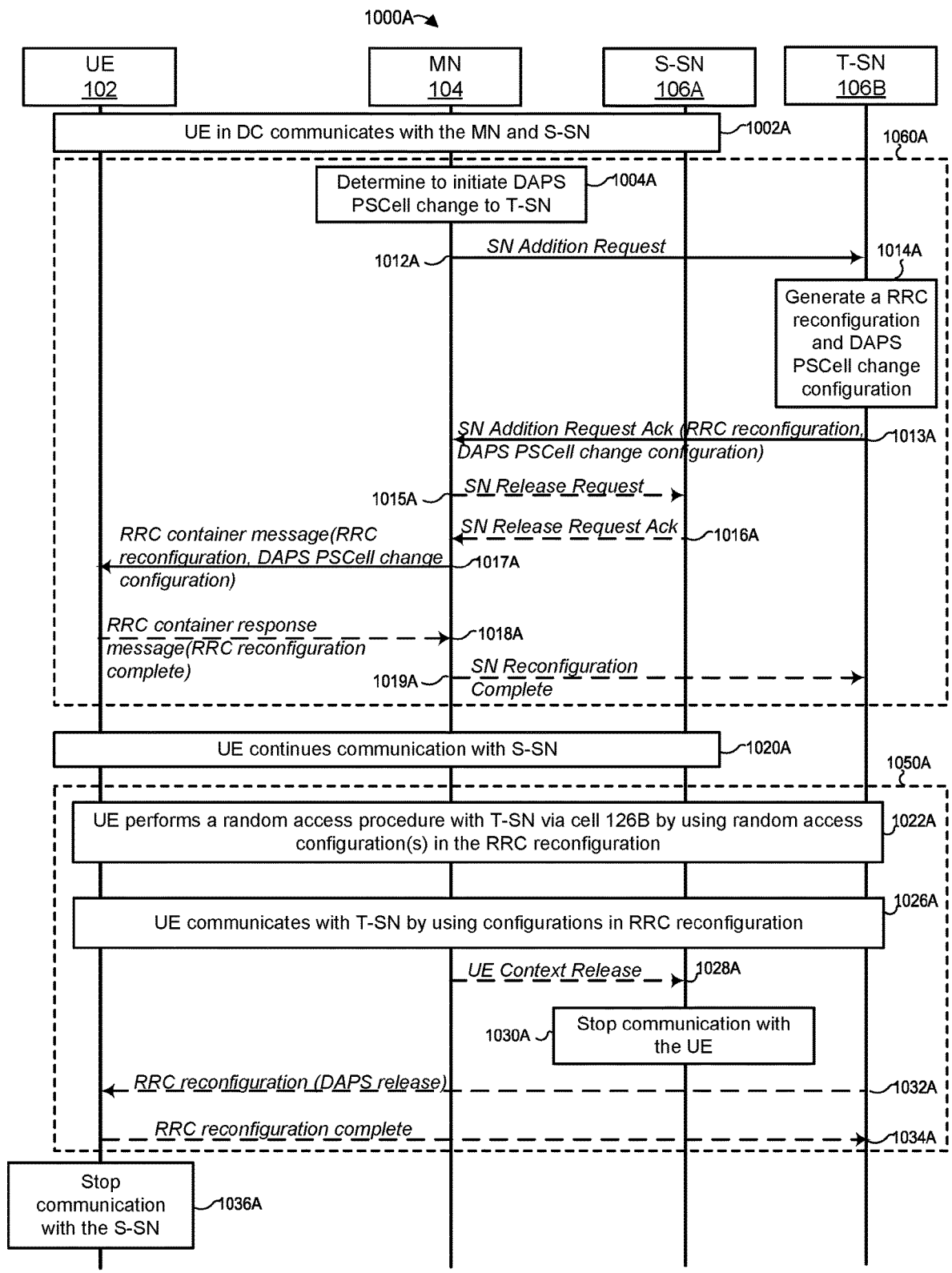
FIGS. 10A and 10B are messaging diagrams of example scenarios in which an MN of the RAN initiates a DAPS PSCell change procedure for a UE, from a source SN to a target SN.

Referring first to FIG. 10A, according to a DAPS PSCell change scenario 1000A, the base station 104 operates as an MN for the UE 102, the base station 106A operates as an S-SN for the UE 102, and the base station 106B operates as a T-SN for the UE 102.

Initially, the UE 102 in DC communicates 1002A data with the MN 104 via PCell 124 by using an MN configuration, and with the S-SN 106A via PSCell 126A by using an SN configuration.

Later in time, the MN 104 determines 1004A to initiate DAPS PSCell change involving an SN change (i.e., MN-initiated DAPS SN addition or change procedure) for the T-SN 106B and the UE 102 to communicate via a T-PSCell 126B, e.g., blindly or in response to detecting a suitable event, similar to those described with respect to FIG. 3A.

In response to the determination 1004A, the MN 104 sends 1012A an SN Addition Request message to the T-SN 106B. In response, the T-SN 106B generates 1014A an RRC reconfiguration message and a DAPS PSCell change configuration (or a DAPS SN change indicator), and sends 1013A the RRC reconfiguration message and the DAPS PSCell change configuration in an SN Addition Request Acknowledge message to the MN 104. In some implementations, in response to the determination 1004A, the MN 104 sends 1015A an SN Release Request message (or alternatively, an SN Modification Request message) to the S-SN 106A to request the S-SN 106A to perform DAPS PSCell change or to continue communicating with the UE 102. In other implementations, the MN 104 may not send an SN Release Request message (or alternatively, an SN Modification Request message) to the S-SN 106A, causing the S-SN 106A to continue communicating with the UE 102 as the S-SN 106A is unaware of the DAPS SN change and therefore behaves as usual.

In response to receiving 1015A the SN Release Request message or the SN Modification Request message, the S-SN 106A continues communicating with the UE 102, and subsequently sends 1016A an SN Release Request Acknowledge message or an SN Modification Request Acknowledge message to the MN 104, respectively.

In response to receiving 1013A the RRC reconfiguration message and the DAPS PSCell change configuration from the T-SN 106B, the MN 104 includes the RRC reconfiguration message and the DAPS PSCell change configuration in an RRC container message, and transmits 1017A the RRC container message to the UE 102. In response, the UE 102 transmits 1018A an RRC container response message including an RRC reconfiguration complete message to the MN 104. In some implementations, the MN 104 can send 1019A an SN Reconfiguration Complete message to the T-SN 106B in response to the RRC container response message. The events 1004A, 1012A, 1014A, 1013A, 1015A, 1016A, 1017A, 1018A, 1019A are collectively referred to in FIG. 10A as the DAPS PSCell change preparation procedure 1060A.

The DAPS PSCell change configuration enables the UE 102 to use a DAPS to communicate with the S-SN 106A via PSCell 126A and T-SN 106B via T-PSCell 126B (during and after a successful DAPS PSCell change). As such, in response to receiving 1017A the RRC container message, the UE 102 and the S-SN 106A continue 1020A communicating with each other (i.e., in DC with the MN 104) while the UE 102 attempts to perform DAPS PSCell change to the T-BS 106B via T-PSCell 126B in accordance with the RRC reconfiguration message included in the RRC container message. In attempting to perform the DAPS PSCell change, the UE 102 initiates 1022A a random access procedure with the T-SN 106B via T-PSCell 126B, e.g., by using one or more random access configurations in the RRC reconfiguration message. After the T-SN 106B identifies the UE 102 during the random access procedure (e.g., the UE 102 succeeds the contention resolution), the UE 102 communicates 1026A in DC with MN 104 and the T-SN 106B via T-PSCell 126B by using configurations in the RRC configuration message, while continuing to communicate with the S-SN 106A.

The MN 104 can send 1028A a UE Context Release message to the S-SN 106A after receiving 1018A the RRC container response message. The S-SN 106A stops 1030A communicating with the UE 102 in response to or after receiving the UE Context Release message. Alternatively, the S-SN 106A stops 1030A communicating with the UE 102 if the S-SN 106A does not receive DL data packets from the CN 110 (e.g., S-GW 112 or UPF 162).

As the UE 102 no longer needs to use the DAPS to continue communicating with the S-SN 106A, the T-SN 106B can transmit 1032A an RRC reconfiguration message that includes a DAPS release indicator to the UE 102, e.g., via an SRB (e.g., SRB3) between the UE 102 and the T-SN 106B or via the MN 104. In response to the RRC reconfiguration message, the UE 102 can transmit 1034A an RRC reconfiguration complete message to the T-SN 106B via the SRB (e.g., SRB3) between the UE 102 and the T-SN 106B or via the MN 104, and stop 1036A communicating with the S-SN 106A. In some implementations, in response to the DAPS release indicator, a RF chip, receiver, or a transceiver of the UE 102 used to communicate with the S-SN 106A during the DAPS PSCell change can enter into low power consumption mode, sleep mode, or be turned off entirely if the DAPS PSCell change is an inter-frequency DAPS PSCell change. The events 1022A, 1026A, 1028A, 1030A, 1032A, 1034A are collectively referred to in FIG. 10A as the DAPS PSCell change and DAPS release procedure 1050A.

In some implementations, events 1012A, 1014A, and 1013A occur before, after, or simultaneously with events 1015A, 1016A.

In some implementations, the S-SN 106A sends a first sequence number (SN) Status Transfer message to the MN 104 after or in response to receiving 1016A the SN Release Request message or the SN Modification Request message, and in turn, the MN 104 forwards content of the first SN Status Transfer message to the T-SN 106B. The first SN Status Transfer message can convey a DL PDCP sequence number (SN) transmitter status for a DRB as a result of the DAPS PSCell change. The T-SN 106B can configure the DRB using the DAPS PSCell change configuration. In one implementation, the DL PDCP SN transmitter status indicates PDCP SN and hyper frame number (HFN) of the first PDCP SDU that the S-SN 106A forwards to the T-SN 106B. The S-SN 106A may not stop assigning PDCP SNs to DL PDCP SDUs or delivering UL packets in UL PDCP SDUs or UL PDCP SDUs to the UPF 162 until the S-SN 106A sends a second (e.g., last) SN Status Transfer message or content of the second SN Status Transfer message to the T-SN 106B via the MN 104. The S-SN 106A can send the second SN Status Transfer message to the MN 104 in response to or after the T-SN 106B receiving 1019A the SN Reconfiguration Complete message. In turn, the MN 104 can forward the second SN Status Transfer message (or the content of the second SN Status Transfer message) to the S-SN 106A.

In some implementations, the MN 104 performs a Path Update procedure involving the CN 110 (e.g., MME114/S-GW 112 or AMF164/UPF 162) to update the data path between the S-SN 106A and the CN 110 to an updated data path between the T-SN 106B and the CN 110 in response to or after transmitting the SN Reconfiguration Complete message or receiving an SN Status Transfer message from the S-SN 106A. After updating the data path, the CN 110 sends DL data packets to the T-SN 106B instead of the S-SN 106A. In the Path Update procedure, the MN 104 (e.g., MeNB) in one implementation sends an E-RAB Modification Indication message to the MME 114, which in turn performs a Bearer Modification procedure with the S-GW 112 upon receiving the E-RAB Modification Indication message. As a result, the S-GW 112 updates the data path to the T-SN 106B. In another implementation, the MN 104 (e.g., Mng-eNB or MgNB) sends a PDU Session Resource Modify Indication message to the AMF 164, which in turn performs a Bearer Modification procedure with the UPF 162 upon receiving the PDU Session Resource Modify Indication message. As a result, the UPF 162 updates the data path to the T-SN 106B.

In some implementations, the MN 104 sends 1028A the UE Context Release message to the S-SN 106A after forwarding the second SN Status Transfer message or its content to the S-SN 106A, or after completing the Path Update procedure.

In some implementations, after successfully completing the random access procedure, the UE 102 can start transmitting UL data PDUs to the T-SN 106B via the cell 126B, stop transmitting and retransmitting UL data PDUs to the S-SN 106A, stop transmitting control signals on PUCCH(s) to the S-SN 106A, stop transmitting new UL data PDUs to the S-SN 106A while continuing to retransmit UL data PDU(s) to the S-SN 106A, continue DL communication with the S-SN 106A, and/or keep transmitting control signals to the S-SN 106A until event 1032A occurs or the DAPS release timer at the UE 102 expires, as described above with respect to FIG. 3A. In some implementations, the S-SN 106A or T-SN 106B configures a time value for the DAPS release timer in the RRC reconfiguration message. Upon receiving 1017A, 1032A the RRC reconfiguration message, the UE 102 starts the DAPS release timer. If the DAPS release timer expires, the UE 102 stops 1036A communicating with the S-SN 106A. Alternatively, the UE 102 uses a predetermined timer value if the S-SN 106A or T-SN 106B does not include the timer value in the RRC reconfiguration message.

In some implementations, the T-SN 106B includes multiple configuration parameters in the RRC reconfiguration message to configure radio resources for the UE 102 to communicate with the T-SN 106B via the PSCell 126B. The multiple configuration parameters can configure physical layer, medium access control (MAC) layer, and radio link control bearers. The DAPS PSCell change configuration can be associated or specific to a radio bearer (e.g., DRB). For example, the T-SN 106B can include the DAPS PSCell change configuration in an RB configuration (e.g., Radio-BearerConfig IE, DRB-ToAddModList IE or DRB-ToAddMod IE) in the SN Addition Request Acknowledge message at event 1013A, and the MN 104 can include the RB configuration in the RRC container message at event 1017A. The S-SN 106A can also configure the particular DRB and transmit a RB configuration configuring the particular DRB to the UE 102.

In some implementations, the T-SN 106B can configure SCell(s) of the T-SN 106B in the multiple configuration parameters in the RRC reconfiguration message to configure radio resources for the UE 102 to communicate with the T-SN 106B via the SCell(s). In one such implementation, the T-SN 106B can include one or more SCell configurations configuring the SCell(s) and their states in the RRC reconfiguration message at event 1014A, and the UE 102 can determine the states of the SCell(s) according to the one or more SCell configurations. Particularly, the T-SN 106B can configure the SCell(s) to first be in deactivated state(s) while the UE 102 performs the DAPS procedure, and then transition to activated state(s) after releasing the DAPS at event 1032A. The T-SN 106B can transmit RRC message(s), MAC control element(s), or DCI command(s) to the UE 102 to configure the SCell(s) to be in activated state(s).

In some implementations, while performing the DAPS procedure, the UE 102 keeps an SCell of the S-SN 106A in activated state if the SCell is configured at event 1002A. The UE 102 can release the SCell of the S-SN 106A in response to the DAPS release at event 1032A. In other implementations, the T-SN 106B can include a release indication of the SCell of the S-SN 106A in the RRC reconfiguration message 1014A that is transmitted to the UE 102, and the UE 102 does not release the SCell in response to the RRC reconfiguration message at event 1014A, and instead releases the SCell in response to the DAPS release at event 1032A. In yet other implementations, the T-SN 106B can include a release indication of the SCell of the S-SN 106A in the RRC reconfiguration message at event 1032A that is transmitted to the UE 102, and the UE 102 does not release the SCell of the S-SN 106A in response to the handover command message, and instead releases the SCell in response to the release indication.

In some implementations, the T-SN 106B may not configure an SCell to the UE 102 in the RRC reconfiguration message. The T-SN 106B can later transmit RRC reconfiguration message(s) to the UE 102 to configure SCell(s) of the T-SN 106B. In response, the UE 102 can transmit an RRC reconfiguration complete message to the T-SN 106B via the PSCell 126B or a configured SCell for each of the RRC reconfiguration message(s).

In some implementations, the T-SN 106B identifies the UE 102 if the T-SN 106B receives a UE identifier (e.g., a C-RNTI) or a random access preamble from the UE 102 during the random access procedure. The UE identifier or random access preamble can be assigned by the T-SN 106B, in some implementations.

If the S-SN 106A is a gNB, the RRC reconfiguration message can be an RRCReconfiguration message and the RRC reconfiguration complete message can be an RRCReconfigurationComplete message as defined in 3GPP TS 38.331. If the S-SN 106A is an ng-eNB, the RRC reconfiguration message can be an RRCConnectionReconfiguration message and the RRC reconfiguration complete message can be an RRCConnectionReconfigurationComplete message as defined in 3GPP TS 36.331.

Inter-Frequency DAPS PSCell Change

Similar to the manner in which the DAPS handover capability discussed above in FIG. 3A can indicate that the UE 102 is capable of inter-frequency DAPS handover for one or more frequency bands, or for FDD and/or TDD modes, the DAPS PSCell change capability can indicate that the UE 102 is capable of inter-frequency DAPS PSCell change for one or more frequency bands, or for FDD or TDD modes. The MN 104, S-SN 106A, or T-SN 106B determines that the UE 102 is capable of the inter-frequency DAPS PSCell change for one or more frequency bands by referring to the DAPS PSCell change capability.

Similar to the manner in which the DAPS handover capability discussed above in FIG. 3A can indicate that the UE 102 is capable of DAPS handover which may or may not exclude the intra-frequency DAPS handover, the DAPS PSCell change capability can generally indicate that the UE 102 is capable of DAPS PSCell change which may or may not exclude the intra-frequency DAPS PSCell change. Similar to the manner in which the UE Capability IE discussed above in FIG. 3A can include one or more DC/CA band combination fields/IEs, the MN 104, S-SN 106A, T-SN 106B can determine that the UE 102 is capable of the inter-frequency DAPS PSCell change by referring to the DAPS PSCell change capability and the DC/CA band combination field/IE in a similar manner described above in FIG. 3A.

In some implementations or scenarios, the cells 126A and 126B are similar to cells 124 and 126B discussed above in FIG. 3A. Similar to the manner in which the S-BS 104 requests the T-BS 106B to configure DAPS handover or non-DAPS inter-frequency handover in the Handover Request message discussed above in FIG. 3A, the MN 104 can request the DAPS PSCell change or non-DAPS PSCell change in the SN Addition Request message. Similar to the manner in which the T-BS 106B configures cell 126B in the handover command message discussed above in FIG. 3A, the T-BS 106B configures the cell 126B in the RRC reconfiguration message.

Intra-Frequency DAPS PSCell Change

Similar to the manner in which the DAPS handover capability discussed above in FIG. 3A can indicate that the UE 102 is capable of intra-frequency DAPS handover for one or more frequency bands, and similar to the manner in which the DAPS PSCell change capability can indicate that the UE 102 is capable of intra-frequency DAPS handover for FDD and/or TDD modes, the DAPS PSCell change capability can indicate that the UE 102 is capable of intra-frequency DAPS PSCell change for one or more frequency bands, or for FDD and/or TDD modes.

Similar to the manner in which the UE Capability IE discussed above in FIG. 3A can include one or more DC/CA band combination fields/IEs, the MN 104, S-SN 106A, T-SN 106B can determine that the UE 102 is capable of the intra-frequency DAPS PSCell change by referring to the DAPS PSCell change capability and the DC/CA band combination field/IE in a similar manner described above in FIG. 3A.

In some implementations or scenarios, the cells 126A and 126B are similar to cells 124 and 126B discussed above in FIG. 3A. Similar to the manner in which the S-BS 104 requests the T-BS 106B to configure DAPS handover or non-DAPS intra-frequency handover in the Handover Request message discussed above in FIG. 3A, the MN 104 can request the DAPS PSCell change or non-DAPS PSCell change in the SN Addition Request message. Similar to the manner in which the T-BS 106B configures cell 126B in the handover command message discussed above in FIG. 3A, the T-SN 106B configures the cell 126B in the PSCell change command message.

Synchronous or Asynchronous DAPS PSCell Change

Similar to the manner in which the DAPS handover capability discussed above in FIG. 3A can indicate that the UE 102 is capable of synchronous DAPS handover and/or asynchronous DAPS handover (e.g., using "synchronous" and/or "asynchronous" indicators), the DAPS PSCell change capability indicates that the UE 102 is capable of synchronous DAPS PSCell change and/or asynchronous DAPS PSCell change.

Similar to the manner in which the S-BS 104 can send a Handover Request message to request the T-BS 106B to prepare the DAPS handover or non-DAPS handover in the handover command message discussed above in FIG. 3A, the MN 104 can send an SN Addition Request message to request the T-SN 106B to prepare the DAPS PSCell change or non-DAPS PSCell change in an RRC reconfiguration message.

Figure 10B:
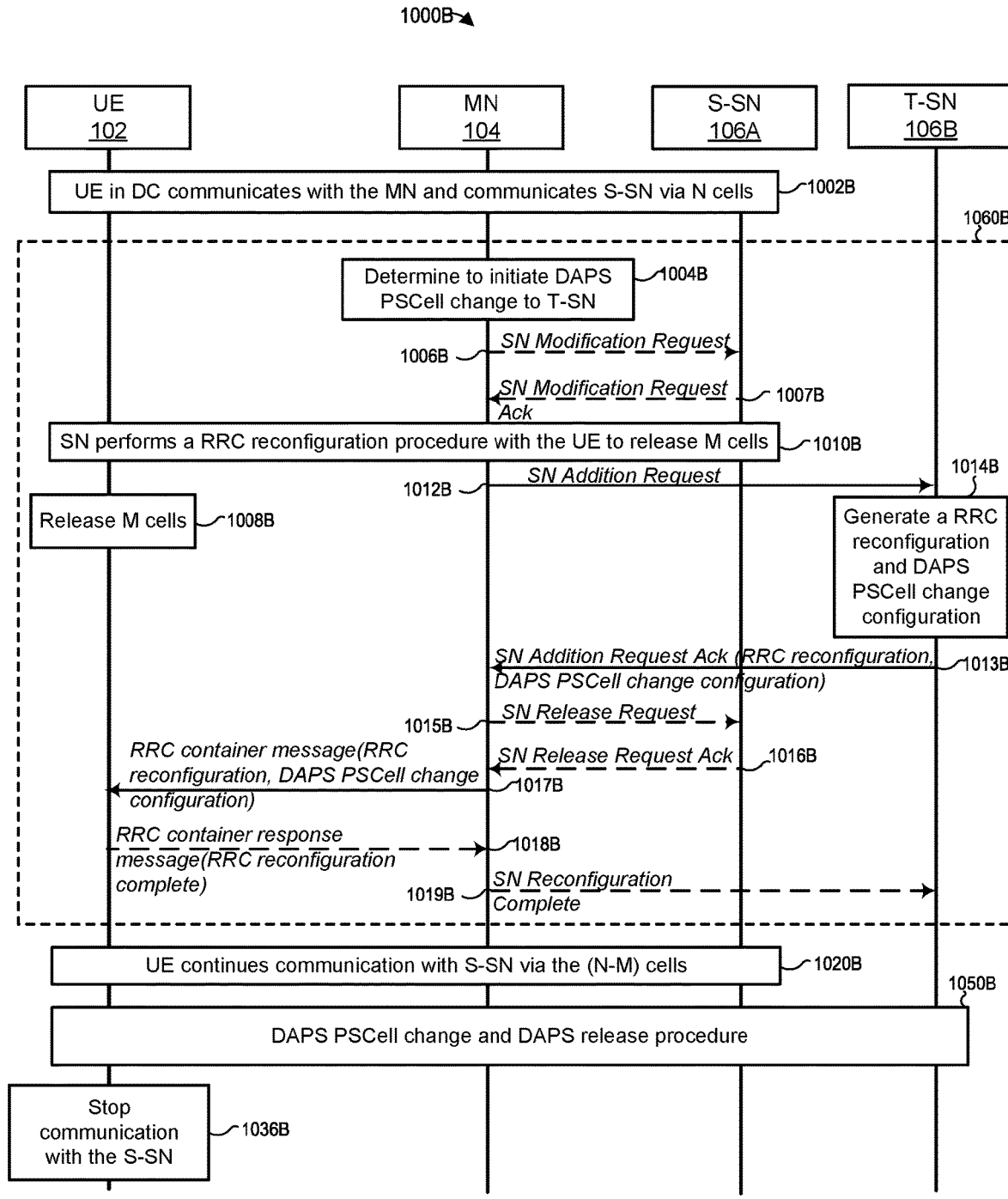

In FIG. 10B, in a DAPS PSCell change scenario 1000B, the base station 104 operates as an MN for the UE 102, the base station 106A operates as an S-SN for the UE 102, and the base station 106B operates as a T-SN for the UE 102.

Initially, whereas in FIG. 10A the UE 102 in DC communicates data with the MN 104 via PCell 124 and with the S-SN 106A via PSCell 126A, in FIG. 10B the UE 102 in DC communicates 1002B data with the MN 104 via PCell 124 by using an MN configuration, and with the S-SN 106A via N cells (including the PSCell 126A and one or more SCells) by using an SN configuration.

Later in time, the MN 104 determines 1004B to initiate DAPS PSCell change involving an SN change for the T-SN 106B and the UE 102 to communicate via a T-PSCell 126B, e.g., blindly or in response to detecting a suitable event, similar to those described with respect to FIG. 3A.

In response to the determination 1004B, the MN 104 sends 1006B an SN Modification Request message to the S-SN 106A to request the S-SN 106A to release M cells, where M is a whole number less than N (i.e., 0<M<N). The M cells can be one, some, or all of the SCells covered by the S-SN 106A.

In response, the S-SN 106A sends 1007B an SN Modification Request Acknowledge message to the MN 104 and performs 1010B an RRC reconfiguration procedure with the UE 102 for the UE 102 to release the M cells. In one implementation, during the RRC reconfiguration procedure, the S-SN 106A transmits, to the MN 104, the SN Modification Request Acknowledge message including an RRC reconfiguration message configuring the UE 102 to release M cells, which in turn transmits the RRC reconfiguration message to the UE 102. In response, the UE 102 can transmit an RRC reconfiguration complete message to the MN 104, which in turn can forward the RRC reconfiguration complete message to the S-SN 106A. In another implementation, during the RRC reconfiguration procedure, the S-SN 106A transmits the RRC reconfiguration message to the UE 102 via an SRB (e.g., SRB3) established for exchanging RRC messages between the UE 102 and the S-SN 106A. In response, the UE 102 can transmit an RRC reconfiguration complete message to the S-SN 106A via the SRB. In response to the S-SN 106A performing the RRC reconfiguration procedure (e.g., receiving the RRC reconfiguration message), the UE 102 releases 1008B the M cells.

In response to the determination 1004B, the MN 104 sends 1012B an SN Addition Request message to the T-SN 106B, similar to event 1012A. In response, the T-SN 106B generates 1014B an RRC reconfiguration message that includes a DAPS PSCell change configuration (or a DAPS SN change indicator), similar to event 1014A, and sends 1013B the RRC reconfiguration message and the DAPS PSCell change configuration in an SN Addition Request Acknowledge message to the MN 104, similar to event 1013A.

In some implementations, in response to the determination 1004B, the MN 104 sends 1015B an SN Release Request message (or alternatively, an SN Modification Request message) to the S-SN 106A, similar to event 1015A. In response to receiving 1015B the SN Release Request message or the SN Modification Request message, the S-SN 106A continues communicating with the UE 102 and subsequently sends 1016B an SN Release Request Acknowledge message or an SN Modification Request Acknowledge message to the MN 104, respectively, similar to event 1016A.

In response to receiving 1013B the RRC reconfiguration message and the DAPS PSCell change configuration from the T-SN 106B, the MN 104 includes the RRC reconfiguration message and the DAPS PSCell change configuration in an RRC container message, and transmits 1017B the RRC container message to the UE 102, similar to event 1017A. In response, the UE 102 transmits 1018B an RRC container response message including an RRC reconfiguration complete message to the MN 104, similar to event 1018A.

In some implementations, the MN 104 can send 1019B an SN Reconfiguration Complete message to the T-SN 106B in response to the RRC container response message, similar to event 1019A. The events 1004B, 1006B, 1007B, 1008B, 110B, 1012B, 1014B, 1013B, 1015B, 1016B, 1017B, 1018B, 1019B are collectively referred to in FIG. 10B as the DAPS PSCell change preparation procedure 1060B.

The DAPS PSCell change configuration enables the UE 102 to use a DAPS to communicate with the S-SN 106A via the N-M cells and T-SN 106B via PSCell 126B (during and after a successful DAPS PSCell change). As such, in response to receiving 1017B the RRC container message, the UE 102 and the S-SN 106A continue 1020B communicating with each other via the N-M cells, while the UE 102 attempts to perform DAPS PSCell change to the T-BS 106B in accordance with the RRC reconfiguration message included in the RRC container message. Particularly, the UE 102, MN 104, S-SN 106A, and T-SN 106B collectively perform a DAPS PSCell change and DAPS release procedure 1050B, similar to procedure 1050A. Subsequently, the UE 102 stops 1036A communicating with the S-SN 106A.

Similar to the manner in which the S-BS 104 determines to configure the UE 102 to release M cells according to a DAPS handover capability discussed above in FIG. 3A, in some implementations, the MN 104, the S-SN 106A or the T-SN 106B determines to configure the UE 102 to release M cells according to a DAPS PSCell change capability in a UE Capability IE, similar to the one discussed above in FIG. 3A. The S-SN 106A or the T-SN 106B can receive the UE Capability IE from the MN 104 before the determination 1004B, e.g., while the base station 106A is in the process of being established as an SN for the UE 102.

For example, if the DAPS PSCell change capability indicates that the UE 102 is not capable of CA, the MN 104 or the S-SN 106A can configure the UE 102 to release all SCells (i.e., N−1 SCells). In another example, if the DAPS PSCell change capability indicates that the UE 102 is capable of communicating with the S-SN 106A using CA in N-P cells associated to one or more particular frequency bands, where P is a whole number greater than or equal to 0 and less than or equal to M (i.e., 0≤P≤M) during DAPS PSCell change, the S-BS 104 can configure the UE 102 to release M cells if N-M cells are associated to some or all of the one or more particular frequency bands. In yet another example, if the DAPS PSCell change capability indicates that the UE 102 is not capable of DAPS PSCell change, the MN 104 can perform a non-DAPS PSCell change preparation procedure with the T-SN 106B. In such an example, instead of generating the RRC reconfiguration message that includes the DAPS PSCell change configuration (or an indication for the DAPS PSCell change configuration) at event 1014B, the T-SN 106B generates an RRC reconfiguration message that excludes the DAPS PSCell change configuration (or the indication for the DAPS PSCell change configuration).

In some implementations, the S-SN 106A determines to configure the UE 102 to release N−1 cells if the S-SN 106A is unaware whether the UE 102 is capable of DAPS PSCell change with CA. The S-SN 106A can ensure that the UE 102 can perform DAPS PSCell change by releasing the N−1 cells.

Figure 11A:
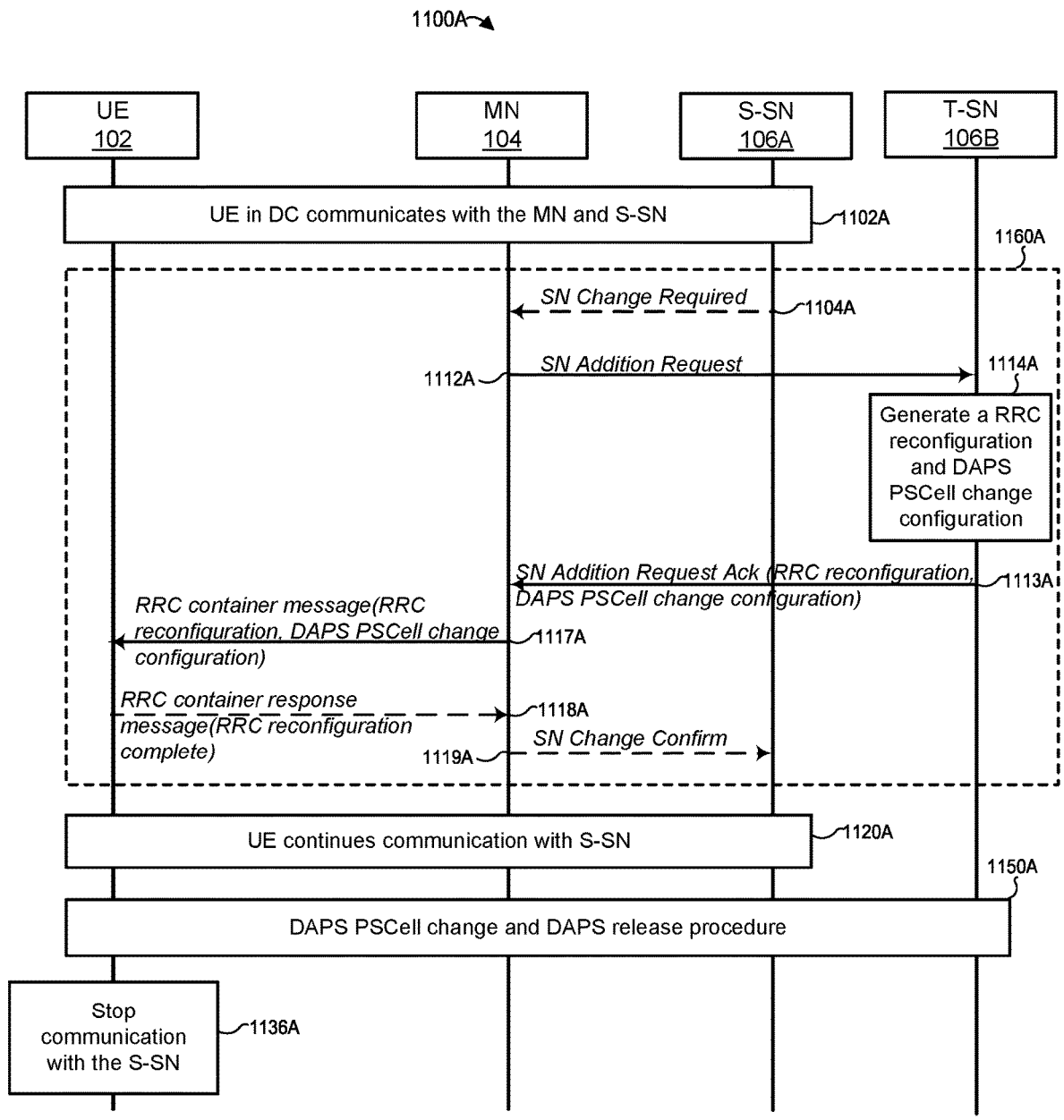
FIGS. 11A and 11B are messaging diagrams of example scenarios in which a source SN of the RAN initiates a DAPS PSCell change procedure for a UE, from the source SN to a target SN.

In FIG. 11A, in a DAPS PSCell change scenario 1100A, the base station 104 operates as an MN for the UE 102, the base station 106A operates as an S-SN for the UE 102, and the base station 106B operates as a T-SN for the UE 102.

Initially, the UE 102 in DC communicates 1102A data with the MN 104 via PCell 124 by using an MN configuration, and with the S-SN 106A via PCell 126A by using an SN configuration.

Later in time, whereas in FIG. 10A the MN 104 determines 1004A to initiate DAPS PSCell change involving an SN change for the T-SN 106B and the UE 102 to communicate via a T-PSCell 126B, in FIG. 11A the S-SN 106A determines to initiate DAPS PSCell change involving an SN change (i.e., SN-initiated DAPS SN addition or change procedure) for the T-SN 106B and the UE 102 to communicate via a T-PSCell 126B, e.g., blindly or in response to detecting a suitable event, similar to those described with respect to FIG. 3A. In an implementation of the SN-initiated DAPS SN addition or change procedure, the S-SN 106A sends 1104A an SN Change Required message to the MN 104. In response, the MN 104 sends 1112A an SN Addition Request message to the T-SN 106B, similar to event 1012A. In response, the T-SN 106B generates 1114A an RRC reconfiguration message that includes a DAPS PSCell change configuration (or a DAPS SN change indicator), similar to event 1014A, and sends 1113A the RRC reconfiguration message and the DAPS PSCell change configuration in an SN Addition Request Acknowledge message to the MN 104, similar to event 1013A.

In response to receiving 1113A the RRC reconfiguration message and the DAPS PSCell change configuration from the T-SN 106B, the MN 104 includes the RRC reconfiguration message and the DAPS PSCell change configuration in an RRC container message, and transmits 1117A the RRC container message to the UE 102, similar to event 1017A. In response, the UE 102 transmits 1118A an RRC container response message including an RRC reconfiguration complete message to the MN 104, similar to event 1018A. In some implementations, the MN 104 can send 1119A an SN Change Confirm message to the S-SN 106A in response to the RRC container response message. The events 1104A, 1112A, 1114A, 1113A, 1117A, 1118A, 1119A are collectively referred to in FIG. 11A as the DAPS PSCell change preparation procedure 1160A.

The DAPS PSCell change configuration enables the UE 102 to use a DAPS to communicate with the S-SN 106A via PSCell 126A and T-SN 106B via PSCell 126B (during and after a successful DAPS PSCell change). As such, in response to receiving 1117A the RRC container message, the UE 102 and the S-SN 106A continue 1120A communicating with each other (i.e., in DC with the MN 104) while the UE 102 attempts to perform DAPS PSCell change to the T-BS 106B in accordance with the RRC reconfiguration message included in the RRC container message, similar to event 1020A. Particularly, the UE 102, MN 104, S-SN 106A, and T-SN 106B collectively perform a DAPS PSCell change and DAPS release procedure 1150A, similar to procedure 1150A. Subsequently, the UE 102 stops 1136A communicating with the S-SN 106A, similar to event 1036A.

Figure 11B:
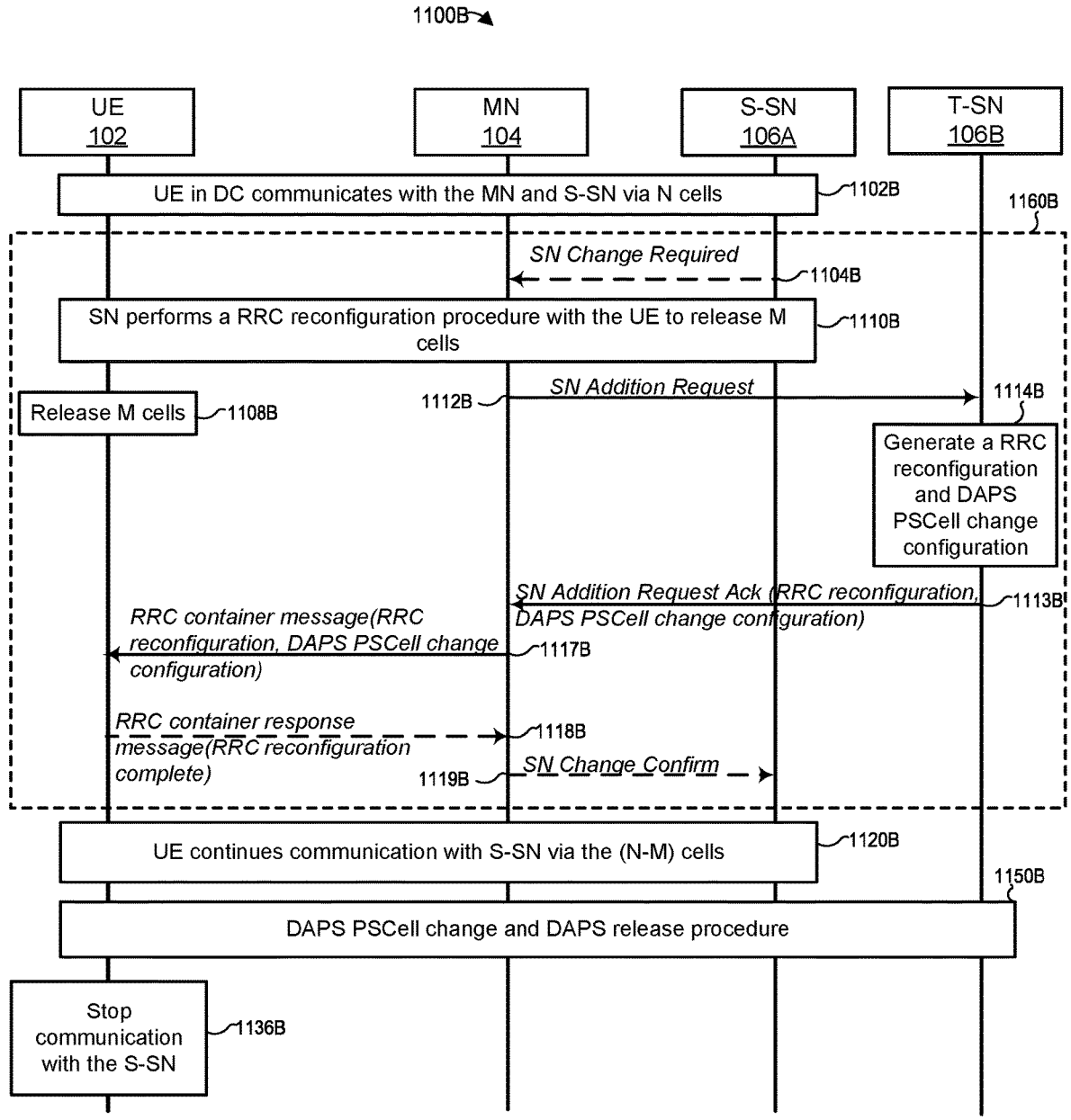

In FIG. 11B, in a DAPS PSCell change scenario 1100B, the base station 104 operates as an MN for the UE 102, the base station 106A operates as an S-SN for the UE 102, and the base station 106B operates as a T-SN for the UE 102.

Initially, whereas in FIG. 11A the UE 102 in DC communicates data with the MN 104 via PCell 124 and with the S-SN 106A via PSCell 126A, in FIG. 11B the UE 102 in DC communicates 1102B data with the MN 104 via PCell 124 by using an MN configuration, and with the S-SN 106A via N cells (including the PSCell 126A and one or more SCells) by using an SN configuration.

Later in time, the S-SN 106A determines to initiate DAPS PSCell change involving an SN change for the T-SN 106B and the UE 102 to communicate via a T-PSCell 126B. In response to the determination, the S-SN 106A sends 1104B an SN Change Required message to the MN 104 and performs 1110B an RRC reconfiguration procedure with the UE 102 for the UE 102 to release the M cells, similar to event 1010B. In response to the S-SN 106A performing the RRC reconfiguration procedure, the UE 102 releases 1108B the M cells, similar to event 1108B.

In response to the SN Change Required message, the MN 104 sends 1112B an SN Addition Request message to the T-SN 106B, similar to event 1112A. In response, the T-SN 106B generates 1114B an RRC reconfiguration message that includes a DAPS PSCell change configuration (or a DAPS SN change indicator), similar to event 1114A, and sends 1113B the RRC reconfiguration message and the DAPS PSCell change configuration in an SN Addition Request Acknowledge message to the MN 104, similar to event 1113A.

In response to receiving 1113B the RRC reconfiguration message and the DAPS PSCell change configuration from the T-SN 106B, the MN 104 include the RRC reconfiguration message and the DAPS PSCell change configuration in an RRC container message, and transmits 1117B the RRC container message to the UE 102, similar to event 1117A. In response, the UE 102 transmits 1118B an RRC container response message including an RRC reconfiguration complete message to the MN 104, similar to event 1118A. In some implementations, the MN 104 can send 1119B an SN Change Confirm message to the T-SN 106B in response to the RRC container response message, similar to event 1119A. The events 1104B, 1108B, 1110B, 1112B, 1114B, 1113B, 1117B, 1118B, 1119B are collectively referred to in FIG. 11B as the DAPS PSCell change preparation procedure 1160B.

The DAPS PSCell change configuration enables the UE 102 to use a DAPS to communicate with the S-SN 106A via the N-M cells and T-SN 106B via PSCell 126B (during and after a successful DAPS PSCell change). As such, in response to receiving 1117B the RRC container message, the UE 102 and the S-SN 106A continue 1120B communicating with each other via the N-M cells, while the UE 102 attempts to perform DAPS PSCell change to the T-BS 106B in accordance with the RRC reconfiguration message included in the RRC container message. Particularly, the UE 102, MN 104, S-SN 106A, and T-SN 106B collectively perform a DAPS PSCell change and DAPS release procedure 1150B, similar to procedure 1150A. Subsequently, the UE 102 stops 1136B communicating with the S-SN 106A, similar to event 1136A.

Figure 12A:
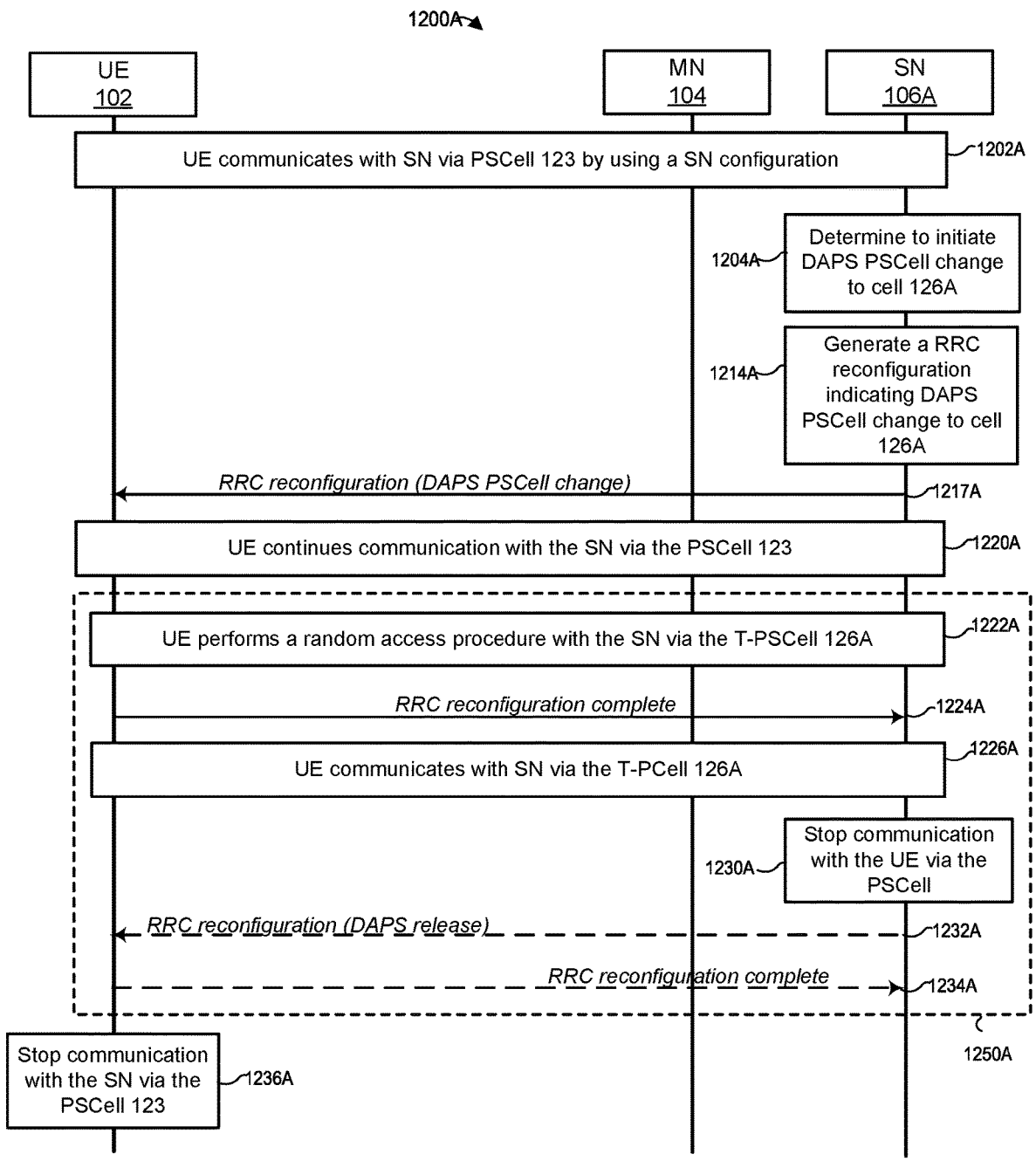
FIGS. 12A and 12B are messaging diagrams of example scenarios in which an SN of the RAN initiates a DAPS PSCell change procedure for a UE, from a source cell of the SN to a target cell of the SN.

In FIG. 12A, whereas in FIG. 10A the DAPS PSCell change scenario involves an SN change (i.e., a change from S-SN 106A to T-SN 106B), in FIG. 12A the DAPS PSCell change scenario 1200A does not involve an SN change.

Initially, the UE 102 in DC communicates 1202A data with the MN 104 via PCell 124 by using an MN configuration, and with the SN 106A via PSCell 123 by using an SN configuration.

Later in time, whereas in FIG. 10A the MN 104 determines 1004A to initiate DAPS PSCell change involving an SN change (i.e., MN-initiated DAPS SN addition or change procedure) for the T-SN 106B and the UE 102 to communicate via a T-PSCell 126B, in FIG. 12A the SN 106A determines 1204A to initiate DAPS PSCell change without involving an SN change (i.e., SN-initiated DAPS PSCell change procedure) for the SN 106A and the UE 102 to communicate via a T-PSCell 126A, e.g., blindly or in response to detecting a suitable event, similar to those described with respect to FIG. 3A.

In response to the determination 1204A, the SN 106A generates 1214A an RRC reconfiguration message that includes a DAPS PSCell change configuration (or a DAPS PSCell change indicator), similar to event 1014A, and transmits 1217A the RRC reconfiguration message to the UE 102.

The DAPS PSCell change configuration enables the UE 102 to use a DAPS to communicate with the SN 106A via PSCell 123 and via T-PSCell 126A (during and after a successful DAPS PSCell change). As such, in response to receiving 1217A the RRC reconfiguration message, the UE 102 and the SN 106A continue 1220A communicating with each other (i.e., in DC with the MN 104) while the UE 102 attempts to perform DAPS PSCell change to the T-PSCell 126A in accordance with the RRC reconfiguration message. In attempting to perform the DAPS PSCell change, the UE 102 initiates 1222A a random access procedure with the T-PSCell 126A, e.g., by using one or more random access configurations in the RRC reconfiguration message. After the SN 106A identifies the UE 102 during the random access procedure via the T-PSCell 126A, the UE 102 communicates 1226A in DC with MN 104 and the SN 106A via the T-PSCell 126A by using configurations in the RRC configuration message, while continuing to communicate via the PSCell 123. The UE 102 can also send 1224A an RRC reconfiguration complete message to the SN 106A after performing the random access procedure.

After receiving 1224A the RRC reconfiguration complete message or if the SN 106A does not receive DL data packets from the CN 110 via PSCell 123, the SN 106A stops 1230A communicating with the UE 102 via the PSCell 123.

As the UE 102 no longer needs to use the DAPS to continue communicating with the SN 106A via the PSCell 123, the SN 106A can transmit 1232A an RRC reconfiguration message that includes a DAPS release indicator to the UE 102, e.g., via an SRB (e.g., SRB3) between the UE 102 and the SN 106A or via the MN 104. In response to the RRC reconfiguration message, the UE 102 can transmit 1234A an RRC reconfiguration complete message to the SN 106A via the SRB (e.g., SRB3) between the UE 102 and the SN 106A or via the MN 104, and stop 1236A communicating with the S-SN 106A via the PCell 123. The events 1222A, 1224A, 1226A, 1230A, 1232A, 1234A are collectively referred to in FIG. 12A as the DAPS PSCell change and DAPS release procedure 1250A.

Figure 12B:
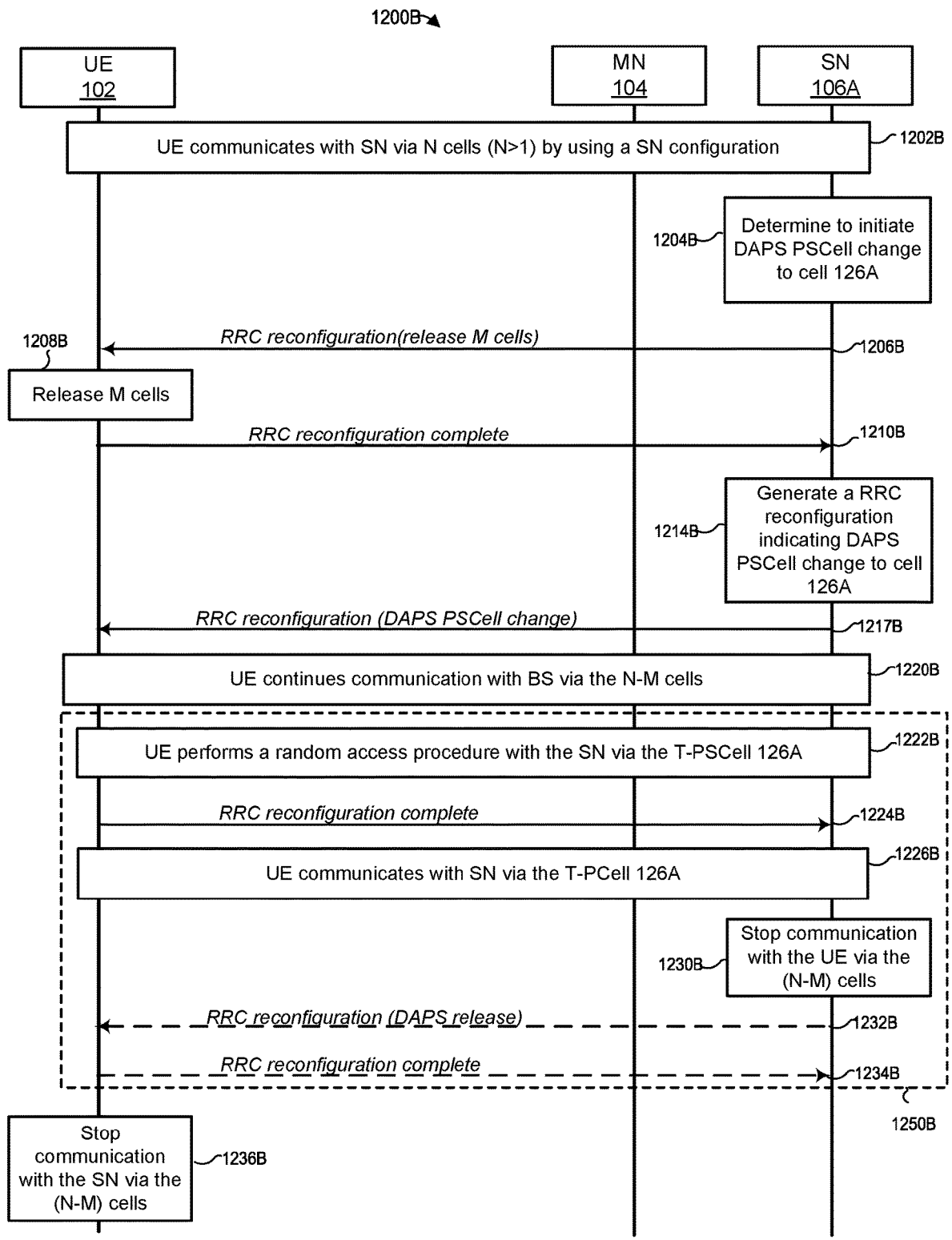

In FIG. 12B, whereas in FIG. 10B the DAPS PSCell change scenario involves an SN change (i.e., a change from S-SN 106A to T-SN 106B), in FIG. 12B the DAPS PSCell change scenario 1200B does not involve an SN change.

Initially, the UE 102 in DC communicates 1202B data with the MN 104 via PCell 124 by using an MN configuration, and with the S-SN 106A via N cells (including the PSCell 123 and one or more SCells) by using an SN configuration.

Later in time, whereas in FIG. 10B the MN 104 determines 1004B to initiate DAPS PSCell change involving an SN change (i.e., MN-initiated DAPS SN addition or change procedure) for the T-SN 106B and the UE 102 to communicate via a T-PSCell 126B, in FIG. 12B the SN 106A determines 1204B to initiate DAPS PSCell change without involving an SN change (i.e., SN-initiated DAPS PSCell change procedure) for the SN 106A and the UE 102 to communicate via a T-PSCell 126A, e.g., blindly or in response to detecting a suitable event, similar to those described with respect to FIG. 3A.

In response to the determination 1204B, the SN 106A sends 1206B an RRC reconfiguration message to the UE 102 to request the UE 102 to release M cells, where M is a whole number less than N (i.e., 0<M<N). The M cells can be one, some, or all of the SCells covered by the S-SN 106A. In response to receiving the RRC reconfiguration message, the UE 102 releases 1208B the M cells, and can transmit 1210B an RRC reconfiguration complete message to the SN 106A via an SRB.

In response to the determination 1204B, the SN 106A generates 1214B an RRC reconfiguration message that includes a DAPS PSCell change configuration (or a DAPS PSCell change indicator), and sends 1217B the RRC reconfiguration message to the UE 102, similar to event 1217A.

The DAPS PSCell change configuration enables the UE 102 to use a DAPS to communicate with the SN 106A via N-M cells (including PCell 123) and via T-PSCell 126A (during and after a successful DAPS PSCell change). As such, in response to receiving 1217B the RRC reconfiguration message, the UE 102 and the SN 106A continue 1220B communicating with each other (i.e., in DC with the MN 104) via N-M cells while the UE 102 attempts to perform DAPS PSCell change to the T-PSCell 126A in accordance with the RRC reconfiguration message. In attempting to perform the DAPS PSCell change, the UE 102 initiates 1222B a random access procedure with the T-PSCell 126A, e.g., by using one or more random access configurations in the RRC reconfiguration message. After the SN 106A identifies the UE 102 during the random access procedure via the T-PSCell 126A, the UE communicates 1226B in DC with MN 104 and the SN 106A via the T-PSCell 126A by using configurations in the RRC configuration message, while continuing to communicate via the PSCell 123. The UE 102 can also send 1224B an RRC reconfiguration complete message to the SN 106A after performing the random access procedure.

In some implementations, the SN 106A can combine the RRC reconfiguration message (at event 1206B) and the RRC reconfiguration message (at event 1217B) into a single RRC reconfiguration message. For example, the SN 106A can send 1217B a single RRC reconfiguration message for releasing the M cells to configure the DAPS PSCell change. Thus, the SN 106A need not transmit the RRC reconfiguration message at event 1206B, and the UE 102 need not transmit the RRC reconfiguration message at event 1210B.

After receiving 1224B the RRC reconfiguration complete message or if the SN 106A does not receive DL data packets from the CN 110 via PSCell 123, the SN 106A stops 1230B communicating with the UE 102 via the N-M cells.

As the UE 102 no longer needs to use the DAPS to continue communicating with the SN 106A via the N-M cells, the SN 106A can transmit 1232B an RRC reconfiguration message that includes a DAPS release indicator to the UE 102, e.g., via an SRB (e.g., SRB3) between the UE 102 and the SN 106A or via the MN 104. In response to the RRC reconfiguration message, the UE 102 can transmit 1234B an RRC reconfiguration complete message to the SN 106A via the SRB (e.g., SRB3) between the UE 102 and the SN 106A or via the MN 104, and stop 1236B communicating with the S-SN 106A via N-M cells. The events 1222B, 1224B, 1226B, 1230B, 1232B, 1234B are collectively referred to in FIG. 12B as the DAPS PSCell change and DAPS release procedure 1250B.

Figure 13A:
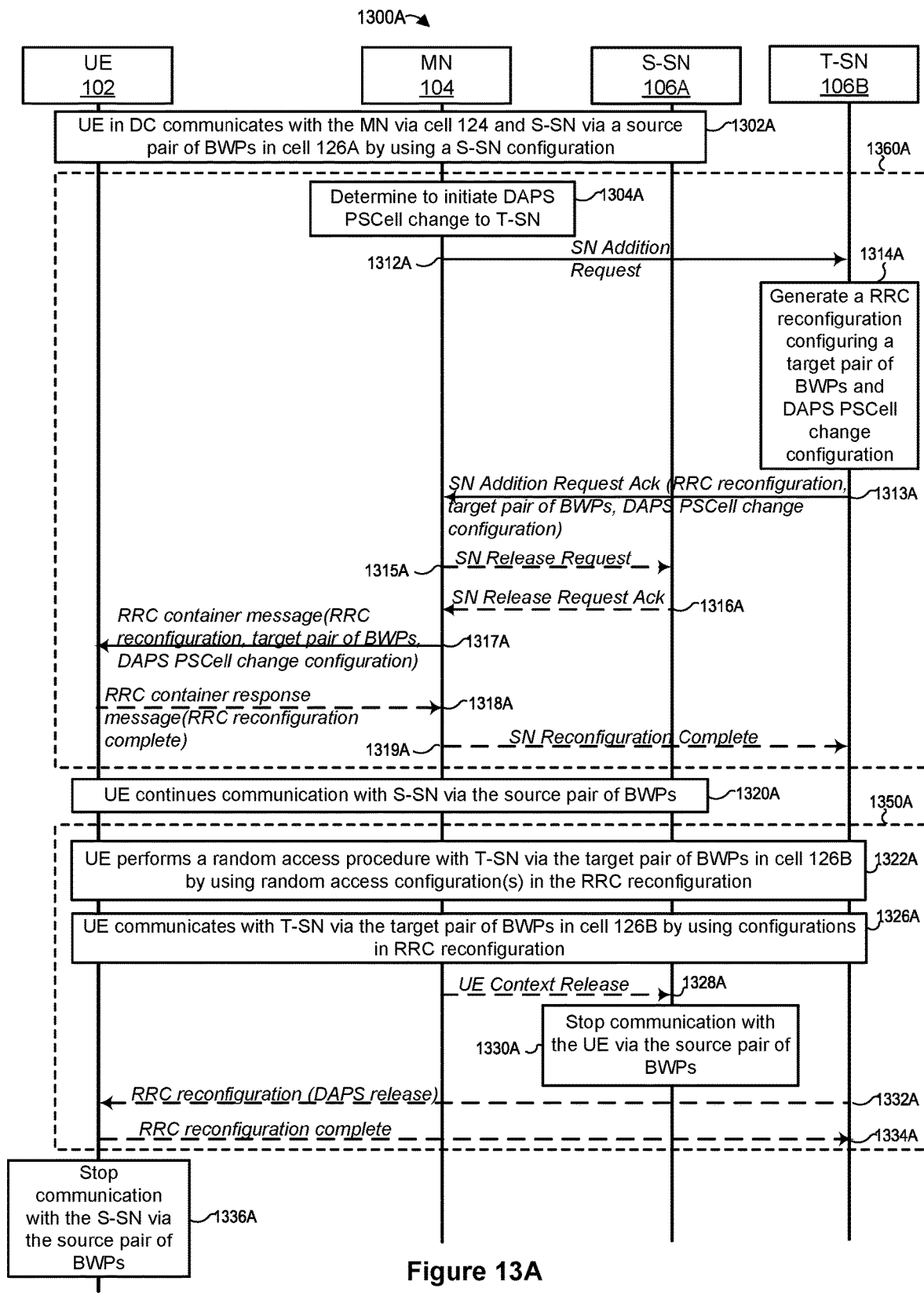
FIGS. 13A and 13B are messaging diagrams of example scenarios in which a RAN prepares a DAPS PSCell change procedure for a UE by configuring a target pair of bandwidth parts of a target cell that does not overlap with a source pair of bandwidth parts of a source cell via which the UE communicates prior to the UE performing DAPS PSCell change to the target cell.

In FIG. 13A, according to an intra-frequency DAPS PSCell change scenario 1300A, the base station 104 covering PCell 124 operates as an MN for the UE 102, the base station 106A covering PSCell 126A operates as an S-SN for the UE 102, and the base station 106B covering PSCell 126B operates as a T-SN for the UE 102. Cells 126A and 126B operate on the same or overlapped carrier frequencies.

Initially, the UE 102 in DC communicates 1302A data with the MN 104 via PCell 124 by using an MN configuration, and with the S-SN 106A via a source pair of BWPs in PSCell 126A by using an SN configuration. The source pair of BWPs includes a source UL BWP and a source DL BWP.

Later in time, the MN 104 determines 1304A to initiate DAPS PSCell change involving an SN change (i.e., MN-initiated DAPS SN addition or change procedure) for the T-SN 106B and the UE 102 to communicate via a T-PSCell 126B, e.g., blindly or in response to detecting a suitable event, similar to those described with respect to FIG. 3A.

In response to the determination 1304A, the MN 104 sends 1312A an SN Addition Request message to the T-SN 106B. In response, the T-SN 106B generates 1314A an RRC reconfiguration message to configure a target pair of BWPs in the T-PSCell 126B, and includes a DAPS PSCell change configuration (or a DAPS SN change indicator), and sends 1313A the RRC reconfiguration message and the DAPS PSCell change configuration in an SN Addition Request Acknowledge message to the MN 104. The T-SN 106B can include the target pair of BWPs in the RRC reconfiguration message. The target pair of BWPs includes a target UL BWP and a target DL BWP, and does not overlap with the source pair of BWPs in PSCell 126A. In some implementations, in response to the determination 1304A, the MN 104 sends 1315A an SN Release Request message (or alternatively, an SN Modification Request message) to the S-SN 106A to request the S-SN 106A to perform DAPS PSCell change or to continue communicating with the UE 102. In other implementations, the MN 104 may not send an SN Release Request message (or alternatively, an SN Modification Request message) to the S-SN 106A, causing the S-SN 106A to continue communicating with the UE 102 as the S-SN 106A is unaware of the DAPS SN change and therefore behaves as usual.

In response to receiving 1315A the SN Release Request message or the SN Modification Request message, the S-SN 106A continues communicating with the UE 102, and subsequently sends 1316A an SN Release Request Acknowledge message or an SN Modification Request Acknowledge message to the MN 104, respectively.

In response to receiving 1313A the RRC reconfiguration message and the DAPS PSCell change configuration from the T-SN 106B, the MN 104 includes the RRC reconfiguration message and the DAPS PSCell change configuration in an RRC container message, and transmits 1317A the RRC container message to the UE 102. As a result, the target pair of BWPs in T-PSCell 126B becomes available for the UE 102 when communicating with the T-BS 106B during and after a successful DAPS PSCell change, while the source pair of BWPs in PSCell 126A still remains available for the UE 102 to use when communicating with the S-SN 106A. In this way, the RAN (e.g., T-SN 106B, MN 104) ensures that intra-frequency DAPS PSCell change proceeds across non-overlapping BWPs, if the UE 102 is not capable of DAPS PSCell change on overlapping BWPs in a source cell and a target cell, or if the RAN (e.g., T-SN 106B, S-SN 106A) is not capable of DAPS PSCell change on one of the target pair of BWPs overlapped with one of the source pair of BWPs.

In response to the RRC container message, the UE 102 transmits 1318A an RRC container response message including an RRC reconfiguration complete message to the MN 104. In some implementations, the MN 104 can send 1319A an SN Reconfiguration Complete message to the T-SN 106B in response to the RRC container response message. The events 1304A, 1312A, 1314A, 1313A, 1315A, 1316A, 1317A, 1318A, 1319A are collectively referred to in FIG. 13A as the DAPS PSCell change preparation procedure 1360A.

The DAPS PSCell change configuration enables the UE 102 to use a DAPS to communicate with the S-SN 106A via PSCell 126A and T-SN 106B via T-PSCell 126B (during and after a successful DAPS PSCell change). As such, in response to receiving 1317A the RRC container message, the UE 102 and the S-SN 106A continue 1320A communicating with each other (i.e., in DC with the MN 104) via the source pair of BWPs in PSCell 126A while the UE 102 attempts to perform DAPS PSCell change to the T-BS 106B via T-PSCell 126B in accordance with the RRC reconfiguration message included in the RRC container message. In attempting to perform the DAPS PSCell change, the UE 102 initiates 1322A a random access procedure with the T-SN 106B via the target pair of BWPs in T-PSCell 126B, e.g., by using one or more random access configurations in the RRC reconfiguration message. After the T-BS 106B identifies the UE 102 during the random access procedure, the UE communicates 1326A in DC with MN 104 and the T-SN 106B via the target pair of BWPs in T-PSCell 126B by using configurations in the RRC configuration message, while continuing to communicate with the S-SN 106A.

The MN 104 can send 1328A a UE Context Release message to the S-SN 106A after receiving 1318A the RRC container response message. The S-SN 106A stops 1330A communicating with the UE 102 via the source pair of BWPs in PSCell 126A in response to or after receiving the UE Context Release message. Alternatively, the S-SN 106A stops 1330A communicating with the UE 102 if the S-SN 106A does not receive DL data packets from the CN 110 (e.g., S-GW 112 or UPF 162).

As the UE 102 no longer needs to use the DAPS to continue communicating with the S-SN 106A, the T-SN 106B can transmit 1332A an RRC reconfiguration message that includes a DAPS release indicator to the UE 102, e.g., via an SRB (e.g., SRB3) between the UE 102 and the T-SN 106B or via the MN 104. In response to the RRC reconfiguration message, the UE 102 can transmit 1334A an RRC reconfiguration complete message to the T-SN 106B via the SRB (e.g., SRB3) between the UE 102 and the T-SN 106B or via the MN 104, and stop 1336A communicating with the S-SN 106A via the source pair of BWPs in PSCell 126A. The events 1322A, 1326A, 1328A, 1330A, 1332A, 1334A are collectively referred to in FIG. 13A as the DAPS PSCell change and DAPS release procedure 1350A.

In some implementations, events 1312A, 1314A, and 1313A occur before, after, or simultaneously with events 1315A, 1316A.

In some implementations, the S-SN 106A sends a first sequence number (SN) Status Transfer message to the MN 104 after or in response to receiving 1316A the SN Release Request message or the SN Modification Request message, and in turn, the MN 104 forwards content of the first SN Status Transfer message to the T-SN 106B. The first SN Status Transfer message can convey a DL PDCP sequence number (SN) transmitter status for a DRB as a result of the DAPS SN change. The T-SN 106B can configure the DRB using the DAPS PSCell change configuration. In one implementation, the DL PDCP SN transmitter status indicates PDCP SN and HFN of the first PDCP SDU that the S-SN 106A forwards to the T-SN 106B. The S-SN 106A may not stop assigning PDCP SNs to DL PDCP SDUs or delivering UL packets in UL PDCP SDUs or UL PDCP SDUs to the UPF 162 until the S-SN 106A sends a second (e.g., last) SN Status Transfer message or content of the second SN Status Transfer message to the T-SN 106B via the MN 104. The S-SN 106A can send the second SN Status Transfer message to the MN 104 in response to or after the T-SN 106B receiving 1319A the SN Reconfiguration Complete message. In turn, the MN 104 can forward the second SN Status Transfer message to the S-SN 106A or the content to the S-SN 106A.

Figure 13B:
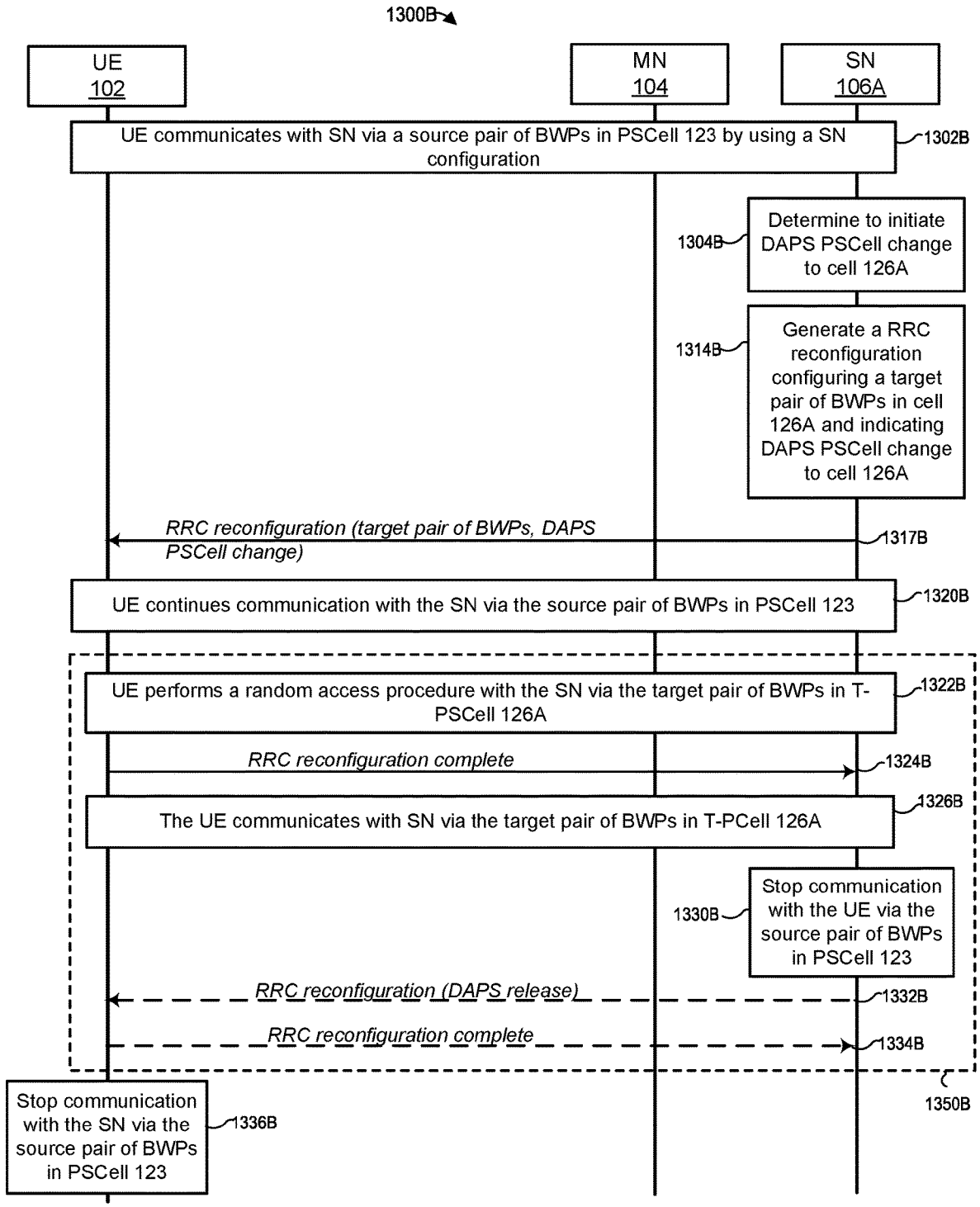

In FIG. 13B, whereas in FIG. 13A the intra-frequency DAPS PSCell change scenario 1300A involves an SN change (i.e., a change from S-SN 106A to T-SN 106B), in FIG. 13B the intra-frequency DAPS PSCell change scenario 1300B does not involve an SN change.

Initially, the UE 102 in DC communicates 1302B data with the MN 104 via PCell 124 by using an MN configuration, and with the SN 106A via a source pair of BWPs in PSCell 123 by using an SN configuration. The source pair of BWPs includes a source UL BWP and a source DL BWP.

Later in time, whereas in FIG. 13A the MN 104 determines 1304A to initiate DAPS PSCell change involving an SN change (i.e., MN-initiated DAPS SN addition or change procedure) for the T-SN 106B and the UE 102 to communicate via a T-PSCell 126B, in FIG. 13B the SN 106A determines 1304B to initiate DAPS PSCell change without involving an SN change (i.e., SN-initiated DAPS PSCell change procedure) for the SN 106A and the UE 102 to communicate via a T-PSCell 126A, e.g., blindly or in response to detecting a suitable event, similar to those described with respect to FIG. 3A. PSCell 123 and T-PSCell 126A operate on the same or overlapped carrier frequencies.

In response to the determination 1304B, the SN 106A generates 1314B an RRC reconfiguration message to configure a target pair of BWPs in the T-PSCell 126A, and includes a DAPS PSCell change configuration (or a DAPS PSCell change indicator), similar to event 1314A, and transmits 1317B the RRC reconfiguration message to the UE 102. The target pair of BWPs includes a target UL BWP and a target DL BWP, and does not overlap with the source pair of BWPs in PSCell 123. As a result, the target pair of BWPs in T-PSCell 126A becomes available for the UE 102 when communicating with the SN 106A during and after a successful DAPS PSCell change, while the source pair of BWPs in PSCell 123 still remains available for the UE 102 when communicating with the SN 106A. In this way, the SN 106A ensures that intra-frequency DAPS PSCell change proceeds across non-overlapping BWPs, if the UE 102 is not capable of DAPS PSCell change on overlapping BWPs in a source cell and a target cell, or if the RAN (e.g., T-SN 106B, S-SN 106A) is not capable of DAPS PSCell change on one of the target pair of BWPs overlapped with one of the source pair of BWPs.

The DAPS PSCell change configuration enables the UE 102 to use a DAPS to communicate with the SN 106A via PSCell 123 and via T-PSCell 126A (during and after a successful DAPS PSCell change). As such, in response to receiving 1317B the RRC reconfiguration message, the UE 102 and the SN 106A continue 1320B communicating with each other (i.e., in DC with the MN 104) via the source pair of BWPs in PSCell 123 while the UE 102 attempts to perform DAPS PSCell change to the T-PSCell 126A in accordance with the RRC reconfiguration message. In attempting to perform the DAPS PSCell change, the UE 102 initiates 1322B a random access procedure with the T-PSCell 126A, e.g., by using one or more random access configurations in the RRC reconfiguration message. After the SN 106A identifies the UE 102 during the random access procedure via the T-PSCell 126A, the UE 102 communicates 1326B in DC with MN 104 and the SN 106A via the target pair of BWPs in T-PSCell 126A by using configurations in the RRC configuration message, while continuing to communicate via the source pair of BWPs in the PSCell 123. The UE 102 can also send 1324B an RRC reconfiguration complete message to the SN 106A after performing the random access procedure.

After receiving 1324B the RRC reconfiguration complete message or if the SN 106A does not receive DL data packets from the CN 110 via PSCell 123, the SN 106A stops 1330B communicating with the UE 102 via the source pair of BWPs in PSCell 123.

As the UE 102 no longer needs to use the DAPS to continue communicating with the SN 106A via the PSCell 123, the SN 106A can transmit 1332B an RRC reconfiguration message that includes a DAPS release indicator to the UE 102, e.g., via an SRB (e.g., SRB3) between the UE 102 and the SN 106A or via the MN 104. In response to the RRC reconfiguration message, the UE 102 can transmit 1334B an RRC reconfiguration complete message to the SN 106A via the SRB (e.g., SRB3) between the UE 102 and the SN 106A or via the MN 104, and stop 1336B communicating with the S-SN 106A via the source pair of BWPs in PSCell 123. The events 1322B, 1324B, 1326B, 1330B, 1332B, 1334B are collectively referred to in FIG. 13B as the DAPS PSCell change and DAPS release procedure 1350B.

Figure 14:
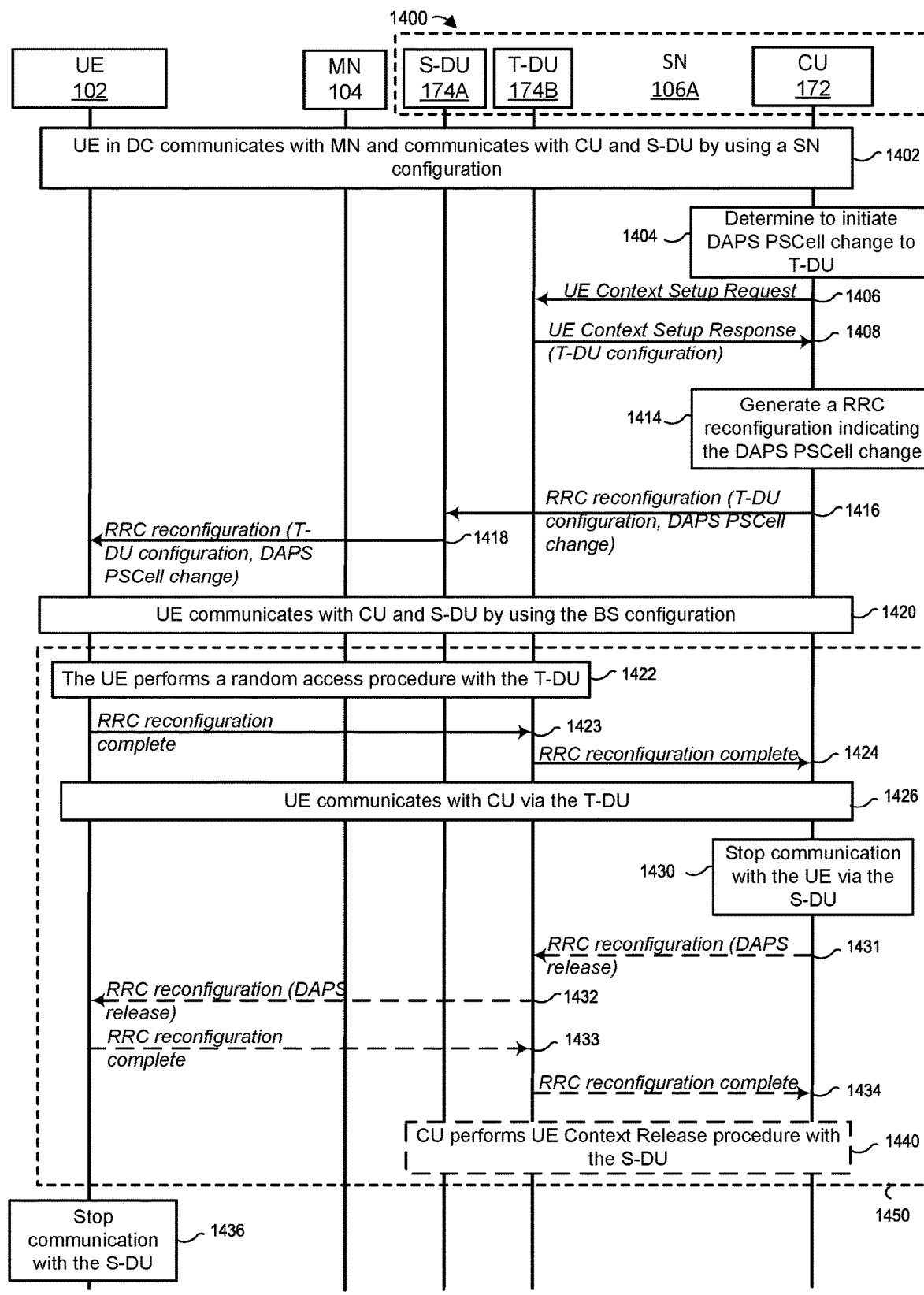
FIG. 14 is a messaging diagram of an example scenario in which a RAN prepares a UE to perform DAPS PSCell change, from a source DU of a base station of the RAN to a target DU of the base station.

In FIG. 14, in a DAPS PSCell change scenario 1400, the base station 106, which serves as an SN, includes a CU 172 for the UE 102, and two DUs 174 that operate as a source DU (S-DU) for the UE 102 and a target DU (T-DU) for the UE 102, respectively. Alternatively, the base station 106, includes a CU 172 for the UE 102, and three DUs 174 that operate as a master DU (M-DU) for the UE 102, a source DU (S-DU) for the UE 102, and a target DU (T-DU) for the UE 102, respectively.

Initially, the UE 102 in DC communicates 1402 data with the MN 104 via cell 122 and the base station 106A (which includes the CU 172 and S-DU 174A) via PSCell 123 by using an SN configuration. Alternatively, the UE 102 in DC communicates 1402 data with the M-DU 174 of the base station 106A and the CU 172 and S-DU 174A of the base station 106A via PSCell 123 by using a BS configuration Later in time, the CU 172 determines 1404 to initiate DAPS PSCell change for the T-DU 174B and the UE 102 to communicate via PSCell 126A, e.g., blindly or in response to detecting a suitable event, similar to those described with respect to FIG. 3A. For example, the CU 172 initiates DAPS PSCell change in response to measurement result(s) obtained by the CU 172 from measurements on signals received from the UE 102 via S-DU 174A.

In response to the determination 1404, the CU 172 sends 1406 a UE Context Setup Request message to the T-DU 174B. In response, the T-DU 174B sends 1408 a UE Context Setup Response message including a T-DU configuration to the CU 172. In turn, the CU 172 generates 1414 an RRC reconfiguration message which includes the T-DU configuration and a DAPS PSCell change configuration or an indication for the DAPS PSCell change configuration in a field or an IE. Then the CU 172 sends 1416 the RRC reconfiguration message to the S-DU 174A, which in turn transmits 1418 the RRC reconfiguration message to the UE 102.

The DAPS PSCell change configuration enables the UE 102 to use a DAPS to communicate with the S-DU 174A via PSCell 123 as well as T-DU 174B via T-PSCell 126A using the T-DU configuration during and after a successful DAPS PSCell change. As such, in response to the RRC reconfiguration message, the UE 102 and the base station 106 continue 1420 communicating with each other via the S-DU 174A by using the BS configuration, while the UE 102 attempts to perform DAPS PSCell change to the T-DU 174B via T-PSCell 126A in accordance with the RRC reconfiguration message. In attempting to perform the DAPS PSCell change, the UE 102 initiates 1422 a random access procedure with the T-DU 174B, e.g., by using one or more random access configurations in the T-DU configuration. After gaining access to a control channel, the UE 102 transmits 1423 an RRC reconfiguration complete message to the T-DU 174B during or after successfully completing the random access procedure, which in turn sends 1424 the RRC reconfiguration complete message to the CU 172. After the T-DU 174B identifies the UE 102 during the random access configuration, the UE 102 communicates 1426 control signals and data with the CU 172 via the T-DU 174B by using the T-DU configuration included in the RRC reconfiguration message. If the RRC reconfiguration message includes configurations (e.g., DAPS PSCell change configuration) generated by the CU 172, the UE 102 communicates 1426 with the CU 172 via the T-DU 174B by using the configurations generated by the CU 172.

After receiving 1424 the RRC reconfiguration complete message, the CU 172 stops 1430 communicating with the UE 102 via the S-DU 174A. The CU 172 can then send 1431 an RRC reconfiguration message that includes a DAPS release indicator to the T-DU 174B, which in turn can send 1432 the RRC reconfiguration message to the UE 102. In some implementations, the CU 172 stops 1430 communicating with the UE 102 after transmitting the RRC reconfiguration message to the T-DU 174B. In response to the RRC reconfiguration message, the UE 102 can transmit 1433 an RRC reconfiguration complete message to the T-DU 174B and stop 1436 communicating with the S-DU 174A. In turn, the T-DU 174B can send 1434 the RRC reconfiguration complete message to the CU 172.

As the UE 102 no longer needs to use the DAPS to continue communicating with the S-DU 174A, the CU 172 can perform 1440 a UE Context Release procedure with the S-DU 174A in response to the RRC reconfiguration complete message. Particularly, the CU 172 sends a UE Context Release Command message to the S-DU 174A, which in turn sends a UE Context Release Complete message to the CU 172 and stops communicating with the UE 102. By performing the UE Context Release procedure in response to the RRC reconfiguration complete message, the CU 172 maintains the UE context longer relative to a non-DAPS PSCell change procedure when performing a DAPS PSCell change procedure. The events 1422, 1423, 1424, 1426, 1430, 1431, 1432, 1433, 1434, 1440 are collectively referred to in FIG. 14 as the DAPS PSCell change and DAPS release procedure 1450.

In some implementations, the CU 172 in event 1416 can send a UE Context Modification Request message including the RRC reconfiguration message to the S-DU 174A. The S-DU 174A in turn can send a UE Context Modification Response message to the CU 172. In some implementations, the CU 172 can indicate not to stop data transmission to the UE 102 in the Context Modification Request message in response to the determination 1404, so that the S-DU 174A continues communicating with the UE 102. For example, the CU 172 may not include a "Transmission Action Indicator" IE in the Context Modification Request message, or include a "Transmission Action Indicator" IE set to "restart" in the Context Modification Request message to indicate not to stop data transmission to the UE 102. In other implementations, the CU 172 can include an IE indicating DAPS PSCell change in the Context Modification Request message so that the S-DU 174A continues communicating with the UE 102. In yet other implementations, the CU 172 in event 1416 can send a DL RRC Message Transfer message (instead of the UE Context Modification Request message) including the RRC reconfiguration message to the S-DU 174A.

Figure 15A:
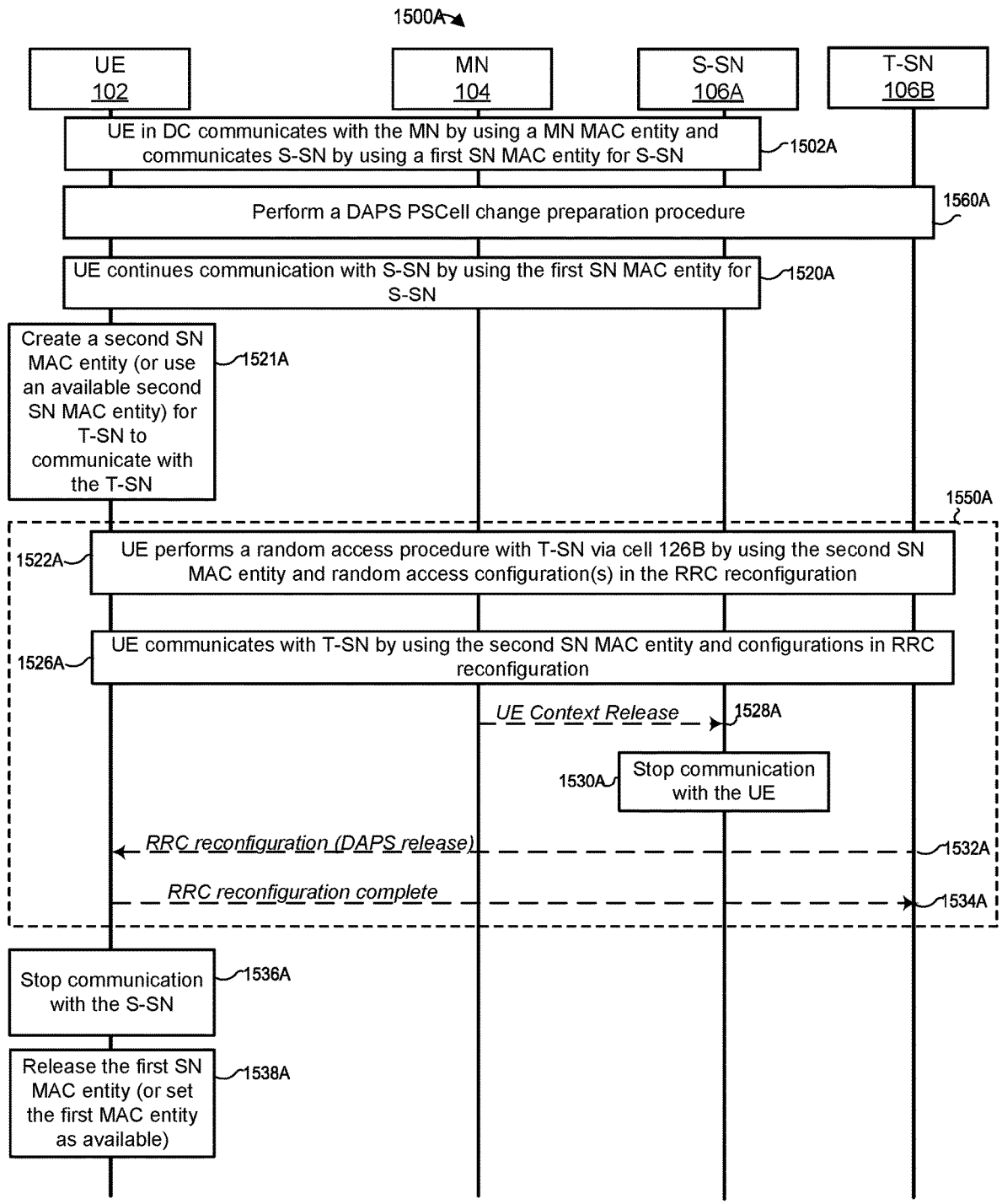
FIGS. 15A and 15B are messaging diagrams of example scenarios in which a RAN configures a UE to release (or otherwise set as available) a MAC entity after performing DAPS PSCell change.

In FIG. 15A, in a DAPS PSCell change scenario 1500A, the base station 104 operates as an MN for the UE 102, the base station 106A operates as an S-SN for the UE 102, and the base station 106B operates as a T-SN for the UE 102

Initially, the UE 102 in DC communicates 1502A data with the MN 104 by using an MN MAC entity, and with the S-SN 106A by using a first SN MAC entity.

Later in time, either the MN 104 or S-SN 106A initiates and performs 1560A a DAPS PSCell change preparation procedure, similar to events 1160A, 1160B, 1260A, 1260B. The DAPS PSCell change configuration received by the UE 102 during the DAPS PSCell change preparation procedure enables the UE 102 to use a DAPS to communicate with the MN 104 using the MN MAC entity and with the T-SN 106B using a second MAC entity during and after a successful DAPS PSCell change. After the DAPS PSCell change preparation procedure, the UE 102 and the S-SN 106A continue 1520A communicating with each other using the first MAC entity. The UE 102 also creates 1521A a second SN MAC entity to use when communicating with the T-SN 106B. Alternatively, the UE 102 uses 1521A an available second SN MAC entity to communicate with the T-SN 106B.

In response to the RRC reconfiguration message received during the DAPS PSCell change preparation procedure, the UE 102 attempts to perform a DAPS PSCell change to the T-SN 106B using the second SN MAC entity in accordance with the RRC reconfiguration message. In attempting to perform the DAPS PSCell change, the UE 102 initiates 1522A a random access procedure with the T-SN 106B using the second SN MAC entity, e.g., by using one or more random access configurations in the RRC reconfiguration message. After the T-SN 106B identifies the UE 102 during the random access procedure, the UE 102 communicates 1526A control signals and data (e.g., UL data PDUs) with the T-SN 106B using the second SN MAC entity and the DAPS PSCell change configuration in or otherwise indicated in the RRC reconfiguration message. The DAPS PSCell change configuration enables the UE 102 to continue communicating with the S-MN 104 while simultaneously communicating with the T-SN 106B.

After the UE 102 successfully communicates 1526A control signals and data with the T-SN 106B, the UE 102 can send 1528A a UE Context Release message to the S-SN 106A. After receiving the UE Context Release message, the S-SN 106A stops 1530A communicating with the UE 102.

As the UE 102 no longer needs to use the DAPS to continue communicating with the S-SN 106A, the T-SN 106B can send 1532A an RRC reconfiguration message that includes a DAPS release indicator to the UE 102. In response to the RRC reconfiguration message, the UE 102 can transmit 1534A an RRC reconfiguration complete message to the T-SN 106B and stop 1536A communicating (i.e., UL and/or DL communication) with the S-SN 106A. The events 1522A, 1526A, 1528A, 1532A, 1534A are collectively referred to in FIG. 15A as the DAPS PSCell change and DAPS release procedure 1550A.

In response to the RRC reconfiguration message or expiration of a DAPS release timer at the UE 102, the UE 102 also releases 1538A the first SN MAC entity (or resources of the first SN MAC entity). Alternatively, the UE 102 sets 1538A the first SN MAC entity as available (e.g., for use at another time). Later, if the UE 102 receives, from the T-SN 106B, another RRC reconfiguration message (i.e., a second RRC reconfiguration message) configuring the UE 102 to perform DAPS PSCell change, the UE 102 can use the released resources to create an SN MAC entity for communicating with the S-SN 106A (or another SN).

Figure 15B:
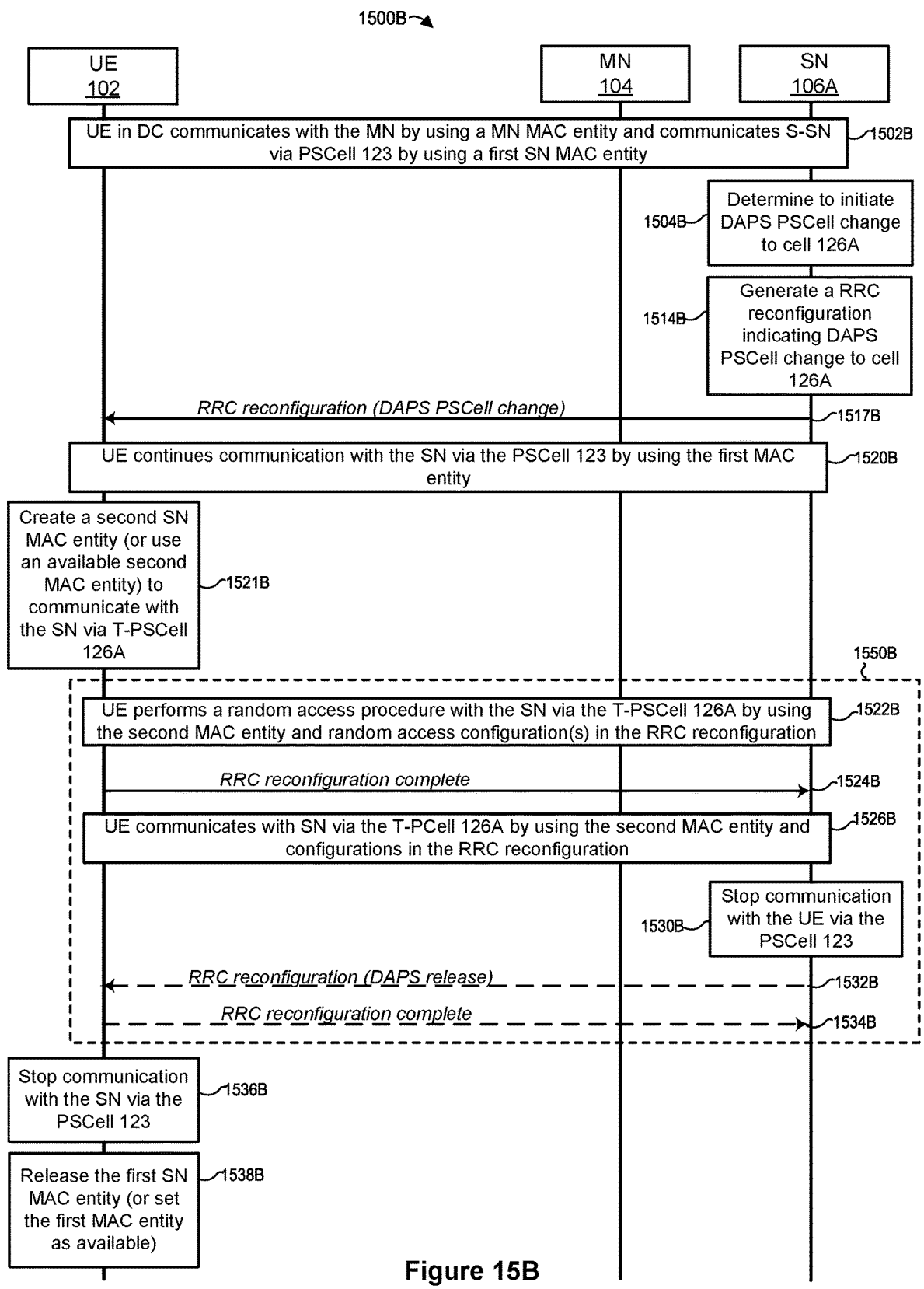

In FIG. 15B, whereas in FIG. 15A the DAPS PSCell change scenario involves an SN change (i.e., a change from S-SN 106A to T-SN 106B), in FIG. 15B the DAPS PSCell change scenario 1500B does not involve an SN change.

Initially, the UE 102 in DC communicates 1502B data with the MN 104 by using an MN MAC entity, and with the SN 106A via PSCell 123 by using a first SN MAC entity.

Later in time, the SN 106A determines 1504B to initiate DAPS PSCell change without involving an SN change (i.e., SN-initiated DAPS PSCell change procedure) for the SN 106A and the UE 102 to communicate via a T-PSCell 126A, e.g., blindly or in response to detecting a suitable event, similar to those described with respect to FIG. 3A.

In response to the determination 1504B, the SN 106A generates 1514B an RRC reconfiguration message that includes a DAPS PSCell change configuration (or a DAPS PSCell change indicator), similar to event 1214A, and transmits 1517B the RRC reconfiguration message to the UE 102, similar to event 1217A.

The DAPS PSCell change configuration enables the UE 102 to use a DAPS to communicate with the SN 106A via PSCell 123 (using the first SN MAC entity) and via 126A (during and after a successful DAPS PSCell change) using a second SN MAC entity. As such, in response to receiving 1517B the RRC reconfiguration message, the UE 102 and the SN 106A continue 1520B communicating with each other (i.e., in DC with the MN 104) using the first SN MAC entity via PSCell 123, and the UE 102 also creates 1521B the second SN MAC entity to use when communicating with the SN 106A via the T-PCell 126A. Alternatively, the UE 102 uses 1521B an available second SN MAC entity to communicate with the SN 106A via the T-PCell 126A.

In response to the RRC reconfiguration message, the UE 102 attempts to perform DAPS PSCell change to the T-PCell 126A using the second SN MAC entity in accordance with the RRC reconfiguration message. In attempting to perform the DAPS PSCell change, the UE 102 initiates 1522B a random access procedure with the MN 104 via T-PSCell 126A using the second SN MAC entity, e.g., by using one or more random access configurations in the RRC reconfiguration message. After the SN 106A identifies the UE 102 during the random access procedure via the T-PSCell 126A, the UE 102 communicates 1526B in DC with MN 104 and the SN 106A via the T-PSCell 126A by using the second SN MAC entity and the DAPS PSCell change configuration in or otherwise indicated in the RRC reconfiguration message. The DAPS PSCell change configuration enables the UE 102 to continue communicating with the SN 106A via PSCell 123 while simultaneously communicating via T-PCell 126A. The UE 102 can also send 1524B an RRC reconfiguration complete message to the SN 106A after performing the random access procedure.

After receiving 1524B the RRC reconfiguration complete message or if the SN 106A does not receive DL data packets from the CN 110 via PSCell 123, the SN 106A stops 1530B communicating with the UE 102 via the PSCell 123.

As the UE 102 no longer needs to use the DAPS to continue communicating with the SN 106A via the PSCell 123, the SN 106A can transmit 1532B an RRC reconfiguration message that includes a DAPS release indicator to the UE 102, e.g., via an SRB (e.g., SRB3) between the UE 102 and the SN 106A or via the MN 104. In response to the RRC reconfiguration message, the UE 102 can transmit 1534B an RRC reconfiguration complete message to the SN 106A via the SRB (e.g., SRB3) between the UE 102 and the SN 106A or via the MN 104, and stop 1536B communicating with the S-SN 106A via the PCell 123. The events 1522B, 1524B, 1526B, 1530B, 1532B, 1534B are collectively referred to in FIG. 15B as the DAPS PSCell change and DAPS release procedure 1550B.

In response to the RRC reconfiguration message or expiration of a DAPS release timer at the UE 102, the UE 102 also releases 1538B the first SN MAC entity (or resources of the first SN MAC entity). Alternatively, the UE 102 sets 1538B the first SN MAC entity as available (e.g., for use at another time). Later, if the UE 102 receives, from the SN 106A, another RRC reconfiguration message (i.e., a second RRC reconfiguration message) configuring the UE 102 to perform DAPS PSCell change, the UE 102 can use the released resources to create an SN MAC entity for communicating with the SN 106A (or another SN).

Figure 16A:
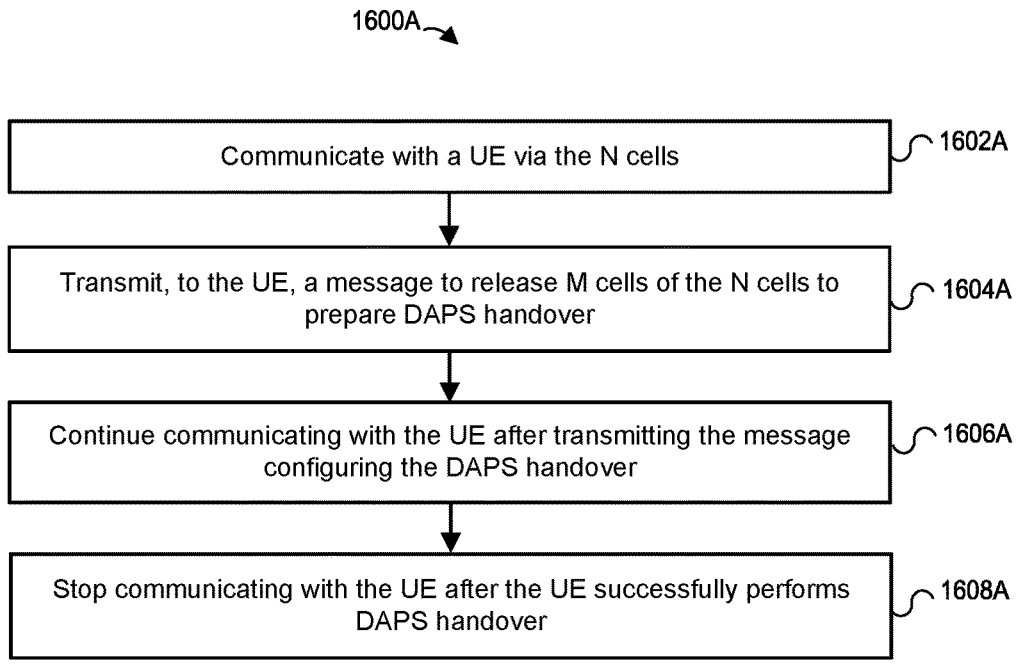
FIGS. 16A and 16B are flow diagrams depicting example methods for configuring a UE to release cells and release an SN, respectively, to prepare the UE to perform DAPS handover to a target base station.

FIG. 16A is a flow diagram depicting an example method 1600A, implemented in a base station (e.g., base station 104), for configuring a user device (e.g., UE 102) to release cells to prepare the user device to perform DAPS handover to a target base station (e.g., base station 106B).

At block 1602A, the base station communicates with the user device via N cells (e.g., in any one of events 302A, 302B, 502).

At block 1604A, the base station transmits, to the user device, a message to release M cells of the N cells to prepare DAPS handover (e.g., in any one of events 306A, 318B, 506). The message can be an RRC reconfiguration message or a handover command message.

At block 1606A, the base station continues communicating with the user device after transmitting the message (e.g., in any one of events 309A, 320A, 320B, 509).

At block 1608A, the base station stops communicating with the user device after the user device successfully performs DAPS handover (e.g., in any one of events 330A, 330B, 530).

Figure 16B:
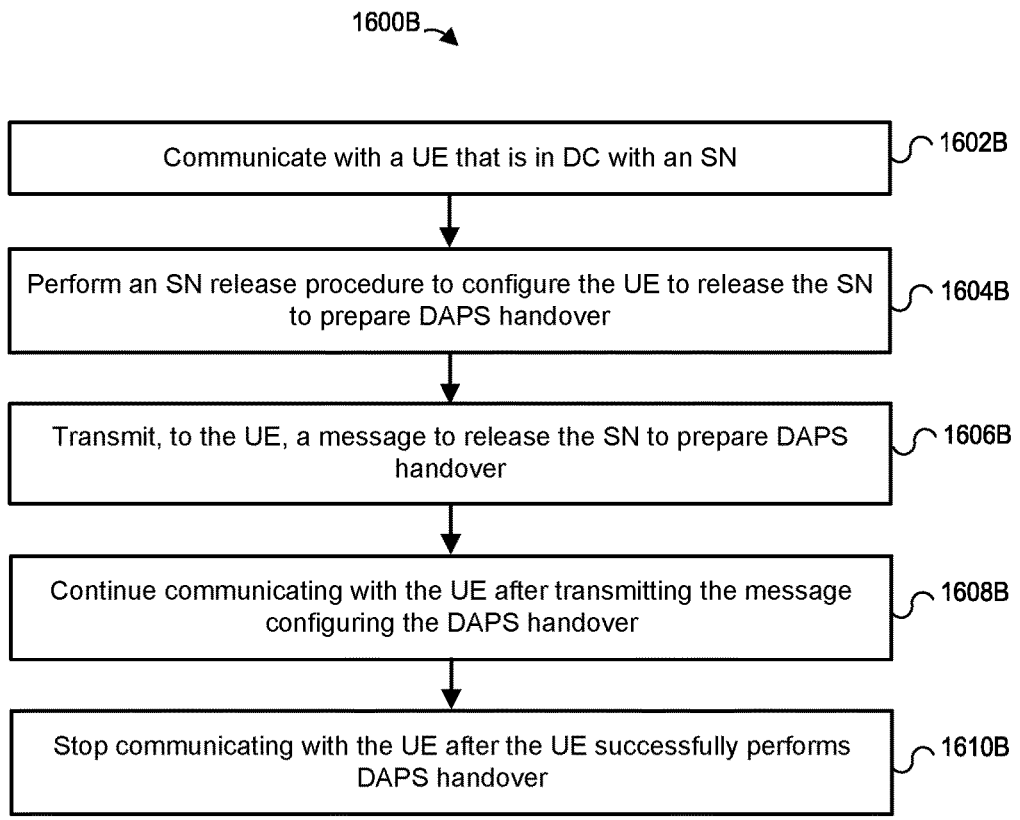

FIG. 16B is a flow diagram depicting an example method 1600B, implemented in a base station (e.g., MN 104), for configuring a user device (e.g., UE 102) to release an SN (e.g., SN 106A) to prepare the user device to perform DAPS handover to a target base station (e.g., base station 106B).

At block 1602B, the base station communicates with the user device that is in DC with an SN (e.g., in any one of events 402A, 402B).

At block 1604B, the base station performs an SN release procedure to configure the user device to release the SN (e.g., in any one of events 405A, 405B).

At block 1606B, the base station transmits, to the user device, a message to release the SN to prepare DAPS handover (e.g., in any one of events 406A, 418B). The message can be an RRC reconfiguration message or a handover command message.

At block 1608B, the base station continues communicating with the user device after transmitting the message (e.g., in any one of events 409A, 420A, 409B).

At block 1610B, the base station stops communicating with the user device after the user device successfully performs DAPS handover (e.g., in any one of events 450A, 450B).

Figure 17A:
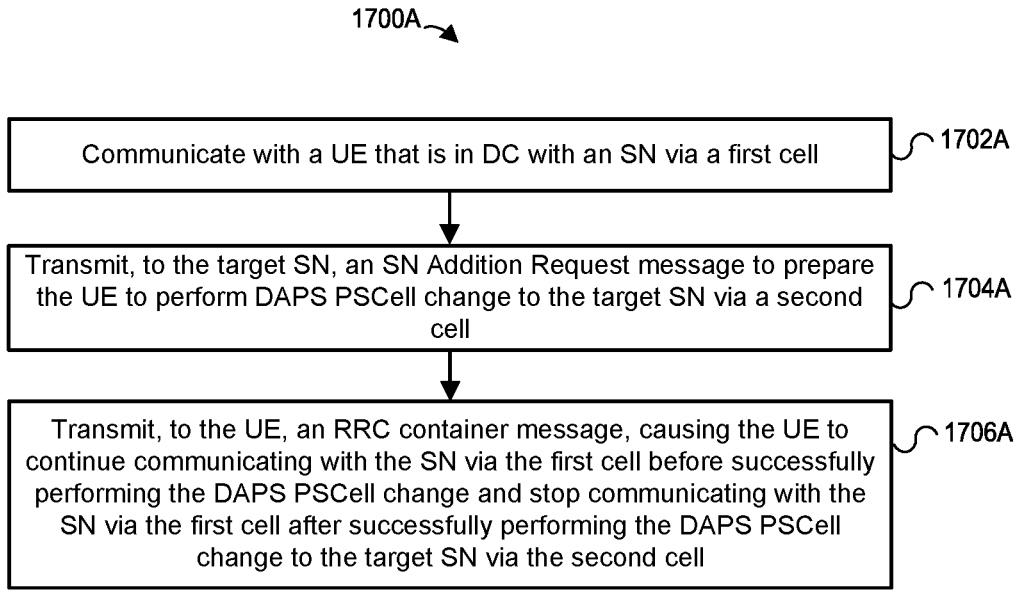
FIGS. 17A and 17B are flow diagrams depicting example methods for preparing a UE to perform DAPS PSCell change involving an SN change and to perform DAPS PSCell change that does not involve an SN change, respectively.

FIG. 17A is a flow diagram depicting an example method 1700A, implemented in a base station (e.g., MN 104), for preparing a user device (e.g., UE 102) to perform DAPS PSCell change involving an SN change (i.e., from an SN (e.g., SN 106A) to a target SN (e.g., SN 106B)).

At block 1702A, the base station communicates with the user device that is in DC with an SN via a first cell (e.g., in any one of events 1002A, 1002B, 1102A, 1102B).

At block 1704A, the base station transmits, to the target SN, an SN Addition Request message to prepare the user device to perform DAPS PSCell change to the target SN via a second cell (e.g., in any one of events 1012A, 1012B, 1112A, 1112B).

At block 1706A, the base station transmits, to the user device, an RRC container message, causing the user device to continue communicating with the SN via the first cell before successfully performing the DAPS PSCell change and stop communicating with the SN via the first cell after successfully performing the DAPS PSCell change to the target SN via the second cell (e.g., in any one of events 1017A, 1017B, 1117A, 1117B).

Figure 17B:
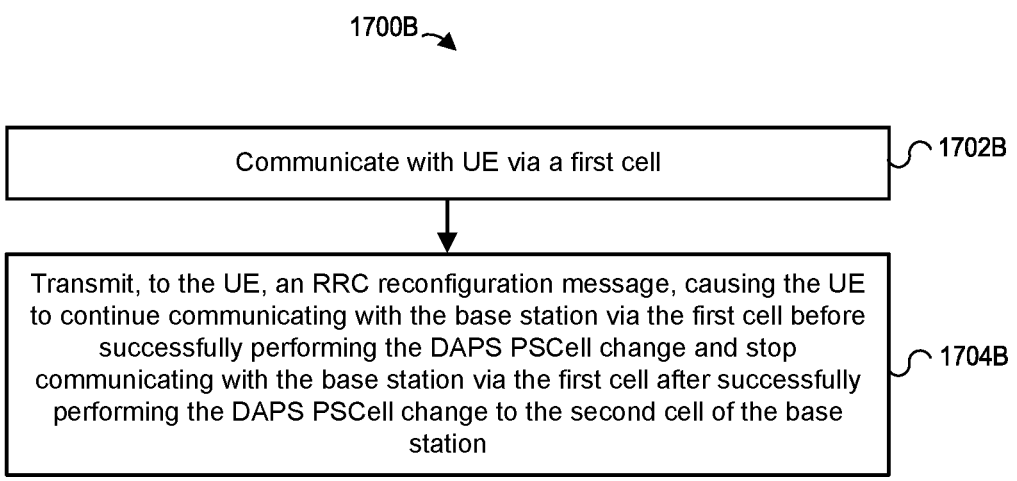

FIG. 17B is a flow diagram depicting an example method 1700B, implemented in a base station (e.g., SN 106A), for preparing a user device (e.g., UE 102) to perform DAPS PSCell change that does not involve an SN change (i.e., from a first cell of the base station to a second cell of the same base station).

At block 1702B, the base station communicates with the user device via a first cell (e.g., in any one of events 1202A, 1202B). The user device communicates in DC with the base station and an MN.

At block 1704B, the base station transmits, to the user device, an RRC reconfiguration message, causing the user device to continue communicating with the base station via the first cell before successfully performing the DAPS PSCell change and stop communicating with the base station via the first cell after successfully performing the DAPS PSCell change to the second cell of the base station (e.g., in any one of events 1217A, 1217B).

Figure 18A:
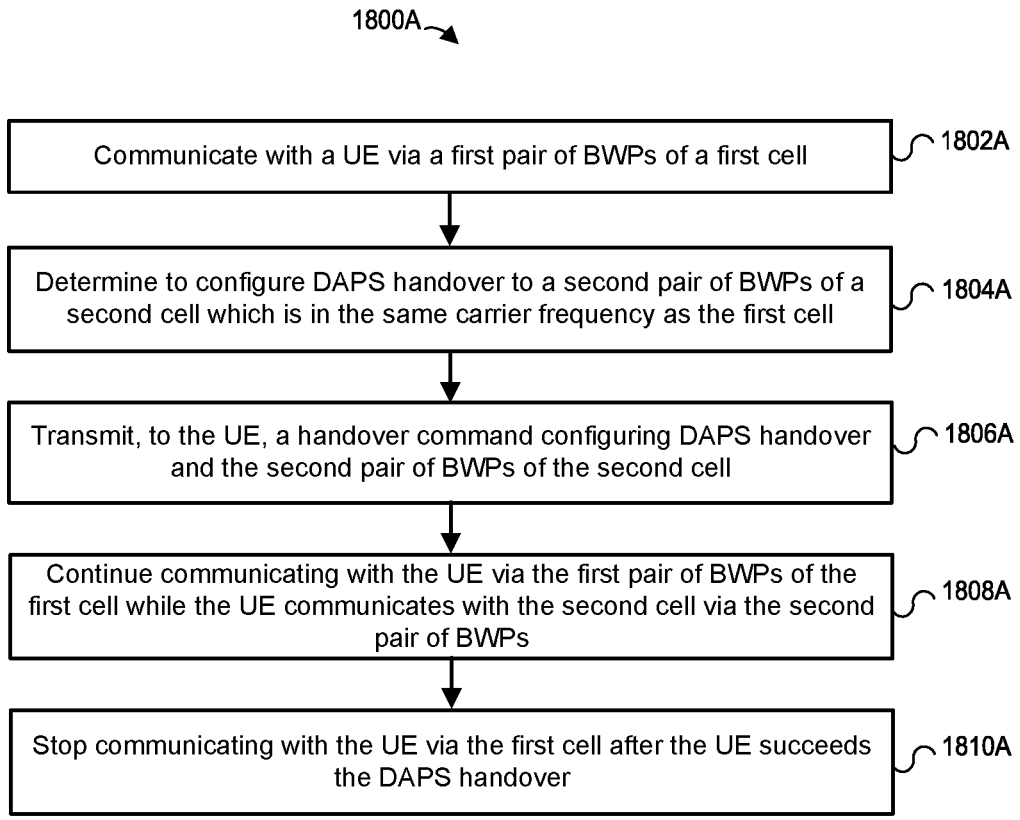
FIGS. 18A and 18B are flow diagrams depicting example methods for preparing a UE to perform DAPS handover, from a first pair of bandwidth parts (BWPs) of a first cell to a second pair of BWPs of a second cell.

FIG. 18A is a flow diagram depicting an example method 1800A, implemented in a base station (e.g., base station 104), for preparing a user device (e.g., UE 102) to perform DAPS handover, from a first pair of BWPs of a first cell to a second pair of BWPs of a second cell. The first cell and the second cell, which operate on the same or overlapped carrier frequencies, can belong to the same base station (e.g., base station 104) or a target base station (e.g., base station 106B).

At block 1802A, the base station communicates with a user device via a first pair of BWPs of a first cell (e.g., in any one of events 602, 702).

At block 1804A, the base station determines to configure DAPS handover to a second pair of BWPs of a second cell (e.g., in any one of events 604, 704).

At block 1806A, the base station transmits, to the user device, a handover command message configuring DAPS handover and the second pair of BWPs of the second cell (e.g., in any one of events 618, 718).

At block 1808A, the base station continues communicating with the user device via the first pair of BWPs of the first cell while the user device communicates with the second cell via the second pair of BWPs (e.g., in any one of events 620, 720).

At block 1810A, the base station stops communicating with the user device via the first cell after the user device succeeds the DAPS handover (e.g., in any one of events 630, 730).

Figure 18B:
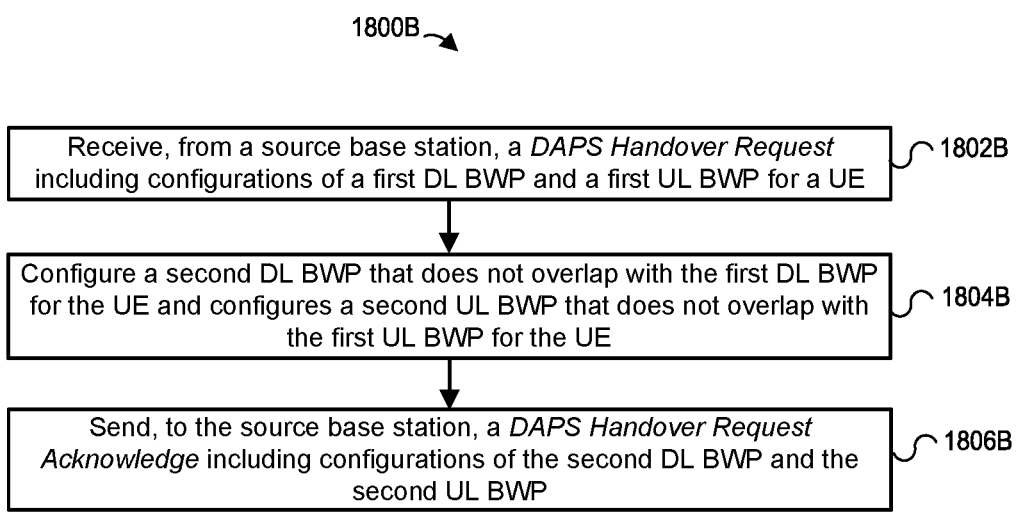

FIG. 18B is a flow diagram depicting an example method 1800B, implemented in a target base station (e.g., base station 106B), for preparing a user device (e.g., UE 102) to perform DAPS handover, from a first pair of BWPs of a first cell to a second pair of BWPs of a second cell. The first cell and the second cell, which operate on the same or overlapped carrier frequencies, belong to a source base station (e.g., base station 104) and the target base station, respectively. The first pair of BWPs includes a first UL BWP and a first DL BWP, and the second pair of BWPs includes a second UL BWP and a second DL BWP.

At block 1802B, the target base station receives, from the source base station, a DAPS Handover Request message including configurations of the first DL BWP and the first UL BWP for the user device (e.g., in event 612).

At block 1804B, the target base station configures the second DL BWP that does not overlap with the first DL BWP for the UE and configures a second UL BWP that does not overlap with the first UL BWP for the user device (e.g., in event 614).

At block 1806B, the target base station sends, to the source base station, a DAPS Handover Request Acknowledge message including configurations of the second DL BWP and the second UL BWP (e.g., in event 616).

Figure 19A:
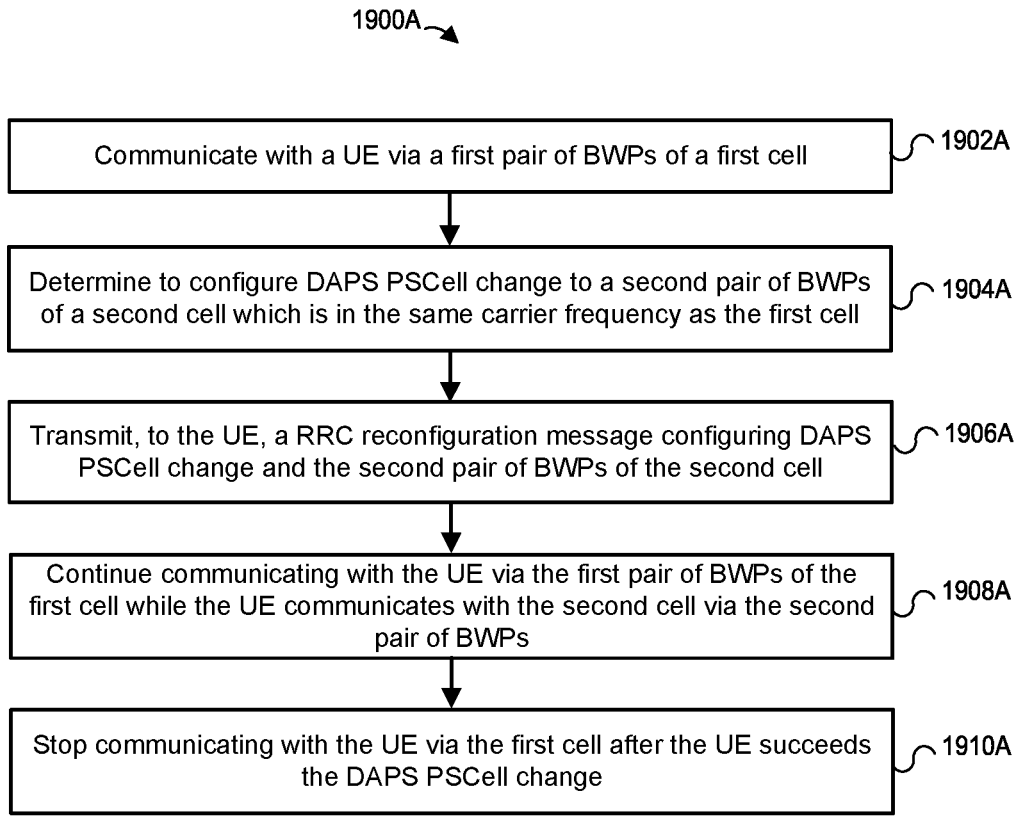
FIGS. 19A and 19B are flow diagrams depicting example methods for preparing a UE to perform DAPS PSCell change, from a first pair of BWPs of a first cell to a second pair of BWPs of a second cell.

FIG. 19A is a flow diagram depicting an example method 1900A, implemented in a RAN (e.g., MN 104, SN 106A), for preparing a user device (e.g., UE 102) to perform DAPS PSCell change, from a first pair of BWPs of a first cell to a second pair of BWPs of a second cell. The first cell and the second cell, which operate on the same or overlapped carrier frequencies, belong to the same base station (e.g., SN 106A) or different base stations (e.g., SN 106A and T-SN 106B, respectively).

At block 1902A, the RAN communicates with a user device via a first pair of BWPs of a first cell (e.g., in any one of events 1302A, 1302B).

At block 1904A, the RAN determines to configure DAPS PSCell change to a second pair of BWPs of a second cell (e.g., in any one of events 1304A, 1304B).

At block 1906A, the RAN transmits, to the user device, an RRC reconfiguration message configuring DAPS PSCell change and the second pair of BWPs of the second cell (e.g., in any one of events 1317A, 1317B).

At block 1908A, the RAN continues communicating with the user device via the first pair of BWPs of the first cell while the user device communicates with the second cell via the second pair of BWPs (e.g., in any one of events 1320A, 1320B).

At block 1910A, the RAN stops communicating with the user device via the first cell after the user device succeeds the DAPS PSCell change (e.g., in any one of events 1330A, 1330B).

Figure 19B:
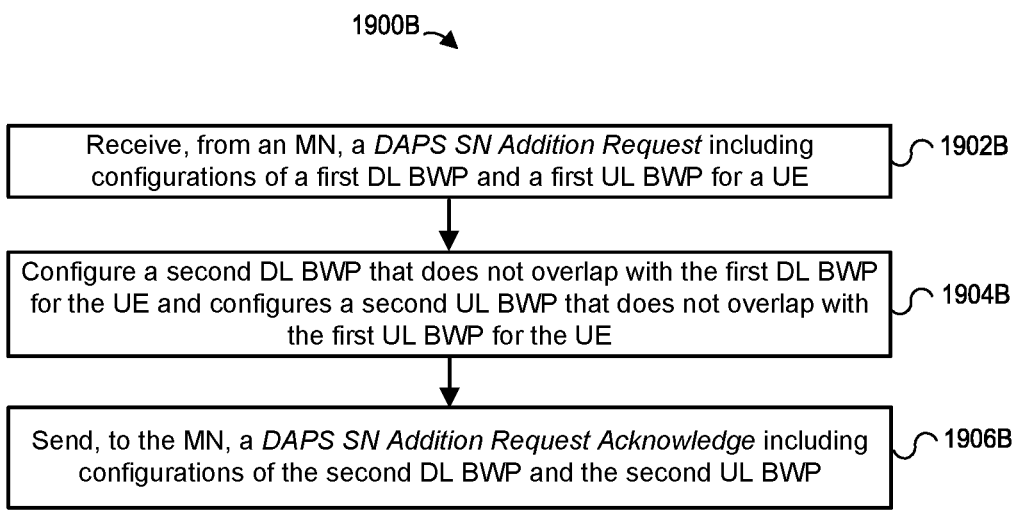

FIG. 19B is a flow diagram depicting an example method 1900B, implemented in a target SN (e.g., T-SN 106B), for preparing a user device (e.g., UE 102) to perform DAPS PSCell change, from a first pair of BWPs of a first cell to a second pair of BWPs of a second cell. The first cell and the second cell, which operate on the same or overlapped carrier frequencies, belong to a source SN (e.g., SN 106A) and the target SN (T-SN 106B), respectively. The first pair of BWPs includes a first UL BWP and a first DL BWP, and the second pair of BWPs includes a second UL BWP and a second DL BWP.

At block 1902B, the target SN receives, from an MN (e.g., MN 104), a DAPS SN Addition Request message including configurations of the first DL BWP and the first UL BWP for the user device (e.g., in event 1312A).

At block 1904B, the target SN configures the second DL BWP that does not overlap with the first DL BWP for the user device and configures a second UL BWP that does not overlap with the first UL BWP for the user device (e.g., in event 1314A).

At block 1906B, the target SN sends, to the MN, a DAPS SN Addition Request Acknowledge message including configurations of the second DL BWP and the second UL BWP (e.g., in event 1313A).

Figure 20:
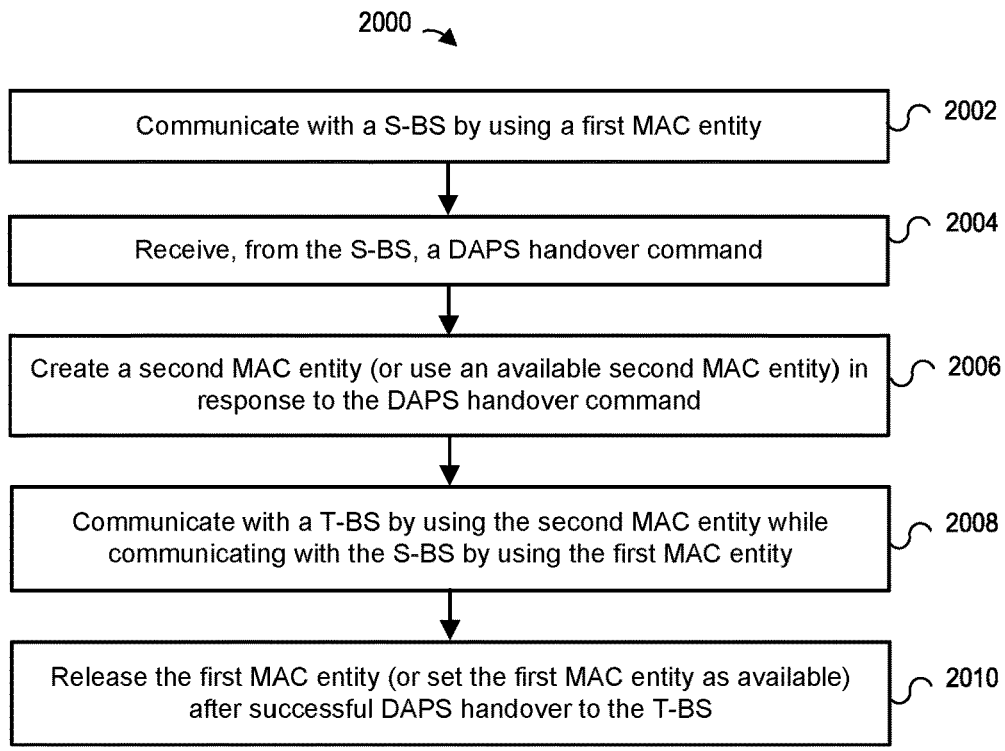
FIG. 20 is a flow diagram depicting an example method for releasing a MAC entity after performing a DAPS handover, from a source base station to a target base station.

FIG. 20 is a flow diagram depicting an example method 2000, implemented in a user device (e.g., UE 102), for releasing a MAC entity after performing a DAPS handover, from a source base station (e.g., base station 104) to a target base station (e.g., base station 106B).

At block 2002, the user device communicates with the source base station by using a first MAC entity (e.g., in event 902A).

At block 2004, the user device receives, from the source base station, a DAPS handover command message (e.g., in event 918A).

At block 2006, the user device creates a second MAC entity (or uses an available second MAC entity) in response to the DAPS handover command message (e.g., in event 921A).

At block 2008, the user device communicates with the target base station by using the second MAC entity while communicating with the source base station by using the first MAC entity (e.g., in event 926A).

At block 2010, the user device releases the first MAC entity (or sets the first MAC entity as available) after successful DAPS handover to the target base station (e.g., in event 938A).

Figure 21:
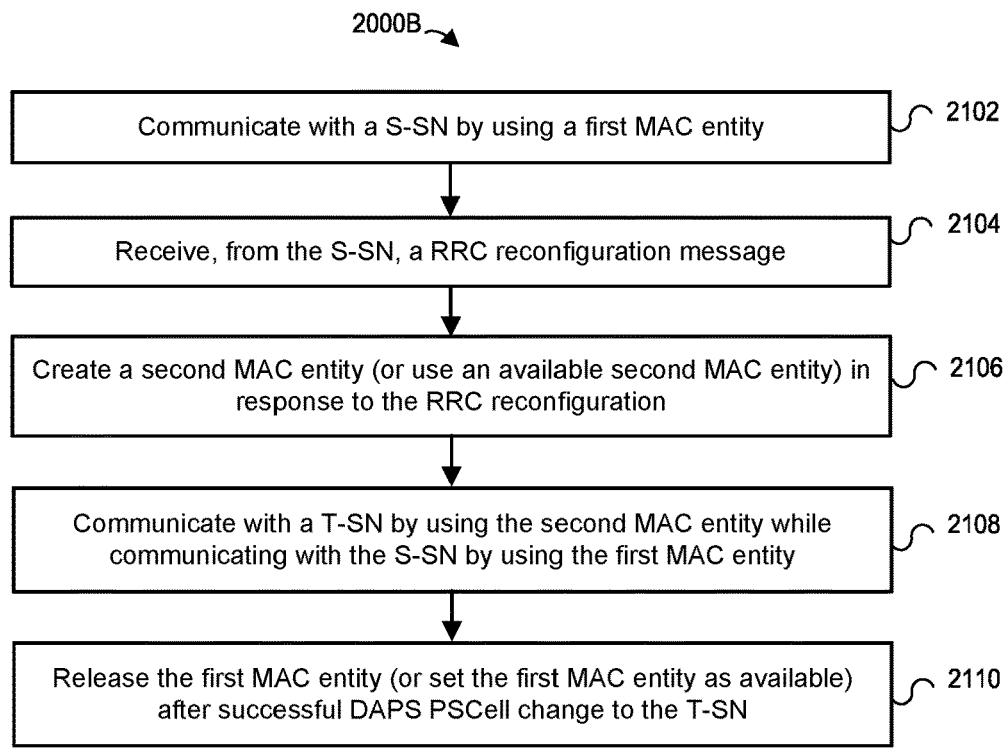
FIG. 21 is a flow diagram depicting an example method for releasing a MAC entity after performing a DAPS PSCell change, from a first cell of a source SN to a second cell of a target SN.

FIG. 21 is a flow diagram depicting an example method 2100, implemented in a user device (e.g., UE 102), for releasing a MAC entity after performing a DAPS PSCell change, from a first cell of a source SN (e.g., S-SN 106A) to a second cell of a target SN (e.g., T-SN 106B).

At block 2102, the user device communicates with the source SN by using a first MAC entity (e.g., in event 1502A).

At block 2104, the user device receives, from the source SN, an RRC reconfiguration message (e.g., in event 1560A).

At block 2106, the user device creates a second MAC entity (or uses an available second MAC entity) in response to the RRC reconfiguration message (e.g., in event 1521A).

At block 2108, the user device communicates with the target SN by using the second MAC entity while communicating with the S-SN by using the first MAC entity (e.g., in event 1526A).

At block 2110, the user device releases the first MAC entity (or sets the first MAC entity as available) after successful DAPS PSCell change to the target SN (e.g., in event 1538A).

Figure 22:
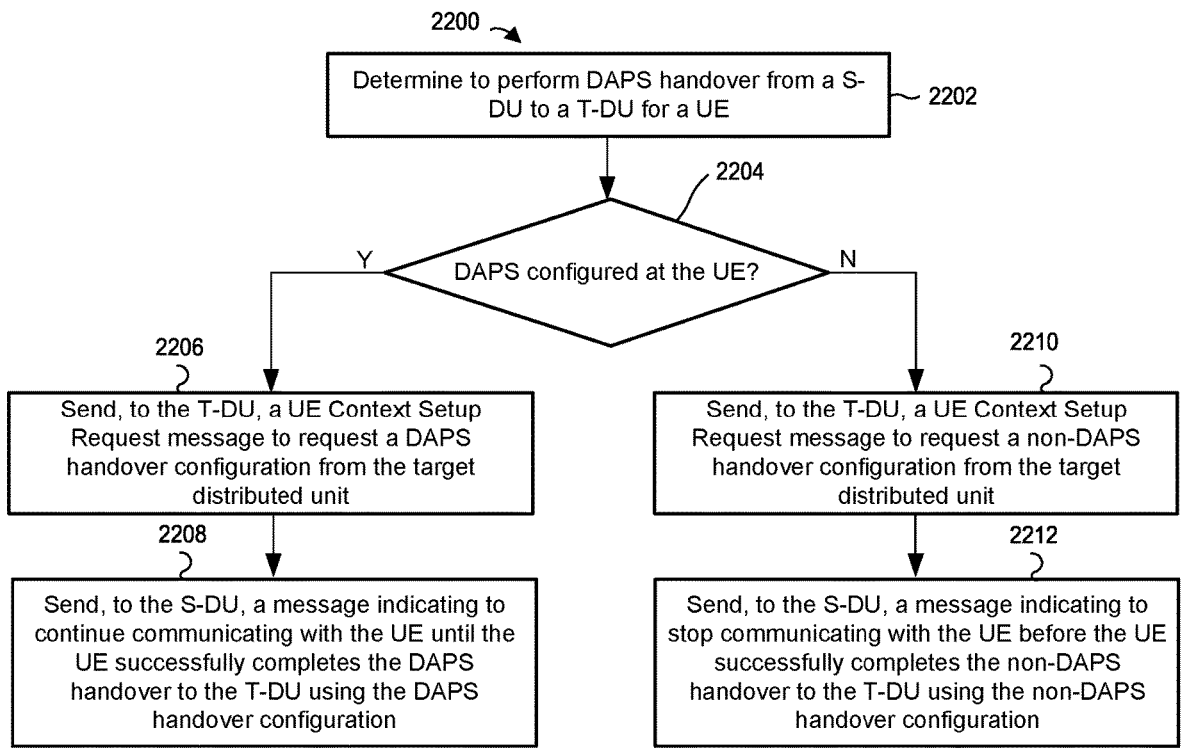
FIG. 22 is a flow diagram depicting an example method for preparing a UE to perform DAPS handover, from a source DU of a base station to a target DU of the base station.

FIG. 22 is a flow diagram depicting an example method 2200, implemented in a centralized unit of a base station (e.g., base station 104), for preparing a user device (e.g., UE 102) to perform DAPS handover, from a source distributed unit of the base station to a target distributed unit of the base station.

At block 2202, the centralized unit determines to perform DAPS handover from the source distributed unit to the target distributed unit for the user device (e.g., in event 804).

At block 2204, the centralized unit determines whether the user device is configured with a DAPS (e.g., in event 804). The centralized unit can determine whether the user device is configured with a DAPS according to a DAPS handover capability in a UE Capability IE of a message (e.g., in a UECapabilityInformation message) received from the user device, a core network, or another base station.

If the centralized unit determines that the user device is configured with the DAPS, at block 2206, the centralized unit sends, to the target distributed unit, a UE Context Setup Request message to request a DAPS handover configuration from the target distributed unit (e.g., in event 806). Then, at block 2208, the centralized unit sends, to the source distributed unit, a message indicating to continue communicating with the user device until the user device successfully completes the DAPS handover to the target distributed unit using the DAPS handover configuration (e.g., in event 816). The message can be a handover command message, a DL RRC Message Transfer message, or a UE Context Modification Request message.

If the centralized unit determines that the user device is not configured with the DAPS, at block 2210, the centralized unit sends, to the target distributed unit, a UE Context Setup Request message to request a non-DAPS handover configuration from the target distributed unit, and subsequently at block 2212, sends to the source distributed unit, a message indicating to stop communicating with the user device before the user device successfully completes the non-DAPS handover to the target distributed unit using the non-DAPS handover configuration. The message can be a handover command message, a DL RRC Message Transfer message, or a UE Context Modification Request message.

Figure 23:
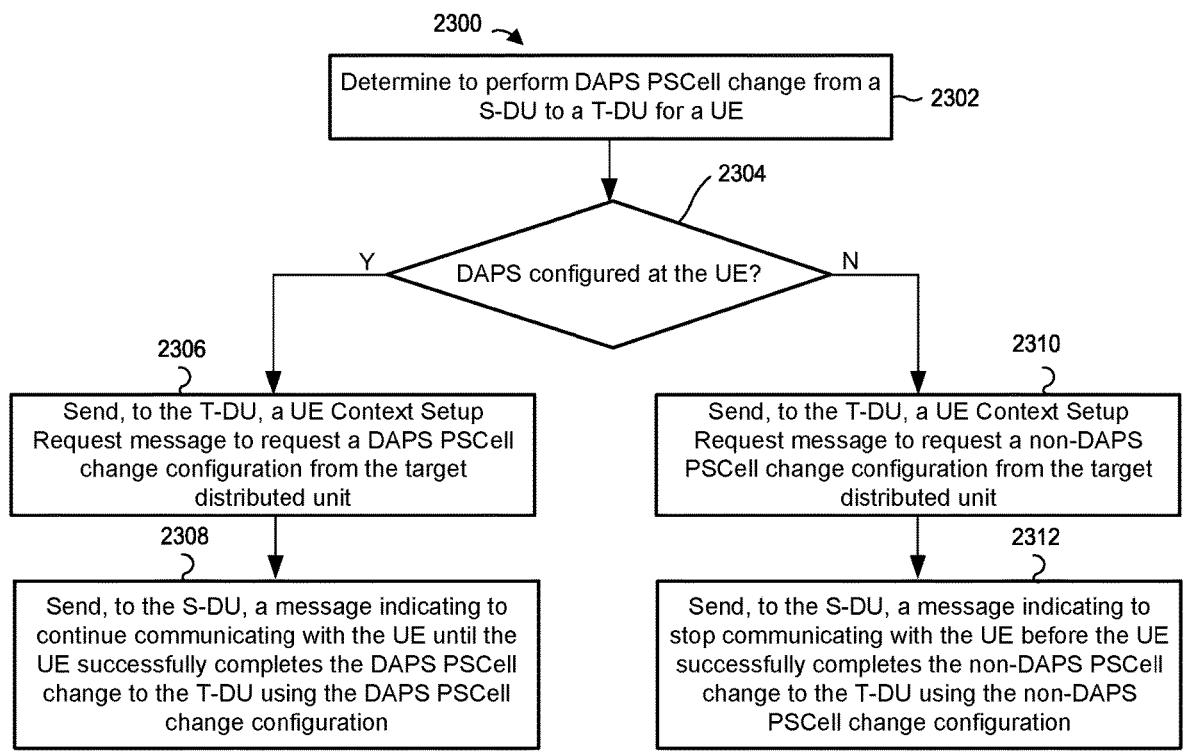
FIG. 23 is a flow diagram depicting an example method for preparing a UE to perform DAPS PSCell change, from a source DU of a base station to a target DU of the base station.

FIG. 23 is a flow diagram depicting an example method 2300, implemented in a centralized unit of a base station (e.g., base station 104), for preparing a user device (e.g., UE 102) to perform DAPS PSCell change, from a source distributed unit of the base station to a target distributed unit of the base station.

At block 2302, the centralized unit determines to perform DAPS PSCell change from the source distributed unit to the target distributed unit for the user device (e.g., in event 1404).

At block 2304, the centralized unit determines whether the user device is configured with a DAPS (e.g., in event 1404). The centralized unit can determine whether the user device is configured with a DAPS according to a DAPS PSCell change capability in a UE Capability IE of a message (e.g., in a UECapabilityInformation message) received from the user device, a core network, or another base station.

If the centralized unit determines that the user device is configured with the DAPS, at block 2306, the centralized unit sends, to the target distributed unit, a UE Context Setup Request message to request a DAPS PSCell change configuration from the target distributed unit (e.g., in event 1406). Then, at block 2308, the centralized unit sends, to the source distributed unit, a message indicating to continue communicating with the user device until the user device successfully completes the DAPS PSCell change to the target distributed unit using the DAPS configuration (e.g., in event 816). The message can be an RRC reconfiguration message, a DL RRC Message Transfer message, or a UE Context Modification Request message.

If the centralized unit determines that the user device is not configured with the DAPS, at block 2310, the centralized unit sends, to the target distributed unit, a UE Context Setup Request message to request a non-DAPS PSCell change configuration from the target distributed unit, and subsequently at block 2312, sends to the source distributed unit, a message indicating to stop communicating with the user device before the user device successfully completes the non-DAPS PSCell change to the target distributed unit using the non-DAPS PSCell change configuration. The message can be an RRC reconfiguration message, a DL RRC Message Transfer message, or a UE Context Modification Request message.

Figure 24:
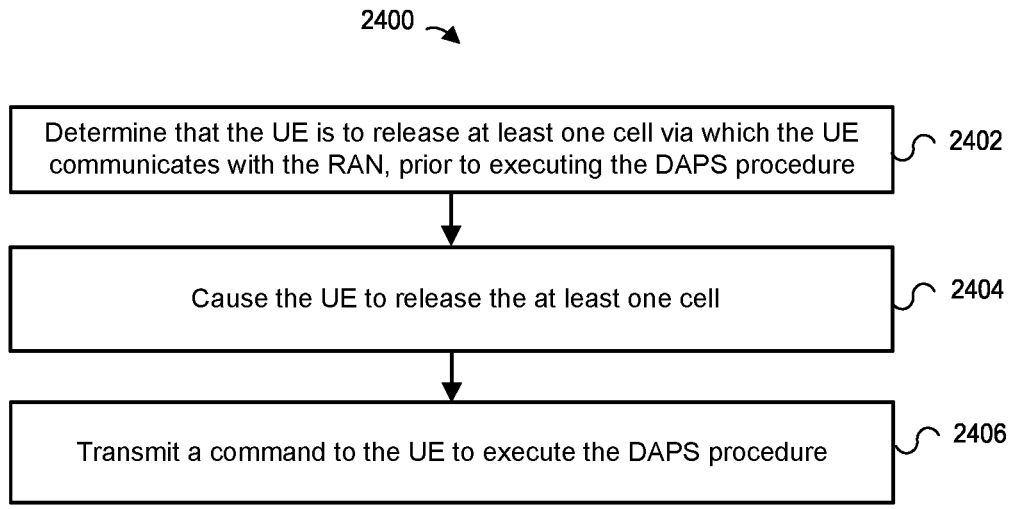
FIG. 24 is a flow diagram depicting an example method in a RAN for enabling execution of a DAPS procedure at a UE.

FIG. 24 is a flow diagram depicting an example method 2400 in a RAN for enabling execution of a DAPS procedure at a UE.

At block 2402, the RAN determines that the UE is to release at least one cell via which the UE communicates with the RAN, prior to executing the DAPS procedure (e.g., in any one of events 304A, 314B, 404A, 414B, 504, 1004B, 1104B, 1204B).

At block 2404, the RAN causes the UE to release the at least one cell (e.g., in any one of events 306A, 316B, 406A, 416B, 506, 1101B, 1110B, 1206B).

At block 2406, the RAN transmits a command to the UE to execute the DAPS procedure (e.g., in any one of events 318A, 318B, 418A, 418B, 518, 1017B, 1117B, 1217B).

Figure 25:
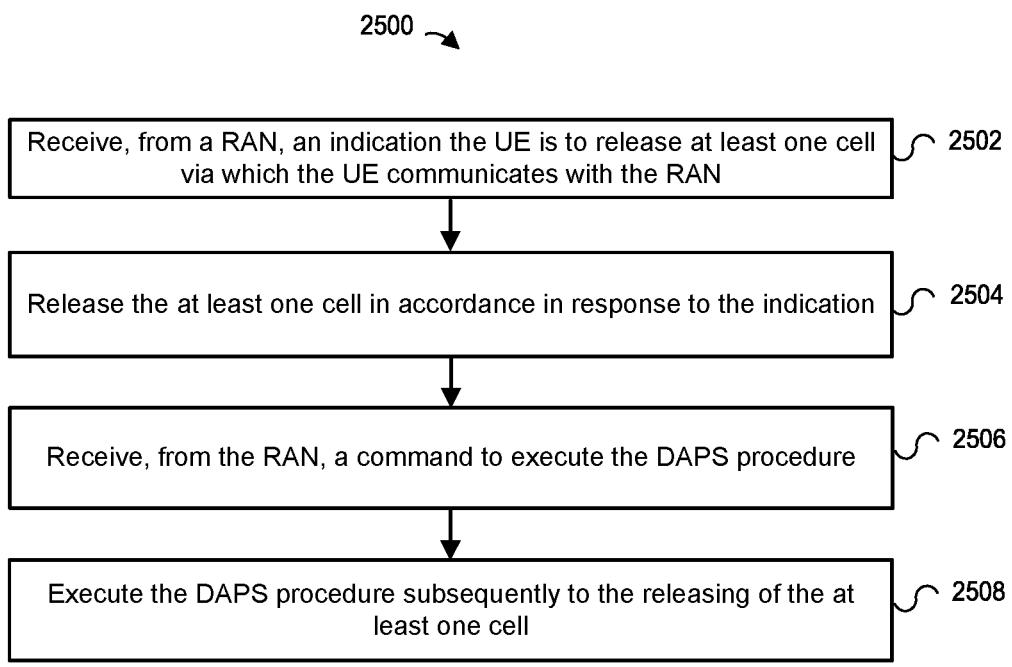
FIG. 25 is a flow diagram depicting an example method in a UE for executing of a DAPS procedure.

FIG. 25 is a flow diagram depicting an example method 2500 in a UE (e.g., UE 102) for executing of a DAPS procedure.

At block 2502, the UE receives, from a RAN, an indication the UE is to release at least one cell via which the UE communicates with the RAN (e.g., in any one of events 306A, 316B, 406A, 416B, 506, 1101B, 1110B, 1206B).

At block 2504, the UE releases the at least one cell in accordance in response to the indication (e.g., in any one of events 308A, 308B, 408A, 408B, 508, 1008B, 1108B, 1208B).

At block 2506, the UE receives, from the RAN, a command to execute the DAPS procedure (e.g., in any one of events 318A, 318B, 418A, 418B, 518, 1017B, 1117B, 1217B).

At block 2508, the UE executes the DAPS procedure subsequently to the releasing of the at least one cell (e.g., in any one of events 350A, 350B, 450A, 450B, 550, 1050B, 1150B, 1208B).

Figure 26:
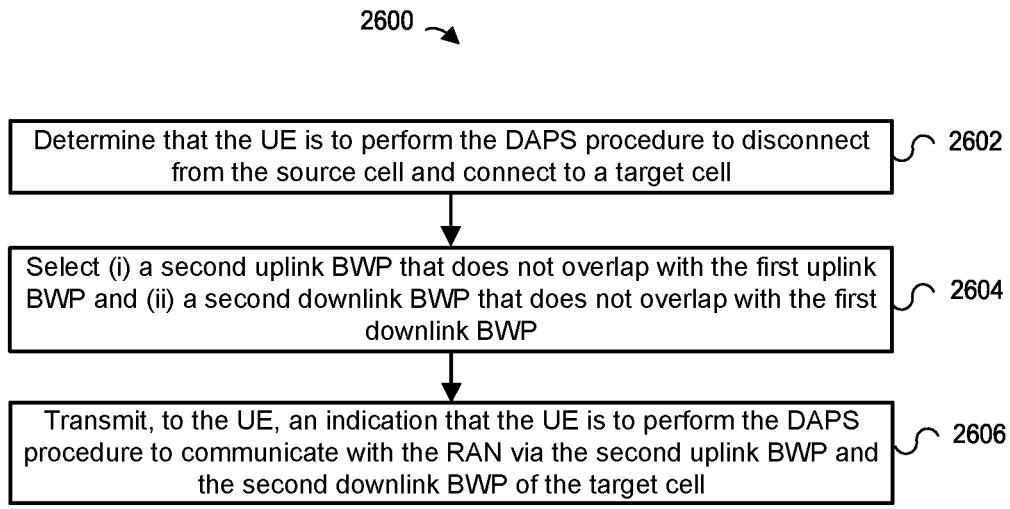
FIG. 26 is a flow diagram depicting an example method in a RAN for configuring a DAPS procedure at a UE communicating with the RAN using a first uplink bandwidth part (BWP) and a first downlink BWP of a source cell.

FIG. 26 is a flow diagram depicting an example method 2600 in a RAN for configuring a DAPS procedure at a UE communicating with the RAN using a first uplink bandwidth part (BWP) and a first downlink BWP of a source cell.

At block 2602, the RAN determines that the UE is to perform the DAPS procedure to disconnect from the source cell and connect to a target cell (e.g., in any one of events 604, 704, 1304A, 1304B).

At block 2604, the RAN selects (i) a second uplink BWP that does not overlap with the first uplink BWP and (ii) a second downlink BWP that does not overlap with the first downlink BWP (e.g., in any one of events 614, 714, 1314A, 1314B).

At block 2606, the RAN transmits, to the UE, an indication that the UE is to perform the DAPS procedure to communicate with the RAN via the second uplink BWP and the second downlink BWP of the target cell (e.g., in any one of events 618, 718, 1317A, 1317B).

Figure 27:
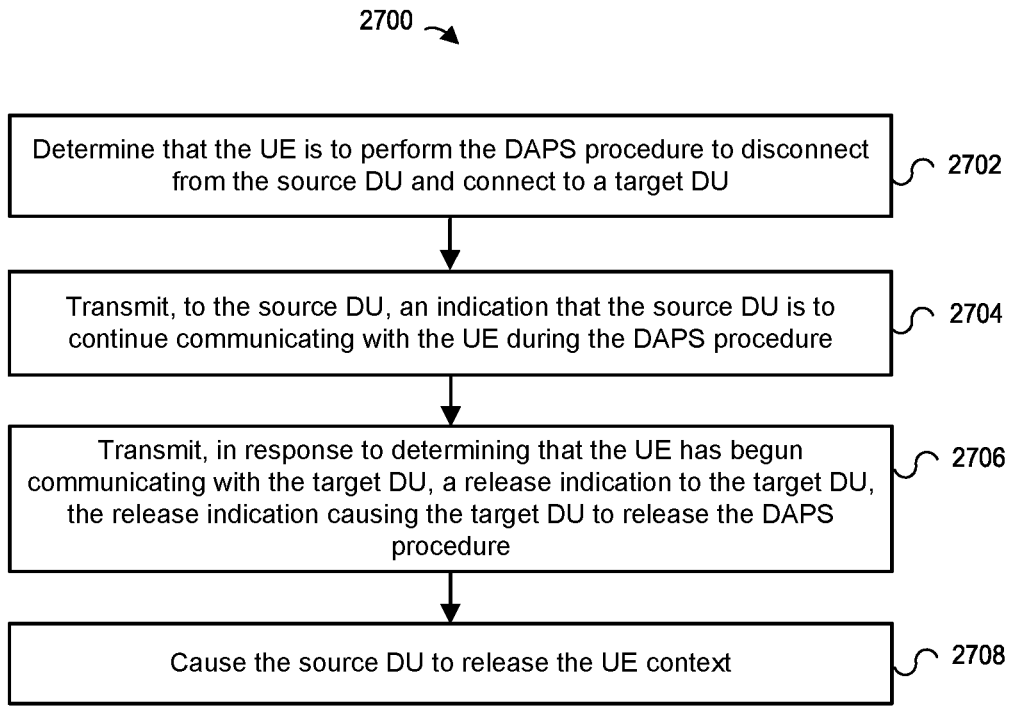
FIG. 27 is a flow diagram depicting an example method in a central unit (CU) of a distributed base station for configuring a DAPS procedure at a UE communicating with the distributed base station via a source distributed unit (DU)

FIG. 27 is a flow diagram depicting an example method 2700 in a CU of a distributed base station for configuring a DAPS procedure at a UE communicating with the distributed base station via a source DU.

At block 2702, the CU determines that the UE is to perform the DAPS procedure to disconnect from the source DU and connect to a target DU (e.g., in any one of events 804, 1404).

At block 2704, the CU transmits, to the source DU, an indication that the source DU is to continue communicating with the UE during the DAPS procedure (e.g., in any one of events 816, 1416).

At block 2706, the CU transmits, in response to determining that the UE has begun communicating with the target DU, a release indication to the target DU, the release indication causing the target DU to release the DAPS procedure (e.g., in any one of events 831, 1431).

At block 2708, the CU, subsequently to transmitting the release indication, causes the source DU to release the UE context (e.g., in any one of events 840, 1440).

Figure 28:
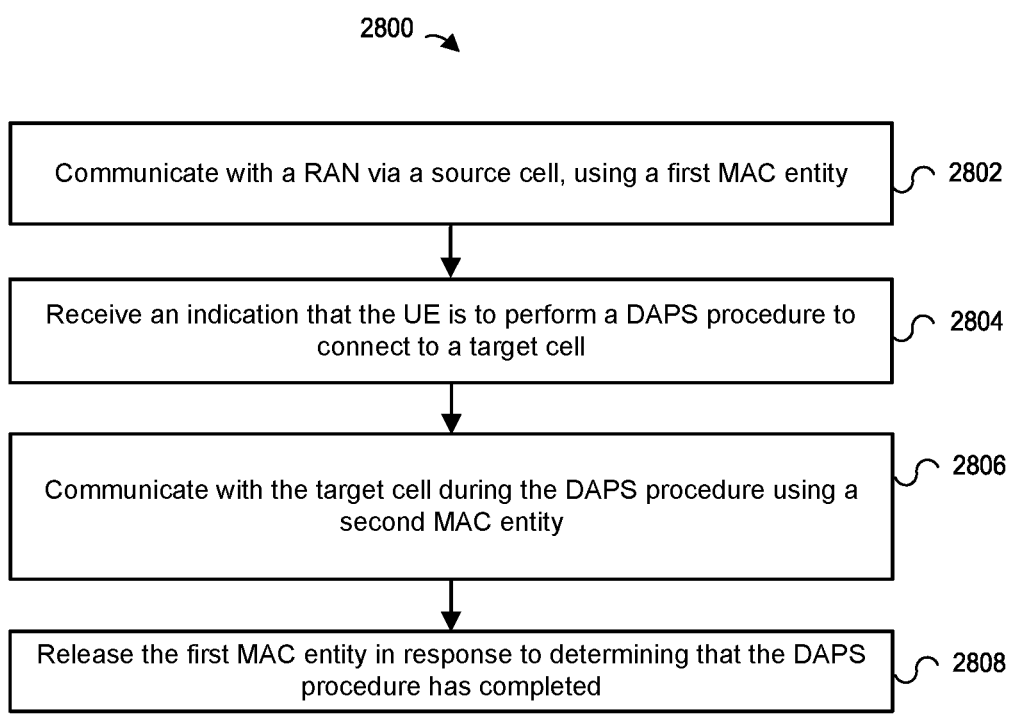
FIG. 28 is a flow diagram depicting an example method in a UE for managing connectivity.

FIG. 28 is a flow diagram depicting an example method 2800 in a UE for managing connectivity.

At block 2802, the UE communicates with a radio access network (RAN) via a source cell, using a first medium access control (MAC) entity (e.g., in any one of events 902A, 902B, 1502A, 1502B).

At block 2804, the UE receives an indication that the UE is to perform a dual active protocol stack (DAPS) procedure to connect to a target cell (e.g., in any one of events 918A, 918B, 1560A, 1517B).

At block 2806, the UE communicates with the target cell during the DAPS procedure using a second MAC entity (e.g., in any one of events 950A, 950B, 1550A, 1550B).

At block 2808, the UE releases the first MAC entity in response to determining that the DAPS procedure has completed (e.g., in any one of events 938A, 938B, 1538A, 1538B).

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Example 1. A method in a radio access network (RAN) for enabling execution of a dual active protocol stack (DAPS) procedure at a UE, the method comprising: determining, by processing hardware, that the UE is to release at least one cell via which the UE is communicating with the RAN, prior to executing the DAPS procedure; causing, by the processing hardware, the UE to release the at least one cell; and transmitting, by the processing hardware to the UE, a command to execute the DAPS procedure.

Example 2. The method of example 1, further comprising: determining that the UE is communicating with the RAN via N cells; wherein the causing includes instructing the UE to release M cells, N>M≥1.

Example 3. The method of example 2, further comprising: determining that the UE does not support the DAPS procedure while operating in carrier aggregation (CA).

Example 4. The method of example 2, wherein the causing includes: transmitting, to the UE and prior to transmitting the command to execute the DAPS procedure, a reconfiguration command to reconfigure a radio connection between the UE and the RAN, the command including an indication to release the M cells.

Example 5. The method of example 4, further comprising: receiving, from the UE, an indication that the UE has reconfigured the radio connection in accordance with the configuration command, prior to transmitting the command to execute the DAPS.

Example 6. The method of example 2, further comprising: including an indication to release the M cells in the command to execute the DAPS.

Example 7. The method of example 1, further comprising: determining that the UE is communicating with the RAN in dual connectivity (DC) via a master node (MN) and a secondary node (SN); wherein the causing includes instructing the UE to release the SN.

Example 8. The method of example 7, further comprising: determining that the UE does not support the DAPS procedure while operating in DC.

Example 9. The method of example 7, wherein the causing includes: transmitting, to the UE and prior to transmitting the command to execute the DAPS, a reconfiguration command to reconfigure a radio connection between the UE and the RAN, the command including an indication to release the SN.

Example 10. The method of example 7, further comprising: including an indication to release the SN in the command to execute the DAPS.

Example 11. The method of any of the preceding examples, wherein: the DAPS procedure is a DAPS handover procedure.

Example 12. The method of example 11, wherein the DAPS handover procedure causes the UE to hand over between: (i) a first MN and a second MN when the UE operates in SC; (ii) a first SN and a second SN when the UE operates in DC; (iii) a first cell of an MN and a second cell of an MN when the UE operates in SC; or (iv) a first distributed unit (DU) of a distributed base station and a second DU of the distributed base station.

Example 13. The method of any of examples 1-10, wherein: the DAPS procedure is a DAPS primary secondary cell (PSCell) change procedure.

Example 14. The method of example 13, wherein the DAPS PSCell change procedure causes the UE to hand over between: (i) a first SN and a second SN; (ii) a first cell of an SN and a second cell of an SN; or (ii) a first distributed unit (DU) of a distributed base station and a second DU of the distributed base station.

Example 15. The method of any of the preceding examples, further comprising: determining that the UE changes a connection from a first cell to a second cell in accordance with the DAPS procedure, the first cell and the second cell including overlapping carrier frequencies; and configuring the UE to use a new uplink bandwidth part (BWP) and a new downlink BWP in the second cell that do not overlap an uplink BWP and a downlink BWP, respectively, on which the UE is communicating in the first cell prior to the DAPS procedure.

Example 16. The method of example 15, wherein the configuring includes transmitting an indication of the new uplink BWP and the new downlink BWP in the command to execute the DAPS procedure.

Example 17. One or more base station comprising processing hardware and configured to implement a method of any of the preceding examples.

Example 18. A method in a user equipment (UE) for executing of a dual active protocol stack (DAPS) procedure, the method comprising: receiving, by processing hardware and from a radio access network (RAN), an indication the UE is to release at least one cell via which the UE communicates with the RAN; releasing, by the processing hardware, the at least one cell in response to the indication; and receiving, by the processing hardware and from the RAN, a command to execute the DAPS procedure; and executing the DAPS procedure subsequently to the releasing of the at least one cell.

Example 19. The method of example 18, further comprising: communicating with the RAN in carrier aggregation (CA) via N cells; wherein the indication indicates that the UE is to release M cells, N>M≥1.

Example 20. The method of example 19, further comprising: receiving, by the processing hardware and prior to receiving the command to execute the DAPS procedure, a reconfiguration command to reconfigure a radio connection between the UE and the RAN, the command including the indication to release the M cells.

Example 21. The method of example 19, further comprising: receiving the indication to release the M cells in the command to execute the DAPS procedure.

Example 22. The method of example 18, further comprising: communicating with the RAN in dual connectivity (DC) via a master node (MN) and a secondary node (SN); wherein the indication indicates that the UE is to release the SN.

Example 23. The method of any of examples 18-22, wherein: the DAPS procedure is a DAPS handover procedure.

Example 24. The method of any of examples 18-22, wherein: the DAPS procedure is a DAPS primary secondary cell (PSCell) change procedure.

Example 25. The method of example 18, further comprising: changing a connection from a first cell and a second cell in accordance with the DAPS procedure, the first cell and the second cell including overlapping carrier frequencies; and receiving, from the RAN, an indication the UE to use a new uplink bandwidth part (BWP) and a new downlink BWP in the second cell that do not overlap an uplink BWP and a downlink BWP, respectively, on which the UE is communicating in the first cell prior to the DAPS procedure.

Example 26. A method in a radio access network (RAN) for configuring a dual active protocol stack (DAPS) procedure at a UE communicating with the RAN using a first uplink bandwidth part (BWP) and a first downlink BWP of a source cell, the method comprising: determining, by processing hardware, that the UE is to perform the DAPS procedure to disconnect from the source cell and connect to a target cell; selecting, by the processing hardware, (i) a second uplink BWP that does not overlap with the first uplink BWP and (ii) a second downlink BWP that does not overlap with the first downlink BWP; and transmitting, by the processing hardware to the UE, an indication that the UE is to perform the DAPS procedure to communicate with the RAN via the second uplink BWP and the second downlink BWP of the target cell.

Example 27. The method of example 26, further comprising: determining that the UE does not support the DAPS procedure while operating in carrier aggregation (CA).

Example 28. The method of example 26 or 27, wherein: the DAPS procedure is a DAPS handover procedure.

Example 29. The method of example 26 or 27, wherein: the DAPS procedure is a DAPS primary secondary cell (PSCell) change procedure.

Example 30. The method of example 26, wherein the transmitting includes providing a configuration of the second uplink BWP and the second downlink in a command to execute the DAPS procedure.

Example 31. The method of example 26, further comprising: transmitting, to the UE and prior to transmitting the indication, a reconfiguration command to reconfigure a radio connection between the UE and the RAN, the command including a configuration of the second uplink BWP and the second downlink.

Example 32. A method in a user equipment (UE) for performing a dual active protocol stack (DAPS) procedure, the method comprising: communicating, by processing hardware, with the RAN via a first uplink BWP and a first downlink BWP of a source cell; receiving, by the processing hardware and from the RAN, a command to perform the DAPS procedure to disconnect from the source cell and connect to a target cell; receiving, by the processing hardware and from the RAN, a BWP configuration according to which the UE is to use (i) a second uplink BWP that does not overlap with the first uplink BWP and (ii) a second downlink BWP that does not overlap with the first downlink BWP, in the target cell; and performing, by the processing hardware, the DAPS procedure in accordance with the BWP configuration.

Example 33. The method of example 32, further comprising: providing, to the RAN, an indication that the UE does not support the DAPS procedure while operating in carrier aggregation (CA).

Example 34. The method of example 32 of 33, wherein: the DAPS procedure is a DAPS handover procedure.

Example 35. The method of example 32 or 33, wherein: the DAPS procedure is a DAPS primary secondary cell (PSCell) change procedure.

Example 36. The method of example 32, wherein the BWP configuration is received in a command to execute the DAPS procedure.

Example 37. The method of example 32, wherein the receiving of the BWP configuration includes: receiving, from the RAN and prior to receiving the command to perform the DAPS procedure, a reconfiguration command to reconfigure a radio connection between the UE and the RAN, the command including the BWP configuration.

Example 38. A method in a central unit (CU) of a distributed base station for configuring a dual active protocol stack (DAPS) procedure at a UE communicating with the distributed base station via a source distributed unit (DU), the method comprising: transmitting, by the processing hardware and to the UE, a command to perform the DAPS procedure in order to disconnect from the source DU and connect to a target DU; transmitting, by the processing hardware and to the source DU, an indication that the source DU is to continue communicating with the UE during the DAPS procedure; in response to determining that the UE has begun communicating with the target DU, transmitting a release indication to the target DU, the release indication causing the target DU to release the DAPS procedure; and subsequently to transmitting the release indication, causing the source DU to release the UE context.

Example 39. The method of example 38, wherein the indication transmitted to the source DU is a Transmission Action Indicator information element (IE).

Example 40. The method of example 39, including assigning a "restart" value to the Transmission Action Indicator IE.

Example 41. The method of example 38, wherein the indication transmitted to the source DU is included in a handover command.

Example 42. The method of example 41, wherein the handover command is included in a UE Context Modification Request.

Example 43. The method of example 38, wherein causing the source DU to release the UE context includes transmitting a UE Context Release Command to the source DU.

Example 44. The method of example 43, further comprising: receiving, from the source DU and in response to the UE Context Release Command, a UE Context Release Complete message.

Example 45. The method of example 38, wherein the causing occurs concurrently with the target DU transmitting, to the UE, an indication that the DAPS procedure is released.

Example 46. The method of example 38, wherein the DAPS procedure is a handover procedure.

Example 47. The method of example 38, wherein the DAPS procedure is a DAPS primary secondary cell (PSCell) change procedure.

Example 48. A method in a user equipment (UE) for managing connectivity, the method comprising: communicating with a radio access network (RAN) via a source cell, using a first medium access control (MAC) entity; receiving, by processing hardware, a command to perform a dual active protocol stack (DAPS) procedure to connect to a target cell; communicating with the target cell during the DAPS procedure using a second MAC entity; in response to determining that the DAPS procedure has completed, releasing the first MAC entity.

Example 49. The method of example 48, further comprising: creating the second MAC entity in response to the command.

Example 50. The method of example 48, further comprising: selecting, in response to the indication, the second MAC entity from among available MAC entities.

Example 51. The method of any of examples 48-50, further comprising: applying, to the second MAC entity, a random access configuration included in the command.

Example 52. The method of any of examples 48-51, wherein communicating using the second MAC entity includes using a DAPS configuration included in the command.

Example 53. The method of any of examples 48-52, wherein determining that the DAPS procedure has completed includes receiving, from the RAN, a DAPS release indication.

Example 54. The method of any of examples 48-53, wherein the DAPS procedure is a DAPS handover procedure.

Example 55. The method of any of examples 48-53, wherein the DAPS procedure is a DAPS primary secondary cell (PSCell) change procedure.

What is claimed is:

1. A method in a radio access network (RAN) for enabling execution of a dual active protocol stack (DAPS) procedure at a user equipment (UE) communicating with the RAN in dual connectivity (DC) via a master node (MN) of the RAN, the MN covering a primary cell (PCell), and a secondary node (SN) of the RAN, the SN covering a primary secondary cell (PSCell), the method comprising:
   causing, by the MN, the UE to release the SN covering the PSCell; and
   transmitting, by the MN to the UE, a command to execute the DAPS procedure after the UE releases the SN.

2. The method of claim 1, wherein:
   the command is a handover command.

3. The method of claim 1,
   wherein the causing includes instructing the UE to release the SN.

4. The method of claim 3, wherein the causing includes:
   transmitting, to the UE, and prior to transmitting the command to execute the DAPS, a reconfiguration command to reconfigure a radio connection between the UE and the RAN, the command including an indication to release the SN.

5. The method of claim 3, wherein the causing includes:
   transmitting, to the UE, an indication that the UE is to perform the DAPS procedure.

6. The method of claim 1, wherein:
   the DAPS procedure is a DAPS handover procedure or a DAPS PSCell change procedure.

7. A base station (104) for a radio access network (RAN), the base station comprising processing hardware (130) and configured to implement the method of claim 1.

8. A method performed by a user equipment UE, communicating with a radio access network (RAN) in dual connectivity (DC) via a master node (MN) of the RAN, the MN covering a primary cell (PCell), and a secondary node (SN) of the RAN, the SN covering a primary secondary cell (PSCell), for executing a dual active protocol stack (DAPS) procedure, the method comprising:
   receiving, by the UE from the MN, an indication the UE is to release the SN coverinq the PSCell;
   releasing the SN covering the PSCell in response to the indication;
   receiving, by the UE from the RAN, a command to execute the DAPS procedure; and
   executing the DAPS procedure subsequently to the releasing of the SN.

9. The method of claim 8, wherein:
   the command is a handover command.

10. The method of claim 8, wherein the indication indicates that the UE is to perform the DAPS procedure.

11. The method of claim 8, wherein:
the DAPS procedure is a DAPS handover procedure or a PSCell change procedure.

12. A UE comprising processing hardware and configured to implement the method of claim 8.

13. The UE of claim 12, wherein the command is a handover command.

14. The UE of claim 12, wherein indication indicates that the UE is to perform the DAPS procedure.

15. The UE of claim 12, wherein the DAPS procedure is a DAPS handover procedure.

16. The UE of claim 12, wherein the DAPS procedure is a DAPS PSCell change procedure.

17. The base station of claim 7, wherein the command is a handover command.

18. The base station of claim 7, wherein the causing includes one of:
an instruction for the UE to release the SN; or
a transmission, prior to a transmission of the command to execute the DAPS, of a reconfiguration command to reconfigure a radio connection between the UE and the RAN, the reconfiguration command including an indication to release the SN.

19. The base station of claim 7, wherein the DAPS procedure is a DAPS handover procedure.

20. The base station of claim 7, wherein the DAPS procedure is a DAPS PSCell change procedure.

* * * * *